United States Patent [19]

Milia et al.

[11] Patent Number: 4,979,099
[45] Date of Patent: Dec. 18, 1990

[54] QUASI-FAIR ARBITRATION SCHEME WITH DEFAULT OWNER SPEEDUP

[75] Inventors: Andrew Milia, Burlington; Richard G. Bahr, Cambridge, both of Mass.

[73] Assignee: Apollo Computer Inc., Chelmsford, Mass.

[21] Appl. No.: 262,574

[22] Filed: Oct. 25, 1988

[51] Int. Cl.⁵ .................... G06F 13/14; G06F 13/16; G06F 13/18

[52] U.S. Cl. ................ 364/200; 364/240.1; 364/241.2

[58] Field of Search ... 364/200 MS File, 900 MS File

[56] References Cited

U.S. PATENT DOCUMENTS

| | | | |
|---|---|---|---|
| 3,995,258 | 11/1976 | Barlow | 364/200 |
| 4,449,183 | 5/1984 | Flahive et al. | 364/200 |
| 4,536,839 | 8/1985 | Shah et al. | 364/200 |
| 4,554,628 | 11/1985 | Bell | 364/200 |
| 4,627,018 | 12/1986 | Trost | 364/900 |

Primary Examiner—David Y. Eng
Attorney, Agent, or Firm—Weingarten, Schurgin, Gagnebin & Hayes

[57] ABSTRACT

A decentralized, pipelined, synchronous bus arbitration scheme which allows almost completely fair arbitration between multiple devices competing for the use of a communication bus while allowing the device that last used the bus faster access to the bus if no other device is competing for its use. The arbitration method and apparatus according to the present invention allows all competing devices equal access to the bus, with the exception that when bus requests are posted simultaneously, the device with the higher priority will always be granted use of the bus first.

8 Claims, 5 Drawing Sheets

QUASI-FAIR ARBITRATION SCHEME WITH DEFAULT OWNER SPEEDUP

FIELD OF THE INVENTION

The present invention relates to computer system arbitration schemes, in particular, arbitration schemes providing a fair allocation of system resources.

BACKGROUND OF THE INVENTION

Computer systems include a variety of processing units, each seeking access to and control of system resources. Strict priority allocation schemes preclude lower priority units from obtaining necessary access. Thus, there is a need for a priority allocation scheme that avoids complete lock-out of, lower priority units.

BRIEF DESCRIPTION OF THE INVENTION

According to the present invention, when a device 'A' needs to use the bus to which it is connected, it asserts its request signal and, during the same cycle, looks for any other device's request signal. If no other device is requesting during the cycle, then device A becomes the bus owner during the following cycle. If another device 'B', asserts its request signal during the same first cycle, then the requesting device with the highest priority is bus owner during the following cycle. The lower priority device will become bus owner immediately following the higher priority device's last cycle as bus owner. The requesting device with the highest priority always wins bus ownership.

During the final cycle of bus ownership, the bus owner takes a "snapshot" of, i.e., ascertains and stores the state of all the request signals belonging to the lower priority requesting devices, and will not reassert its request signal until all of the requests that were noted by the snapshot having been satisfied.

If during a device's last cycle as owner, or during subsequent cycles, device A requires another bus transfer and no other device has requested the bus since it originally gained bus access, then the owner becomes the owner again by default and need not reassert its request signal, thus allowing it access to the bus one cycle sooner than if it were required to assert its request signal prior to renewing its ownership of the bus.

The arbitration scheme is implemented by providing identical arbitration apparatus disposed within each device. Thus, the apparatus employed to implement the arbitration scheme is distributed over all the devices, and so the arbitration scheme is effectively decentralized.

This technique provides multiple devices with equitable access to a bus using a minimum of control signals, while minimizing the cycles used for arbitration.

BRIEF DESCRIPTION OF THE DRAWING

These and other features of the present invention will be better understood by reading the following detailed description of the invention, taken together with the drawing wherein.

Further details of one embodiment of the present invention are provided in the appendix, wherein:

Appendix I provides a processor bus interface specification;

Appendix II provides a bus signal specification; and

Appendix III provides further structural description of the processor-bus interface.

DETAILED DESCRIPTION OF THE INVENTION

Figure 1:
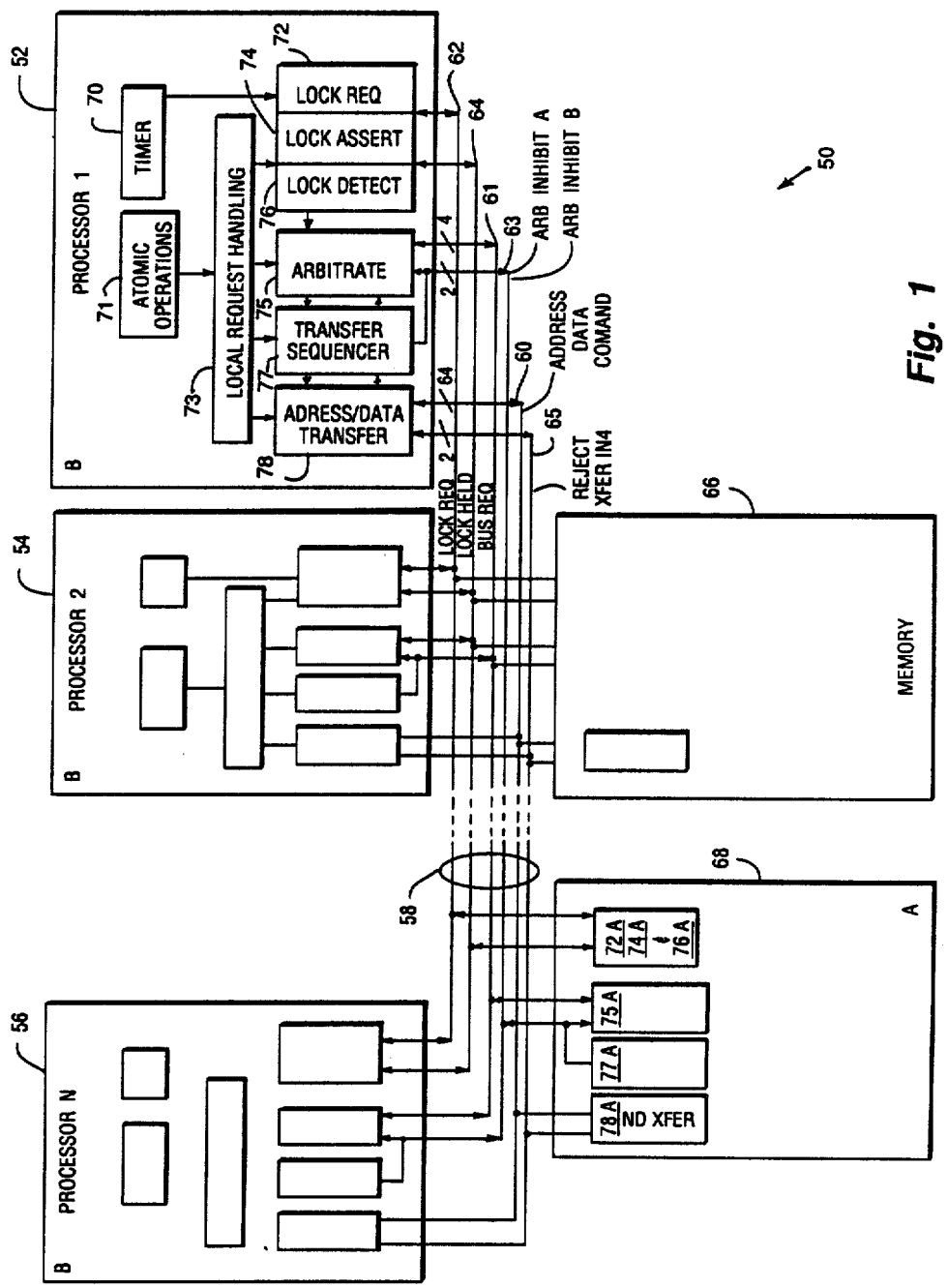
FIG. 1 is a block diagram of a computer system embodiment of the present invention.

As shown in FIG. 1, the processors 52, 54, and 56 and memory units 66 and 68 are devices connected to a bus 58 via interface elements 70, 71, 72, 73, 74, 75, 76, 77, and 78 described in more detail with regard to bus signalling in APOLL-111XX, entitled MULTIPROCESSOR INTERLOCK, filed concurrently herewith and incorporated by reference. Initially assume memory unit 68 is a sole default owner of the bus.

All device on the bus 58 except the default owner must request the bus prior to use. There is one bus request level on the backplane per device on the bus 58. Devices are grouped into two classes. Class A devices are awarded the bus in strict priority order i.e., the highest class A device gets access to the bus. Class B devices participate in fair arbitration and may also be default bus owners. Processors 52, 54 and 56 are class B devices.

Bus arbitration is decentralized arbitration is achieved by the collective action of interface elements 70, 72, 74, 75, 76 and 78 disposed in each device on the bus. Every device decides for itself whether it has won access to the bus 58. Bus arbitration can be inhibited by the assertion of an arb inhibit signal on leads 63. Only the current owner of the bus may assert an arb_inhibit signal. The current owner will do so if the intended bus transfer requires multiple cycles.

If a class A device 68 requests the bus, it will assert both its assigned request level 61 and the ARB_INHIBIT_B 63 line on the bus. When a class B device detects the assertion of ARB_INHIBIT_B in an active bus arbitration cycle, it will defer to the class A device.

The class B devices, e.g., processors 52, 54, and 56, are each assigned a fixed priority. Potential assignments are 0 through 3, with 3 being the highest priority. The assignment is used to determine which of the four class B request parallel backplane signals this particular processor is to use. The processor will drive its assigned level, and defer to requesters at higher levels.

Fair arbitration is approximated whereby class B devices do not reassert their request lines unconditionally. Rather, a class B device will "snapshot", i.e., read and store all other lower priority class B request lines in the final cycle of its bus ownership. The class B device will then relinquish the bus and not reassert a request line until all the snapshotted requests are, or are about to be, satisfied. The class B device determines that the other requesters have been serviced by observing the current state of the other request lines. If a request line is deasserted, service is underway or completed. If a request line is still asserted, but arbitration is enabled and that requesters will win, service is presumed.

When the bus 58 is otherwise idle, the last successful bidder among the class B requesters is also established as the default bus owner. The default bus owner may use the bus at the end of any cycle in which no other request line was asserted. The default bus owner does not have to assert its assigned request line. The default status remains in effect until another class B device wins the bus.

A class B device's bus ownership may be suspended by a class A device. If a class A device assumes control of the bus, the class B device that was the former owner waits for the bus to again become idle. The class B device then reclaims bus ownership; i.e., the class B device reassumes the ownership in the cycle following one in which arbitration was permitted, but no request line was asserted. If another class B device wins the bus before the bus becomes idle, default bus ownership is transferred to the winning device.

When a device first asserts a bus request line, it will start a timer 70. If the timer elapses before the bus is acquired, a bus acquisition timeout occurs. The bus timeout duration is approximately 3.2 milliseconds. If a timeout occurs, the system is assumed broken and a clock (not shown) freeze request is made.

The timer 70 is not stopped until a request is confirmed to complete or fail, the timer will therefore expire if a device is continually busy. Broadcast transfers will stop the timer regardless of the acknowledge line state. The same timer 70 is reused for read data return monitoring.

Figure 2:
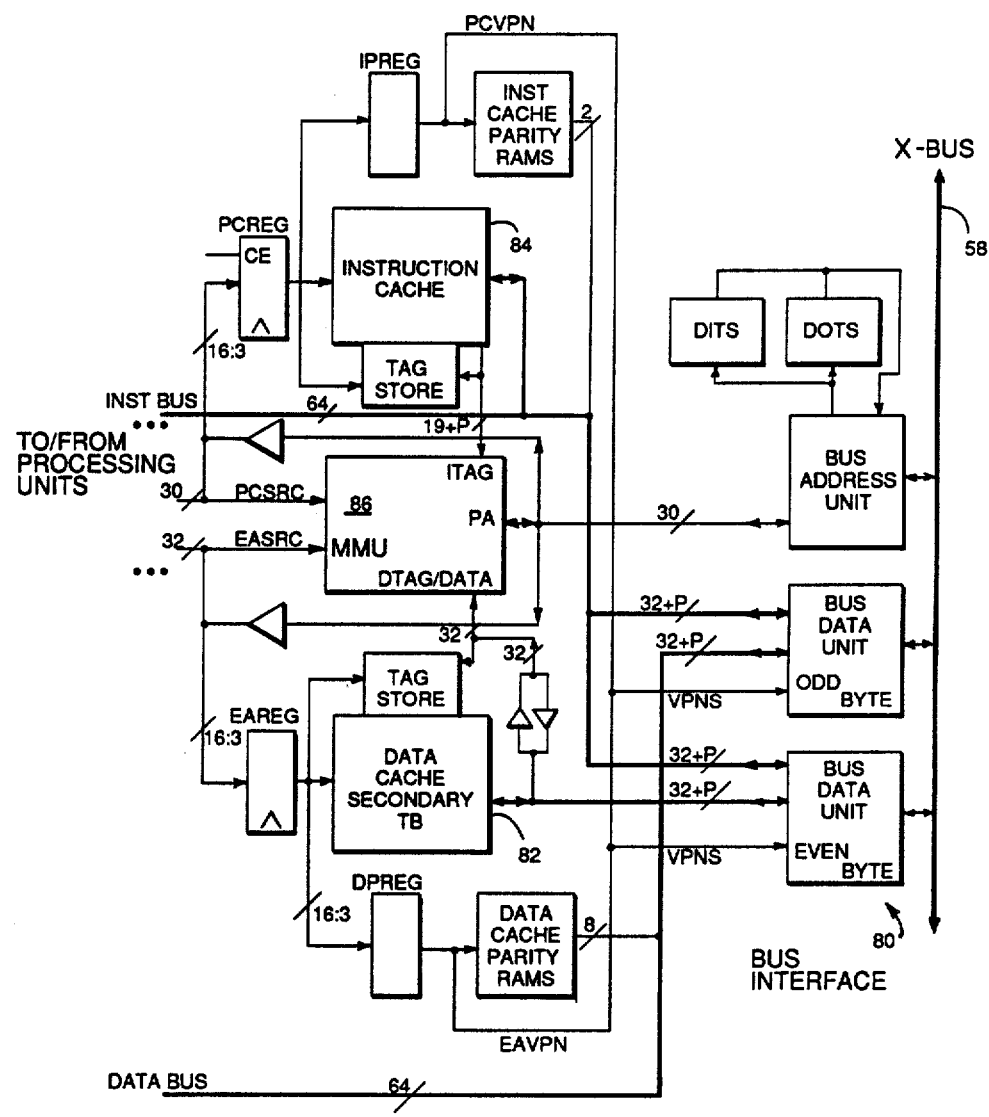
FIG. 2 is a block diagram of one embodiment of a bus interface unit.

Shown in FIG. 2 are multiple competing local requesters: data cache 82 read, data cache write and instruction cache 84 read. Any number of data cache writes, up to the limit of the write queue size, may be posted and awaiting transfer on the bus. Only a single read may be posted from each of the read request sources: the data cache read and the instruction cache read. In general, data cache read will be prioritized over instruction cache read. In turn, instruction cache read will be prioritized over data cache write. However, the following exceptions exist:

if the write data queue is full, data cache write is prioritized over instruction cache miss;

if a data cache miss collides in address with a previously queued write, data cache write is given priority over both data and instruction cache miss;

if a write and unlock is queued, data cache write is given priority over both data and instruction cache miss;

if a data cache miss from an unencacheable memory location is posted, data cache write is given priority over both data and instruction cache miss;

if a data cache miss and lock is posted, data cache write is given priority over both data and instruction cache read;

if a data cache miss and unlock is posted, data cache write is given priority over both data and instruction cache read;

if a tb invalidate is queued in the write buffer, data cache write is given priority over both instruction and data cache miss.

A fourth source of request for the return of read data, to itself, is given precedence over all other transmitters.

Subsequent requests from the data cache will be issued no more often than every other bus cycle. This is required to assure write order between processors, and read-write order within one. Further details of system bus protocol relating to the reject signal is provided in APOLL-113XX, entitled PIPELINE COMPUTER SYSTEM HAVING WRITE ORDER PRESERVATION, filed concurrently herewith and incorporated herein by reference. The instruction cache miss request is not restricted to every other cycle. In the cases of load and lock, load and unlock, and store and unlock, subsequent requests are not issued until a successful bus acknowledge of the prior request is received.

With reference to FIGS. 1 and 2, the address/data transfer unit 78 of a device 52, for example, accepts load lock, load unlock and store unlock command from the Memory Management Unit 86 (MMU) disposed within the local request handling unit 73. When load lock completes successfully, that device 52 can be assured of holding the bus lock until the device 52 explicitly releases the lock or an error arises. Only one device at a time may hold the bus lock and that, in turn, permits the construction of critical code sections in a multiple processor environment. Further details are provided in APOLL-111XX, incorporated herein by reference.

The bus lock will be secured only when a load lock data cache miss is successfully issued and acknowledged on the bus. In more detail, first the data cache miss which seeks the bus lock is posted. This request will push ahead of itself all previously queued up writes. When the lock request is next to be serviced, the current state of the LOCK_HELD 64 and LOCK_REQUEST 61 lines is examined. If LOCK_HELD lock is already asserted by another device, the arbitration is deferred. If the bus lock is available, arbitration is attempted. If the bus lock signal is subsequently asserted before the device gains access to the bus, the device will withdraw from further arbitration. When the bus is finally secured, and ARB_INHIBIT_A and ARB_INHIBIT_B and LOCK_HELD signals are simultaneously asserted. ARB_INHIBIT_A and ARB_INHIBIT_B remain asserted for 3 cycles which is sufficient time for all other bus interfaces to see the LOCK_HELD signal asserted and to withdraw from arbitration if they too plan to secure the bus lock. At the end of 3 cycles, the locking device will also examine the state of the acknowledge signals. If other than a successful acknowledge is detected, the bus lock is immediately released. If released, the LOCK_HELD signal is deasserted at the end of the cycle following the acknowledge.

A device will release the bus lock when a load unlock or a store unlock is successfully issued and acknowledged. Alternatively, the lock is released upon an error in the local processor. A local processor error is assumed to result in a processor trap, and the signal trap dispatch, which so indicates, is therefore used to unconditionally release the bus lock. In more detail, first the data cache read or write which seeks to release the bus lock is posted. This request will push ahead of itself all previously queued up writes. At the end of 3 cycles, the locking device will also examine the state of the acknowledge signals. If other than a successful acknowledge is detected, the bus LOCK_HELD 64 is retained. Otherwise, the lock signal is deasserted at the end of the cycle following the acknowledge.

If a lock request is met with REJECT signal 65, the LOCK_REQUEST signal 62 and ARB_INHIBIT_A and ARB_INHIBIT_B 63 are immediately released. Similarly, if an unlock request is met with a REJECT signal 65, the lock is retained if held.

Two successive bus address transfers may be issued by a device in bus cycles spaced apart by only one NOP or foreign cycle. If the first request receives a busy acknowledge, the acknowledge is received only after the second request has been sent. In this case, the bus REJECT signal on lead 65 is immediately asserted. The REJECT signal is interpreted by a slave as nullifying the already accepted request. This use of REJECT assures that the order of transfers on the bus is retained. This is particularly important when the second request is a read for the same data that is being written by the first request. When REJECT is asserted, the acknowledge for the second request is ignored. When REJECT is asserted, all transaction side effects, such as bus locking, do not take place.

It's possible for the MMU of a device to request the bus lock while the device is already in possession of the bus lock. For this reason, a second load lock request will be accepted. If two bus lock requests have been accepted, two bus unlock requests will need to follow before the lock will really be released. Thus, according to one embodiment of the present invention, bus lock requests are nested by two levels.

A timer 70 starts running when the bus lock is first acquired. The timer 70 remains running so long as the device holds the bus lock. If the timer expires before the lock is released, a lock timeout trap is posted. The timer duration is approximately 200 microseconds. If a timeout trap occurs, a corresponding register (not shown) indicates so. If a second lock setting request is processed before a held lock is released, the timer is not reset. This results in a somewhat shorter timeout for the second request. If an unlock request is being transferred upon the bus, the device refrains from bidding for a new lock request for at least five cycles including the transferring one. This delay assures that there will always be two cycles of delay between the release of a lock and its reacquisition by the same device.

A device will retry any request that receives a BUSY acknowledge. The retry will continue until the bus timeout expires. If an address transfer receives a BUSY acknowledge, the request is marked as in retry. There can be as many as three requests in retry at any one time.

The use of REJECT in cooperation with the write order assurance of the write queue, guarantees that the write order of one device is always preserved as seen by a second processor. This can permit alternate multiprocessor synchronization without the need for bus locking.

Figure 3:
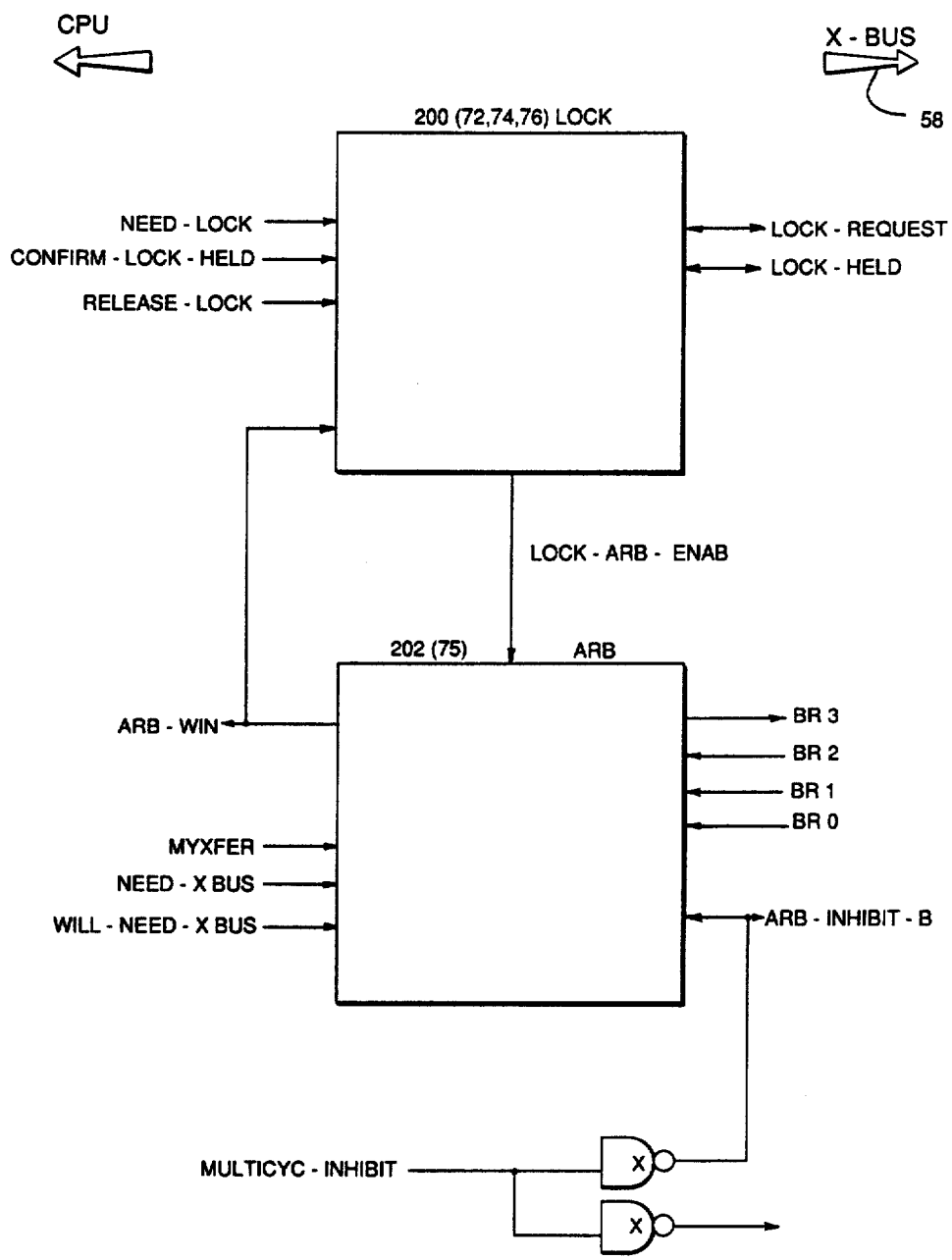
FIG. 3 is a block diagram of the interconnection of one embodiment of the lock acquisition and bus arbitration blocks of the bus interface.

As shown in FIG. 3, the arbitration 75 and lock control blocks 72, 74, 76 of the bus interface 80 of the processor 52 attach to both the system's bus 58 and the processor's local request generation logic 73. A brief glossary of the signals generated or received by the local request generation logic follows:

NEED_LOCK is asserted to identify that the next processor read to be serviced requires the acquisition of a bus lock.

CONFIRM_LOCK_HELD is asserted to identify that a processor "read and lock" which just took place has been properly acknowledged on the bus. This signal handles the situation that a bus operation may fail to complete successfully even though arbitration succeeds.

RELEASE_LOCK is asserted when the processor wishes to abandon a bus lock. The processor chooses to do so when a "read and unlock" or "write and unlock" operation has been properly acknowledged on the bus. The processor may also choose to do so if there has been a local error such as lock holding duration timeout.

ARB_WIN is asserted by the bus arbitration logic 75 when the processor has been awarded the right to transfer on the bus 58.

MYXFER is asserted by the address/data transfer logic 78 when an address or data transfer is underway.

NEED_BUS is asserted by the processor when there is a pending and unserviced processor read or write.

WILL_NEED_BUS is asserted by the processor when there "will be" a pending read and unserviced read or write in the next cycle. The advance warning of the need for service permits the early assertion of a bus_request signal.

MULTICYC_INHIBIT is asserted by the address/data transfer logic 78 when a request is underway that requires the sustained and uninterrupted use of the bus.

Also as shown in FIG. 3, there are a number of bus control signals involved in the locking bus and arbitration protocol. A glossary follows:

LOCK_REQUEST- (62) is asserted by a processor when it wishes access to a bus lock and is not blocked from acquiring the lock for fairness reasons.

LOCK_HELD- (64) is asserted by a processor when it holds the bus lock.

BR3-, BR2-, BR1- and BR0- (61) are the four bus request lines associated with four respective processors. (A number other than four may also be chosen.)

ARB_INHIBIT_B- (63B) is asserted when the "B" level bus requesters are to be inhibited from bidding for the bus.

ARB_INHIBIT_A- (63A) is asserted when the "A" level bus requesters are to be inhibited from bidding for the bus.

The signal LOCK_ARB_ENAB is asserted and driven by the lock acquisition and request block 200 (72,74,76) to the bus arbitration block 200 (75) to indicate that a processor 52 request may proceed.

Figure 4:
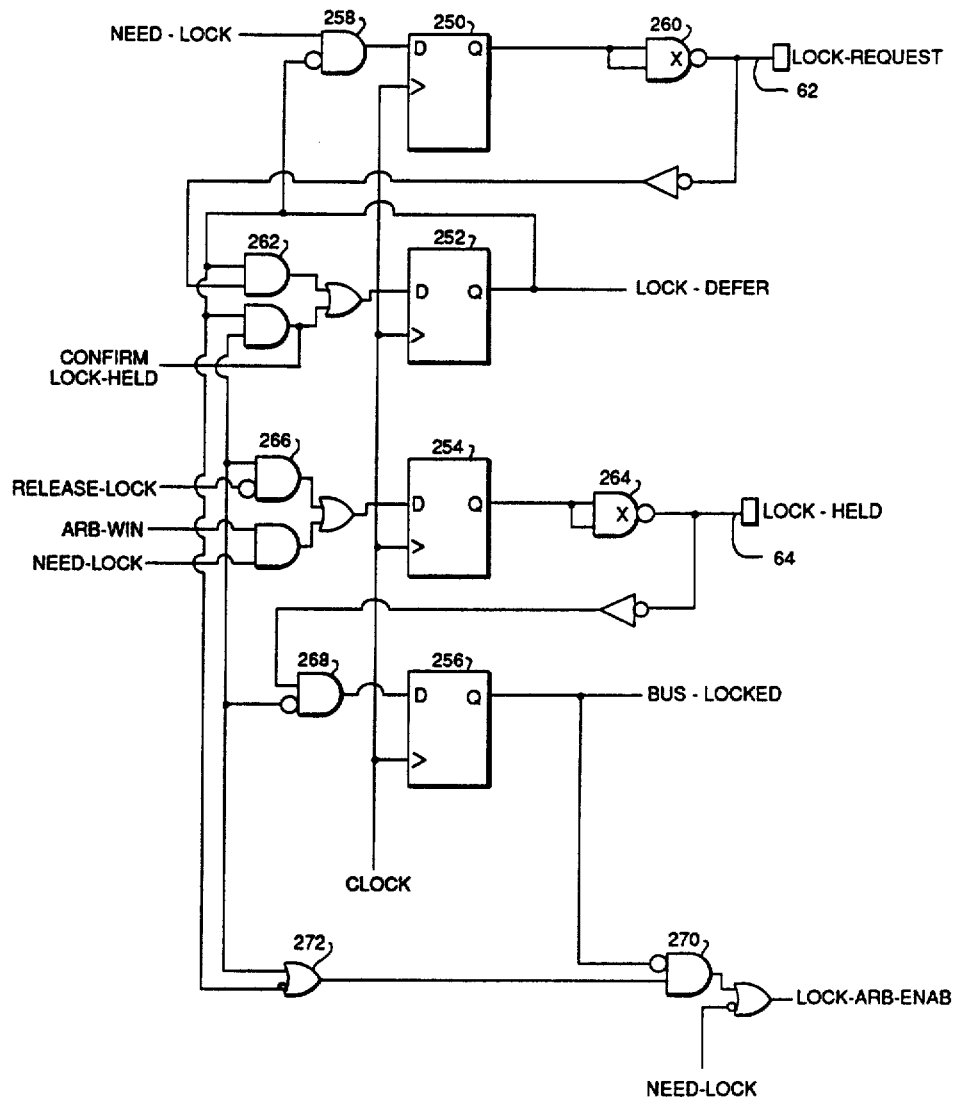
FIG. 4 is a schematic diagram having further detail of the lock acquisition and requesting blocks 74 and 72 of the embodiment of FIGS. 1 and 2.

The lock arbitration and request block 200 is shown in more detail in FIG. 4. There are four state elements: 250, 252, 254 and 256, which drive and interpret the bus control signals LOCK_REQUEST- 62 and LOCK_HELD- 64. When a processor, or other device on the bus requires a bus lock, it asserts the signal NEED_LOCK. NEED_LOCK will cause the state element 250 to be set if not inhibited from doing so by state element 252 via gate 258. If element 250 is set, gate 260 will drive the open collector signal LOCK_REQUEST- 62 on the backplane. NEED_LOCK is assumed to be deasserted when the processor has been granted access to the bus so that the request is withdrawn at the correct time. State element 252 inhibits the assertion of LOCK_REQUEST- if this processor had once held the bus lock during the duration of time when LOCK_REQUEST- had been uninterruptively asserted, providing the basis for the fairness in the acquisition of the bus lock. LOCK_DEFER prevents this processor from asserting the LOCK_REQUEST- signal, as well as preventing this processor from acquiring the bus as described in the next paragraph. This LOCK_DEFER situation as recorded in element 252 is set when the CONFIRM_LOCK_HELD signal is presented to gate 262. Gate 262 also sustains the LOCK_DEFER situation for the duration of the assertion by this processor of LOCK_HELD by state element 254 or for the uninterrupted assertion of the external LOCK_REQUEST- signal. The open collector signal LOCK_HELD- 64 is driven by gate 264 whenever state element 254 is set. The state element 254 is set when the processor is awarded the bus, i.e., ARB_WIN is asserted, and the processor needs the bus lock, i.e., NEED_LOCK is asserted. Gate 266 determines this. Gate 266 also sustains the lock holding until the RELEASE_LOCK signal is presented by the processor. State element 256 is set whenever the bus is locked for access by another processor. Gate 268 determines this situation by noting that the LOCK_HELD- 64 signal is asserted, but the local lock holding state element 254 is not set. When element 256 is set, a lock requiring processor read cannot be allowed to proceed. This determination is made by the combination of the gates 270 and 272 and presented to the bus arbitration logic in the signal LOCK_ARB_ENAB. LOCK_ARB_ENAB is always set when the processor does not need the bus lock, i.e., NEED_LOCK is deasserted. Alternatively, LOCK_ARB_ENAB is set when the bus is not locked, i.e., state element 256 is not set and either of two conditions prevail according to gate 272. The first condition is simply that this processor already holds the bus lock, i.e., state element 254 is set. The second condition is that there is no lock acquisition fairness deference in effect, i.e., LOCK_DEFER driven by state element 252 is not asserted.

Figure 5:
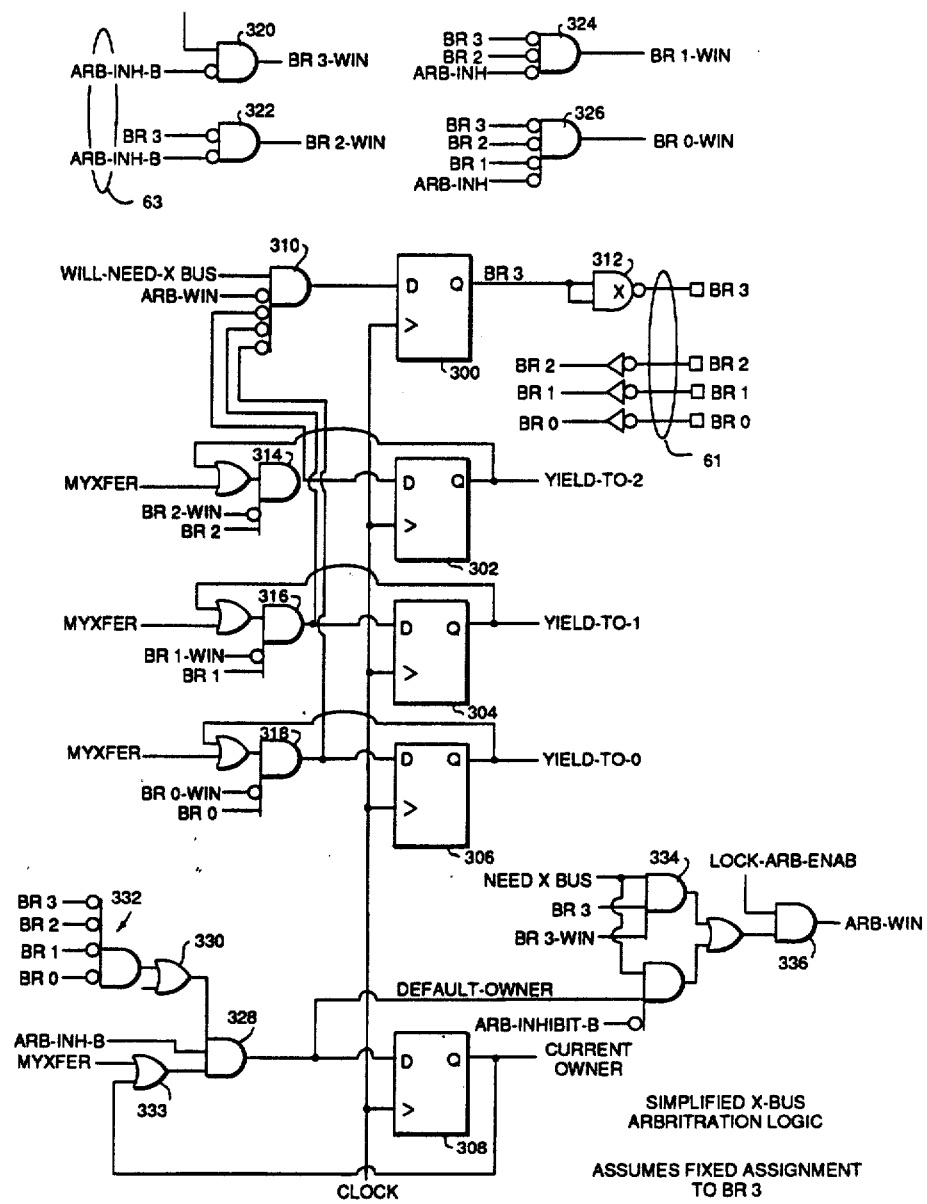
FIG. 5 is further detail of the bus arbitration block 75 of the bus interface of the embodiment of FIGS. 1 and 2.

The bus arbitration and request block is shown in more detail in FIG. 5. For purposes of simplicity, this block is drawn as if the processor was permanently fixed at bus request level 3. In the actual implementation, additional logic is present to permit the processor to request at any request level and can be provided according to the detail of FIG. 5. Also, the current implementation supports only 4 requesters, but there is no fundamental restriction in this number and a greater or lesser number may be accommodated. In the discussion to follow, "B level requesters" and "processors (52, 54, 56)" are to be considered synonymous. However, in other implementation that need not be so.

In FIG. 5, there are five state elements: 300, 302, 304, 306 and 308, which drive and interpret the five bus request signals 61 BR3-, BR2-, BR1-, BR0 and ARB_INHIBIT_B-. State element 300 is the bus request flipflop. State elements 302, 304 and 306 snapshot, i.e., sample the state of the other processor bus request signals to be used in the fairness deference algorithm of this processor. State element 308 reflects whether this processor is the default owner of the bus.

Gates 320, 322, 324 and 326 determine if one of the four processors may secure the bus in the next cycle. BR0_WIN is asserted by gate 326 if all higher priority requests (BR3, BR2 and BR1) are not asserted, and B level request arbitration is not inhibited, i.e., ARB_INHIBIT_B is not asserted. Similarly, BR1_WIN is asserted by gate 324, BR2_WIN by gate 322, and BR3_WIN by gate 320. The processor associated with request level three can only fail to win the bus if ARB_INHIBIT_B is asserted. ARB_INHIBIT_B- is asserted on the bus, by this processor or others, for one of two reasons. The first reason is that the current transfer requires multiple uninterrupted bus cycles. In that case, both ARB_INHIBIT_B- and ARB_INHIBIT_A- are driven by the address/data transfer block 78 to suspend all new arbitration for the bus. The second reason is that an "A" level requester wishes access to that bus. If any "A" level device requests the bus, that device must also drive the signal ARB_INHIBIT_B- to suspend all "B" level device arbitration. In this manner, "A" level devices are assured total priority over "B" level devices.

The bus request flipflop 300 is set when the processor wishes to use the bus, i.e., WILL_NEED_BUS is asserted, and the processor has not just secured the use of the bus, i.e., ARB_WIN is not asserted, and the processor is not deferring to any of the other three processors. This combination of events is determined by gate 310. Once flipflop 300 is set, gate 312 unconditionally drives the bus signal BR3- so that other processors may decide arbitration as well. Bus request deference is in effect if any of the three signals driven by gates 314, 316 or 318 are asserted. Conceptually, these gates are asserted if the associated bus request signal is currently asserted and the requestor will not be serviced next, or if the associated bus request signal had been asserted when this processor had last transferred on the bus and there has been no service granted since that time. Specifically, gate 314, for example, will be asserted if BR2 is asserted and BR2 will not be granted the bus in the next cycle, i.e., BR2_WIN is not asserted, and one of two conditions prevail. The first condition is that the current bus cycle is owned by this processor, i.e., MYXFER is asserted. The second is that the state element 302 is set. The state element 302 is set if the condition of BR2 asserted and BR2_WIN not asserted was true at the time of the last bus operation by this processor. This combination of conditions assures that a processor will not reacquire the bus twice in succession, thereby providing other bus requesters an opportunity to acquire the bus.

State element 308, CURRENT_OWNER, is set when this processor is the last one to transfer on the bus and the element remains set until another "B" level requester acquires the bus. Specifically, gate 328 will allow the element to be set if it is already set or the current transfer belongs to this processor (as decide by gate 333) and no other processor will acquire the bus in the next cycle. Other processors may not acquire the bus either because ARB_INHIBIT_B is asserted or because no other processor is requesting the bus. These events are combined in gate 330, with gate 332 detecting the absence of other "B" level requests.

Finally, ARB_WIN is asserted if this processor is granted access to the bus in the next cycle. Gate 336 drives the signal if there is the lock acquisition and request blocks 74 and 72 drive the LOCK_ARB_ENAB signal and the processor otherwise is awarded the bus. This condition assures that a processor will not get access to a locked bus if the processor also requires lock acquisition. Gate 334 decides whether the processor is otherwise awarded the bus. The processor may be so awarded for two reasons. In the first case, it is awarded the bus if the bus is needed (NEED_BUS), the associated bus request line is asserted (BR3), and the bus prioritization logic says there is no higher priority requester (BR3_WIN). The second situation is the one of default ownership. Again, the bus must be needed (NEED_BUS), there must be no ARB_INHIBIT_B. In effect, and this processor is the default owner as already decided by gate 328. Gate 334 responds to all of these events.

Modifications and substitutions of the present invention by one of ordinary skill in the art are considered to be within the scope of the present invention, which not to be limited except by the claims which follow.

APPENDIX I
CPU – XBUS INTERFACE SPECIFICATION
Andrew Milia
Rick Bahr
Revision: 1.1
This document contains confidential and proprietary information which is the sole property of Apollo Computer Inc. Its use is restricted to employees of Apollo Computer Inc.

CONTENTS

CHAPTER 1      OVERVIEW
  1.1  Major Responsibilities
  1.2  BIF Overall Block Diagram
  1.3  Bus Interconnect

CHAPTER 2      XBUS INTERFACE
  2.1    XBUS Arbitration
  2.1.1    Class A Request Override
  2.1.2    Class B/CPU Requesting
  2.1.3    Default Ownership
  2.1.4    Acquisition Timeout
  2.1.5    Local Request Prioritization
  2.1.6    Subsequent Request Arbitration Delay
  2.2    XBUS Reads
  2.2.1    Read Initiating
  2.2.1.1     Read Initiation Bypass
  2.2.2    Read Data Return
  2.2.3    Read Return Timeout
  2.2.4    Read Return Minimum Time
  2.2.5    Read Return Acknowledge
  2.3    XBUS Writes
  2.3.1    XBUS Write Multiple Limit
  2.3.2    XBUS Initial Write Hold Off
  2.3.3    XBUS Write Monitoring
  2.3.4    XBUS Writes To BIF CSR's
  2.3.5    XBUS Write Multiple Acknowledge
  2.4    XBUS Slave Response: CSR Access, Interrupt Posting
  2.4.1    XBUS Slave Response: CSR Read Return
  2.4.2    XBUS Slave Response: CSR Write Accept, Interrupt Posting
  2.5    XBUS TB Invalidates
  2.5.1    XBUS TB Invalidate Issuing
  2.5.2    XBUS TB Invalidate Accepting
  2.6    XBUS Locking
  2.6.1    XBUS Lock Acquisition and Release
  2.6.2    XBUS Lock Nesting
  2.6.3    XBUS Lock Duration Timeout
  2.6.4    XBUS Data Consistency Under Lock
  2.7    XBUS Request Retry
  2.7.1    XBUS Retry Holdoff
  2.8    XBUS Reject
  2.8.1    XBUS Write Order Assurance

CHAPTER 3    Data Cache Interface

- 3.1    Data Cache Read Miss
- 3.1.1    MMU Request to the BIF
- 3.1.2    Cacheable Data Read Miss
- 3.1.3    Uncacheable Data Read Miss
- 3.1.4    Load.Lock
- 3.1.5    Load.Unlock
- 3.1.6    Data Cache Read Data Return
- 3.1.6.1    Data Return Delay
- 3.1.6.2    Data Return Alignment
- 3.1.6.3    Data Cache Fill Data Sourcing / MEM_RESP
- 3.1.6.4    Data Cache Fill Parity Sourcing
- 3.1.6.5    Data Cache Fill Address Sourcing / BIF_PAARB BIF_INVOP
- 3.1.6.6    Data Cache Fill: MMU Tracking
- 3.1.7    Data Cache Read Miss Errors
- 3.1.7.1    External Invalidate Collision
- 3.1.7.2    Bus Acquisition Timeout
- 3.1.7.3    No Acknowledge
- 3.1.7.4    Error Acknowledge
- 3.1.7.5    Read Return Timeout
- 3.1.7.6    ECCU
- 3.1.7.7    ECCC
- 3.2    Data Cache Invalidates
- 3.2.1    Data Cache Invalidate Address Sourcing / BIF_PAARB BIF_INVOP
- 3.3    Data Cache Writes
- 3.3.1    MMU Request to the BIF
- 3.3.2    Cacheable Data Store
- 3.3.3    Uncacheable Data Store
- 3.3.4    Store.Unlock
- 3.3.5    Write Buffer Full
- 3.3.6    Data Cache Write Errors
- 3.3.6.1    Bus Acquisition Timeout
- 3.3.6.2    No Acknowledge
- 3.3.6.3    Error Acknowledge
- 3.4    TB Invalidates
- 3.4.1    Invalidates from the MMU
- 3.4.2    Invalidates from the MMU: Write Buffer Full
- 3.4.3    Invalidates from the MMU: Bus Errors
- 3.4.3.1    Bus Acquisition Timeout
- 3.4.3.2    Error Acknowledge
- 3.4.4    Invalidates to the MMU
- 3.4.4.1    External Selective TB Invalidate Address Format
- 3.4.4.2    External TB Invalidate Address Sourcing / BIF_PAARB BIF_INVOP

CHAPTER 4  Instruction Cache Interface

- 4.1 Instruction Cache Read Miss
- 4.1.1 MMU Request to the BIF
- 4.1.2 Instruction Cache Read Data Return
- 4.1.2.1 Instruction Return Delay
- 4.1.2.2 Instruction Return Alignment
- 4.1.2.3 Instruction Cache Fill Data Sourcing / MEM_RESP
- 4.1.2.4 Instruction Cache Fill Parity Sourcing
- 4.1.2.5 Instruction Cache Fill Address Sourcing / BIF_PAARB BIF_INVOP
- 4.1.2.6 Instruction Cache Fill MMU Tracking
- 4.1.3 Instruction Stream Writes
- 4.1.4 Instruction Cache Read Miss Errors
- 4.1.4.1 External Invalidate Collision
- 4.1.4.2 Bus Acquisition Timeout
- 4.1.4.3 No Acknowledge
- 4.1.4.4 Error Acknowledge
- 4.1.4.5 Read Return Timeout
- 4.1.4.6 ECCU
- 4.1.4.7 ECCC
- 4.2 Instruction Cache Invalidates
- 4.2.1 Instruction Cache Invalidate Address Sourcing /BIF_PAARB BIF_INVOP

CHAPTER 5  Invalidate Pipeline

- 5.1 Duplicate Tag Stores
- 5.1.1 DTS Addressing
- 5.1.2 DTS Contents
- 5.2 DTS Functional Overview
- 5.3 DTS Lookup
- 5.3.1 DTS Lookup: Write
- 5.3.2 DTS Lookup: Write Multiple
- 5.3.3 DTS Lookup Hit Processing
- 5.4 DTS Allocate from Processor Writes
- 5.4.1 DTS Allocate: Write
- 5.4.2 DTS Allocate: Write Multiple
- 5.5 DTS Allocate from Read Response

CHAPTER 6  Write Pipeline

- 6.1 Write Buffer Overview
- 6.1.1 FIFO Organization
- 6.2 Write Address/Data Staging
- 6.3 Write Queue Contents
- 6.4 Write Queue Loading
- 6.4.1 Load Merge
- 6.4.2 Write Buffer Full
- 6.5 Write Queue Unloading
- 6.5.1 Transmit Bypass 6.5.2 Transmit Retry
6.5.3 Write Multiple Collapse
6.6 Read Around Write
6.7 Write Parity CHAPTER 7     Registers
7.1 Interrupt Posting
7.2 Interrupt Control Register
7.2.1 Non Maskable Interrupt
7.3 Interrupt Summary Register
7.4 Bus Control Register
7.5 Bus Error Address
7.6 BIF Buried State
7.6.1 Board ID
7.6.2 Arbitration Level
7.6.3 Write Multiple Inhibit
7.6.4 Write Merge Inhibit
7.6.5 Read Before Write Inhibit
7.6.6 Write Holdoff Inhibit
7.6.7 Instruction Cache Parity Inhibit
7.6.8 Data Cache Parity Inhibit
7.6.9 DTS Parity Inhibit
7.6.10 Force Parity Sense
7.6.11 DTS Parity Error
7.6.12 Instruction Cache Parity Error
7.6.13 Data Cache Parity Error
7.6.14 X-BUS Overlap Control
7.6.15 Retry Backoff Inhibit
7.6.16 Read Response Error
7.6.17 Arbitration Timeout
7.6.18 Read Return Timeout
7.6.19 Error Acknowledge
7.6.20 DTS RAM Diagnostic Address Generation
7.6.21 DTS Diagnostic Data Generation Control
7.6.22 DTS Diagnostic Data Writing Control
7.6.23 DTS Diagnostic Error
7.6.24 Cache Diagnostic Data Generation Control
7.6.25 Cache Diagnostic Data Writing Control
7.6.26 Cache Diagnostic Error
7.7 IP Trapping CHAPTER 8     Cache Parity
8.1 Instruction Cache Data Parity
8.1.1 Instruction Parity Checking
8.1.2 Instruction Parity Generation
8.2 Data Cache Data Parity 8.2.1 Parity Checking
8.2.2 Parity Generation
8.2.3 Secondary TB Data Parity
8.3 Instruction Cache Duplicate Tag Store Parity
8.3.1 Parity Checking
8.3.2 Parity Generation
8.4 Data Cache Duplicate Tag Store Parity
8.4.1 Parity Checking
8.4.2 Parity Generation

CHAPTER 9    RAM Selftest
9.1 DTS RAM Diagnosis
9.1.1 DTS Address Generation
9.1.2 DTS Data Generation
9.1.3 DTS Data Writing
9.1.4 DTS Data Comparison
9.2 Cache Data RAM Diagnosis
9.2.1 Cache RAM Address Generation
9.2.2 Cache RAM Data Generation
9.2.3 Cache Data Writing
9.2.4 DTS Data Comparison
9.3 Cache Tag RAM Diagnosis
9.4 Secondary TB Data RAM Diagnosis

Appendix A    Pin Definition
A.1 X-Bus Interface
A.2 MMU Interface
A.3 IP Interface
A.4 Duplicate Tag Store Interface
A.5 Cache Interface
A.6 CBA-CBD Control
A.7 Miscellany
A.8 Pin Count Summary

Appendix B    Signal Timing

Appendix C    BIF CBA/CBD Block Diagram

```
Printed on:       Tue Oct 18 11:22:32 1988
Last saved on:    Mon May  9 14:45:53 1988
Document:         cover
For:              bahr.adv_tech.r_d.357 at (0 0 cc)
window (0 0 0)
imagesize (0 0)
imagespace (0 0 0 0)
prerasterization off
stroke 2
autoCRLF off
CRisCRLF off
LFisCRLF off
jamResistance on
pageReversal off
pageCollation off
jobHeader on
copies 1
language imPRESS System Version 3.2 Rev B, Serial #87:3:1040

Page images processed: 1
Pages printed: 1

Paper size (width, height):
  2560, 3328
Document length:
  10665 bytes
```

CHAPTER 1

OVERVIEW

1.1 Major Responsibilities

The AT CPU X-Bus Interface, BIF, attaches the processor's instruction and data caches to the system backplane bus. The principal functions of the BIF unit are:

- o to support the X-Bus reads necessary to fill the instruction and data caches.

- o to queue and deliver processor stores to the X-BUS, isolating the CPU from X-BUS write latencies.

- o to act as a bus watcher and ensure cache coherency in the face of external stores.

- o to act as a clearing house for system communications to and from the CPU such as interrupts.

- o to maintain and check CPU cache data parity.

In addition, the BIF provides much of the support logic for the self test of the CPU cache RAM's.

1.2 BIF Overall Block Diagram

The CPU's bus interface is composed principally of 3 gate arrays. The bus interface logic also includes the instruction and data cache duplicate tag stores, the X-BUS interface transceivers, and some supporting tristate drivers.

The address gate array, CBA, handles outgoing and inbound address transfers. Outgoing address transfers occur for instruction and data cache read issue, and for data cache write issue. Inbound address transfers are required for cache entry invalidation caused by external writes, and for cache miss filling. The CBA gate array also maintains the duplicate tag stores and handles all bus watching. Finally, the CBA gate array accepts and forwards interrupt requests to the processor.

The data gate arrays, CBD's, are identical. One is assigned responsibility for the transfer of even bytes, and the second is assigned the transfer of odd data bytes. The CBD gate arrays queue and forward write data, and return read data. The CBD gate arrays check and maintain the cache parity.

The following processor block diagram roughly illustrates this partition. A comprehensive block diagram of the gate array logic alone can be found in Appendix C.

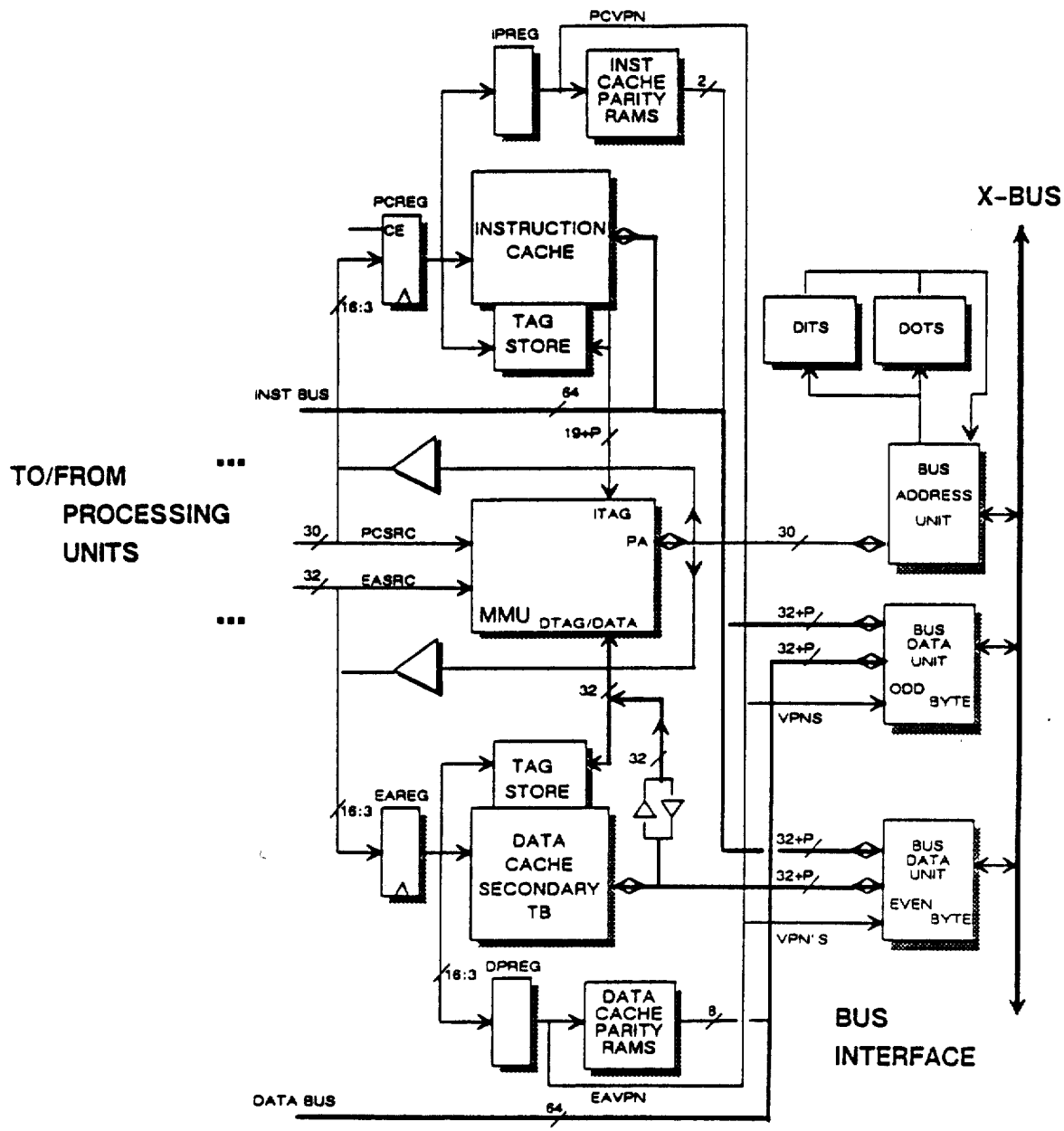

1.3 Bus Interconnect

The CPU's bus interface accepts and returns processor addresses from the *PA, EASRC, PCSRC,* and *VPN* bus's. The BIF also accepts and returns data from the processor *INST* and *DATA* bus's. The X-Bus is the path to main memory used by the BIF.

For a *data cache read miss,* the physical address is provided to the BIF by the MMU over the PA bus. The accompanying VPN is captured by the BIF directly from the EAVPN bus. When the cache fill begins, the cache index is supplied by the BIF to the EASRC bus over the PA bus. The memory data is supplied directly to the cache DATA bus.

For an *instruction cache read miss,* the physical address is provided to the BIF by the MMU over the PA bus. The accompanying VPN is captured by the BIF directly from the PCVPN bus. When the cache fill begins, the cache index is supplied by the BIF to the PCSRC bus over the PA bus. The memory data is supplied directly to the cache INST bus.

For a *data cache write*, the physical address is provided to the BIF by the MMU over the PA bus. The accompanying VPN is captured by the BIF directly from the EAVPN bus. The store data has previously been captured by the BIF directly from the DATA bus.

When an external write requires the purging of a local cache entry, the *invalidate* address is supplied by the BIF to the MMU over the PA bus.

CHAPTER 2             XBUS INTERFACE

2.1 XBUS Arbitration

All X-Bus interfaces except the default owner must request the bus prior to use. There is one bus request level on the backplane per X-Bus device. Devices are grouped into two classes. Class A devices are awarded the bus in strict priority order. Class B devices participate in fair arbitration and may also be default bus owners. CPU's are class B devices.

Bus arbitration is decentralized. Every bus interface decides for itself whether it has won access to the X-Bus.

Bus arbitration can be inhibited by the assertion of the *arb inhibit* backplane signal. Only the current owner of the bus may assert *arb inhibit*. The current owner will do so if the intended bus transfer requires multiple cycles.

2.1.1 Class A Request Override

If a class A device requests the bus, it will assert both its assigned request level and the *bus request sum* line on the bus. When the BIF detects the assertion of *bus request sum* in an active bus arbitration cycle, the BIF will defer to the class A device(s).

2.1.2 Class B/CPU Requesting

The class B devices, the four CPU's, also have a fixed priority assignment. Potential assignments are 0 through 3, with 3 being the highest priority. The assignment is scanned into the BIF and is used to determine which of the four *class B request* parallel backplane signals this particular CPU is to use. The CPU will drive its assigned level, and defer to requestors at higher levels.

Fair arbitration is approximated by class B devices agreeing not to reassert their request lines on demand. Rather, a class B device will snapshot all other *lower priority* class B request lines in the final cycle of a bus ownership. The class B device will then relinquish the bus and not reassert a request line until all the snapshotted requests are satisfied. The class B device determines the other requestors have been serviced by observing the current state of the other request lines. If a request line is deasserted, service is underway or completed. If a request line is still asserted, but arbitration is enabled and that requestor will win, service is presumed.

2.1.3 Default Ownership

When the bus is otherwise idle, the last successful bidder among the class B requestors is also established as the default bus owner. The default bus owner may use the bus at the end of any cycle in which *no other* request line was asserted. The default bus owner does not have to assert its assigned request line. The default remains in effect until another class B device wins the bus.

A class B device's bus ownership may be "suspended" by a class A device. If a class A device assumes control of the bus, the class B device that was the former owner waits for the bus to again become idle. The class B devices then reclaims bus ownership; i. e., the class B device reassumes the ownership in the cycle following one in which arbitration was permitted, but no request line was asserted. If another class B device wins the bus before the bus becomes idle, default bus ownership is transferred.

2.1.4 Acquisition Timeout

When a BIF first asserts a bus request line, it will start a timer. If the timer elapses before the bus is acquired, a bus acquisition timeout occurs. The bus timeout duration is approximately 3.2 milliseconds (16 bit counter). If a timeout occurs, the system is assumed broken and a clock freeze request is made of the SCR. The internal BIF state is preserved insofar as possible.

The timer is not stopped until either a NOACK or ACK acknowledge is received for the request address transfer. The timer will therefore expire if a device is continually busy. Broadcast transfers, such as TB invalidates will stop the timer regardless of the acknowledge line state.

The same timer is reused for read data return monitoring. See section 2.2.2.

2.1.5 Local Request Prioritization

Internal to the BIF are competing local requestors: data cache read, data cache write and instruction cache read. In general, data cache read will be prioritized over instruction cache read. In turn, instruction cache read will be prioritized over data cache write. There are exceptions.

- If the write data queue is full, data cache write is prioritized over instruction cache miss.

- If a data cache miss collides in address with a previously queued write, data cache write is given priority over both data and instruction cache miss.

- If a *write* to an *unencacheable* memory location is queued, data cache write is given priority over both data and instruction cache miss.

- If a *write* and *unlock* is queued, data cache write is given priority over both data and instruction cache miss.

- If a data cache *miss* from an *unencacheable* memory location is posted, data cache write is given priority over both data and instruction cache miss.

- If a data cache *miss* and *lock* is posted, data cache write is given priority over both data and instruction cache read.

- If a data cache *miss* and *unlock* is posted, data cache write is given priority over both data and instruction cache read.

- If a *tb invalidate* is queued in the write buffer, data cache write is given priority over both instruction and data cache miss.

A locally generated READ RESPONSE required for a BIF CSR read is given precedence over all other transmitters.

2.1.6 Subsequent Request Arbitration Delay

The BIF will issue subsequent requests from the data cache no more often than every other bus cycle. This is required to assure write order between processors, and read-write order within one. The instruction cache miss request is not restricted to every other cycle. In the cases of *load and lock*, *load and unlock*, and *store and unlock*, subsequent requests are not issued until a successful bus acknowledge of the prior request is received.

The BIF will issue subsequent requests from a CPU no more often than every other bus cycle. This is required to assure write order. It was an implementation convenience to apply it generally. In the cases of *load and lock*, *load and unlock*, and *store and unlock*, subsequent requests are not issued until a successful bus acknowledge of the prior request is received.

2.2 XBUS Reads

X-Bus reads are split into two parts: address transfer and data return. The BIF arbitrates for an address transfer to initiate a data or instruction cache miss. The bus interface then awaits data return. The BIF arbitrates for data return only when responding as a slave to a CSR read.

2.2.1 Read Initiating

When the BIF wins the bus, and decides that a read is the highest priority task, it will transfer the read address and issue either a READ or a READ MULTIPLE command. It will issue a READ command if the CPU request was less than or equal to 32 bits and was either unencacheable or would change the bus lock status. The BIF will issue a READ MULTIPLE command otherwise.

If the request was a READ, the byte mask accompanying the address will decide the exact request size.

If the request was a READ MULTIPLE, additional request information is provided in the address and data fields. The information is summarized in the next figure. The WE field will always be 01. The LL field will be 00 for a 64 bit read, 01 for a data cache normal fill, 10 for an instruction cache fill and 11 for an extended data cache fill. The LONGWORD COUNT field will be unused in processor requests.

XBUS READ MULTIPLE

```
63 62 61                                                      34 33 32
┌─┬─┬──────────────────────────────────────────────────────┬────┬───┐
│L│L│ PHYSICAL ADDRESS                                     │ W  │ E │
└─┴─┴──────────────────────────────────────────────────────┴────┴───┘
31                                                       08 07     00
┌────────────────────────────────────────────────────────┬──────────┐
│////////////////////////////////////////////////////////│ LONGWORD │
│////////////////////////////////////////////////////////│  COUNT   │
└────────────────────────────────────────────────────────┴──────────┘
```

| LL | | WE | |
|----|---|----|---|
| 00 | TRANSFER LENGTH = 2 LONGWORDS | 00 | USE LONGWORD COUNT, MODULO WRAP |
| 01 | TRANSFER LENGTH = 4 LONGWORDS | 01 | LENGTH SPECIFIED BY LL, MODULO WRAP |
| 10 | TRANSFER LENGTH = 8 LONGWORDS | 10 | USE LONGWORD COUNT |
| 11 | TRANSFER LENGTH = 16 LONGWORDS | 11 | LENGTH SPECIFIED BY LL |

There can be multiple reads outstanding on the X-Bus from a single CPU. In such a case, returning read data is distinguished by the subid field. Subid = x0 is used for the data cache. Subid = x1 is used for the instruction cache.

The read address is sourced by the CBA gate array, but the virtual page offset within segment, or *VPN*, is provided by the CBD ones. When the read address is transferred, the CBA gate array captures the associated *VPN* for subsequent use during cache fill and DTS update.

2.2.1.1 Read Initiation Bypass

When a read MMU command is being decoded by the BIF and there are no previous internal requests pending, the arriving PA will be forwarded immediately to the X-Bus outbound address register. If the BIF is the default bus owner, and no external bus requests are pending, and internal request initiation is not suspended for any reason, the read request will be initiated in the following bus cycle.

2.2.2 Read Data Return

After the BIF initiates a bus read, it waits for the return of read data. Several outcomes are possible: data returns as expected, data returns but is in error, and data fails to return.

The expected data return is either one (READ) or more (READ MULTIPLE) data transfers identified as READ RESPONSE's. The returning data will appear on the 64 bit bus aligned as if in memory: byte 000, if present, in bit positions 63:56 and so on. If multiple READ RESPONSE cycles are expected, they will either be immediately abutting or have intervening NOP's. If there are intervening NOP's, there will always be at least 2 such NOP's and *arb inhibit* will be asserted by the responder to prevent any intervening unrelated bus operations.

If bad data is returned, the accompanying command code will be READ RESPONSE ERROR. This may be caused by the detection of an uncorrectable ECC or parity error. It may also occur because of a bus timeout or address error in the responding device. No further data will be returned subsequent to a READ RESPONSE ERROR. A READ RESPONSE ERROR may occur in any cycle of a mutliple transfer read return bus sequence.

The last possible outcome for a read is for the read data to fail to return. This can only happen in the presence of a hardware failure.

2.2.3  Read Return Timeout

The failure of read data to return is detected by the expiration of the BIF's bus timer while a read request remains outstanding on the bus. This is the same timer used in bus acquisition timeout. As mentioned in section 2.1.4, the timer is started when any request is posted. If arbitration succeeds and a write or tb invalidate follows, the timer is stopped after receiving either an ACK or a NOACK acknoweldge. If arbitration succeeds and a read issue follows, the timer is continued. If the timer then expires before the last read data returns, a read return timeout occurs. If a timeout occurs, the system is assumed broken and a clock freeze request is made of the SCR. The internal BIF state is preserved insofar as possible.

If two reads are concurrently outstanding, the timer is restarted when read data return completes for each request. This may result in a somewhat longer timeout for the second read request.

If a second request, whether read, write or tb invalidate is issued while a read is outstanding, the timer is not stopped. This may result in a somewhat shorter bus acquisition timeout for these subsequent requests that will expire *coincidently* with the read data return timeout.

2.2.4  Read Return Minimum Time

The READ RESPONSE for a READ or READ MULTIPLE command must be no sooner than the first cycle after the acknowledge cycle for the address transfer. This is also the minimum time possible within the bus protocol except for default bus owners.

2.2.5  Read Return Acknowledge

The BIF will either successfully acknowledge, or error acknowledge, a READ RESPONSE addressed to it. If an error acknowledge is generated, the returning data will be forwarded as if correct to the data or instruction caches. Error status will be recorded in the embedded scan state and a clock freeze of the SCR will be requested.

2.3  XBUS Writes

When the BIF wins the bus, and decides that a write is the highest priority task, it will transfer the write address and data. Either a WRITE or a WRITE MULTIPLE command is sent. The BIF will issue a WRITE command if the data to transfer is less than or equal to 32 bits. The BIF will issue a WRITE MULTIPLE command if the data to transfer is 64 bits or more.

If the request was a WRITE, the data accompanies the address and the associated byte mask decides the exact request size.

If the request was a WRITE MULTIPLE, the address and transfer direction are sent in the first cycle. Bit 32 is 0 if the address is ascending, and bit 32 is 1 if the address is descending. The second and subsequent cycles transmit 64 bits of data accompanied by a WRITE DATA command. Note that all transfers begin and end on quadword boundaries.

2.3.1 XBUS Write Multiple Limit

The BIF will continually monitor its internal write address and data queue to determine if the next write data to transfer is an adjacent address quadword. If so, the write multiple will be sustained. To prevent excessive bus use by one processor, the BIF will stop a write multiple arbitrarily at every 256 byte boundary (32 transfers). Write multiple data will always be sent in immediately adjacent bus cycles.

No odd longword start, write multiples will be generated by the BIF.

2.3.2 XBUS Initial Write Hold Off

The BIF will not attempt to transfer write data as soon as the request is posted. Rather, the BIF will delay in anticipation that subsequent writes to adjacent addresses are likely. The request is finally posted only if one of the following conditions is true.

- If a second write to any address is queued.
- If the pending write was not encacheable.
- If the pending write would unlock the bus.
- If there is a pending data cache miss, which collides in address with the pending write.
- If there is a pending data cache miss that is unencacheable or would change the bus lock status.
- If the free running BIF counter overruns (safety measure).
- If the write is really a TB invalidate.

2.3.3 XBUS Write Monitoring

All X-Bus writes are monitored even if they are not directed to, or originated by, the local BIF. The BIF will determine if a copy of the data at the write address has been locally cached. If so, the BIF will schedule an invalidate of that cache entry. This relies upon the BIF maintaining duplicate tag stores and is detailed in chapter 5.

2.3.4 XBUS Writes To BIF CSR's

When the BIF detects a 32 bit write into its own register range, a WRITE MULTIPLE of 2 longwords is substituted for a WRITE command.

2.3.5 XBUS Write Multiple Acknowledge

The acknowledge for the WRITE MULTIPLE command will be OK only when the slave can accept at least the first 64 bits of data.

The acknowledge for the WRITE DATA command associated with a write multiple will be busy if the associated 64 bits of data cannot be accepted and must be retransmitted.

An error or no acknowledge for a WRITE DATA command will be interpreted as a busy acknowledge in order to preserve state. It is presumed the acknowledge driver will freeze the clocks.

2.4 XBUS Slave Response: CSR Access, Interrupt Posting

The BIF holds 5 operationally available registers: ERRADDR, BCTRL, ICTRL, PTIMER, and ISUM. The registers are detailed in chapter 7. Access to these registers is over the X-Bus. In addition, the BIF posts interrupts to the local processor in response to bus writes.

The addresses to which the BIF responds as a slave device follow.

BIF REGISTER ADDRESSES

00pp 0200: Interrupt Summary Register (ISUM)
00pp 0208: Interrupt Control Register (ICTRL)
00pp 0210: Bus Control Register (BCTRL)
00pp 0218: Bus Error Address Register (ERRADDR)
00pp 0220: Process Timer (PROC_TIMER)

00pp 0100
 - 00pp 013C: Interrupt Posting Addresses

PP = PROCESSOR NUMBER

2.4.1 XBUS Slave Response: CSR Read Return

The BIF will decode all incoming read requests. If the address matches one alotted to the interface, 32 bits of read data will be returned. The data will be returned in bit positions 63 through 32.

The CIF will sometimes delay register read data response so that the read data will be returned no sooner than the fourth cycle *after* the one that provided the read address. This is only necessary when the BIF is the default bus owner.
The BIF will give a busy response when a second X-Bus read request arrives for a register which has an X-BUS read underway. Otherwise, all read requests will be accepted.

The BIF will give a no response when if the read request is for other than 32 bits.

2.4.2 XBUS Slave Response: CSR Write Accept, Interrupt Posting

The BIF will decode all incoming write requests. If the address matches one allotted to the interface, the request will be acknowledged.

If the address is one of the interrupt posting locations, a WRITE command is expected. The data and byte mask are not interpreted.

If the address is one of the accessible CSR's, a WRITE MULTIPLE command is expected. A request length of 1 or 2 longwords is expected with the data provided in bit positions 63 through 32 of the first WRITE DATA command. This is necessary because of the positioning of the CSR registers in the CBA IC.

The BIF will give a busy acknowledge when an X-Bus write request of any type arrives for a register which has an X-BUS read underway.

The BIF will give an error acknowledge when it detects a parity error in a write data. A WRITE MULTIPLE to an interrupt posting address, or a simple WRITE directed at a CSR will also generate an error acknowledgement. In either case, embedded state will be set and a clock freeze request to the SCR generated.

2.5 XBUS TB Invalidates

The local processor can issue TB invalidates for broadcast over the X-Bus. The BIF accepts, queues and delivers to the X-Bus TB invalidates as if they were writes.

2.5.1 XBUS TB Invalidate Issuing

The BIF will transmit TB invalidate requests accompanied by the comands INVAL TB SEL and INVALIDATE TB. If the former command is issued, the address field can be assumed to hold the virtual page address of the entry to be invalidated. The virtual page number, address bits 31 through 12, can be found on the bus in bit positions 63 through 44.

No acknowledge is expected or awaited upon the issue of a TB invalidate command.

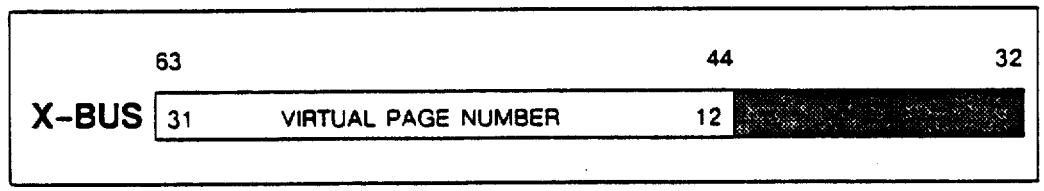

*The Virtual Page Number is transferred on X-BUS bits 63:44 during INVAL TB SEL and INVALIDATE TB commands.*

2.5.2 XBUS TB Invalidate Accepting

The BIF will unconditionally accept all X-BUS TB invalidate requests and forward them to the MMU through the invalidate queueing mechanism. Chapter 5 provides additional explanation.

2.6 XBUS Locking

The BIF accepts *load lock*, *load unlock* and *store unlock* command from the MMU. When *load lock* completes successfully, that CPU can be assured of holding the *bus lock* until the CPU explicitly releases the lock or an error arises. Only one CPU at a time may hold the bus lock and that, in turn, permits the construction of critical code sections in a multiple processor environment.

Because the holding and release of the bus locks spans many bus cycles, a method for assuring fairness among cpu's in acquiring the bus lock is also implemented.

2.6.1 XBUS Lock Acquisition and Release

The BIF will secure the bus lock only when a *load lock* data cache miss is successfully issued and acknowledged on the X_BUS. In more detail, first the data cache miss which seeks the bus lock is posted. This request will push ahead of itself all previously queued up writes. When the lock request is next to be serviced, the current states of the external bus *lock* and *lock_request* signals are examined. If *lock* is already asserted by another CPU, the arbitration is deferred. If arbitration is deferred for this reason, the CPU will assert the *lock_request* signal and await the deassertion of *lock*. The arbitration may also be deferred if this is the second acquisition of the bus lock by the same CPU without an intervening deassertion of the *lock request* signal. This lock request *deferral* assures fair access to the bus lock among all competitors. If the bus lock is available and there is no need for lock request deferrence, arbitration is attempted. If the bus *lock* signal is subsequently asserted before the BIF gains access to the X-Bus, the BIF will withdraw from further arbitration and drive the *lock_request* signal. When the bus is finally secured, both the *arb inhibit* and *lock* signals are simultaneously asserted. *Arb inhibit* remains asserted for 3 cycles which is sufficient time for all other bus interfaces to see the *lock* signal asserted and to withdraw from arbitration if they too plan to secure the bus lock. At the end of 3 cycles, the locking BIF will also examine the state of the acknowledge signals. If other than a successful acknowledge is detected, the bus lock is immediately released. If released, the *lock* signal is deasserted at the end of the cycle following the acknowledge. In all cases, the bus *lock_request* signal is defeated in the first cycle after the *lock* signal is generated.

The BIF will release the bus lock when a *load unlock* or a *store unlock* is successfully issued and acknowledged. Alternatively, the lock is released upon an error in the local processor. A local processor error is assumed to result in a processor trap, and the signal *trap dispatch* is therefore used to unconditionally release the bus lock. In more detail, first the data cache read or write which seeks to release the bus lock is posted. This request will push ahead of itself all previously queued up writes. At the end of 3 cycles, the locking BIF will also examine the state of the acknowledge signals. If other than a successful acknowledge is detected, the bus lock is retained. Otherwise, the *lock* signal is deasserted at the end of the cycle following the acknowledge.

If a lock request is REJECT'd by the BIF, the lock signal and *arb inhibit* are immediately released. Similarly, if an unlock request is REJECT'd by the BIF, the lock is retained if held. Section 2.8 describes the use of the signal REJECT.

2.6.2 XBUS Lock Nesting

It's possible for the MMU to request the bus lock for PMAPE update while the BIF is already in possession of the bus lock. For this reason, a second *load lock* request will be accepted. If two bus lock requests have been accepted, two bus unlock requests will need to follow before the lock will really be released. In effect, the BIF nests bus lock requests two levels.

2.6.3 XBUS Lock Duration Timeout

The BiF starts a timer when the bus lock is first acquired. The timer remains running so long as the BIF holds the bus lock. If the timer expires before the lock is released, a lock timeout trap is posted. The timer duration is approximately 200 microseconds (12 bit counter).
If a timeout trap occurs, the BCTRL register indicates so. The BCTRL register is described in chapter 7.

If a second lock setting request is processed before a held lock is released, the timer is not reset. This results in a somewhat shorter timeout for the second request.

If an unlock request is being transferred upon the X-Bus, the BIF refrains from arbitration for a new lock request for at least five cycles including the transferring one. This delay assures that there will always be two cycles of delay between the release of a lock and its reacquisition by the same BIF.

2.6.4 XBUS Data Consistency Under Lock

The BIF guarantees that once a lock has been acquired that all writes on the bus that preceded the *load lock* transfer have successfully invalidated the cache. This is a natural outcome of an X-Bus READ command requiring at least 4 cycles before the READ RESPONSE command will be seen.

2.7 XBUS Request Retry

The BIF will retry any request that receives a BUSY acknowledge. The retry will continue until the bus timeout expires.

If an address transfer receives a BUSY acknowledge, the request is marked as *in retry*. There can be as many as three requests in retry at any one time. Retry requests receive no different priority treatment than was outlined in section 2.1.5 other than following retry holdoff.

2.7.1 XBUS Retry Holdoff

If a request is *in retry*, it is not immediately posted to the bus. The minimum request spacing for a retry is 5 cycles: 3 to make the original transfer and await the acknowldge, 1 to mark the request as *in retry*, and 1 to rearbitrate for the bus.

2.8 XBUS Reject

Two successive bus address transfers may be issued by same the BIF in bus cycles spaced apart by only one NOP or foreign cycle. If the first request receives a busy acknowledge, the acknowledge is received only after the second request has been sent. In this case, the bus REJECT signal is immediately asserted. The REJECT signal is interpreted by the slave as nullifying the already accepted request. This use of REJECT assures that the order of transfers on the bus is retained. This is particularly important when the second request is a read for the same data that is being written by the first request.

When REJECT is asserted, the acknowledge for the second request is ignored.

When REJECT is asserted, all transaction side effects such as bus locking, do not take place.

2.8.1 XBUS Write Order Assurance

The use of REJECT in cooperation with the write order assurance of the write queue, guarantees that the write order of one CPU is always preserved as seen by a second CPU. This can permit some forms of multiprocessor synchronization without the need for bus locking.

CHAPTER 3   DATA CACHE INTERFACE

3.1 Data Cache Read Miss

Processor operand loads are usually satisfied by the data cache. A *data cache read miss* occurs when the data cache does not presently have the requested item. A cache read miss also occurs when the read request must be forwarded to the bus regardless of whether cached data is available. Typical of this latter situation is a read from an I/O control register.

Cache miss processing is the joint responsibility of the BIF and the MMU. The BIF sources the fill address and informs the MMU as the data RAM's are written.

3.1.1 MMU Request to the BIF

The read's 30 bit physical address is provided by the MMU on the PA bus. The MMU command accompanies the physical address.

The read's virtual page offset within segment, VPN, bits will be presented in advance of the physical address and command. Typically, the 7 bits are captured by the BIF from the external EA register every cycle. If a read miss occurs, the physical address and command will then arrive in the *following* cycle. If however, the PA bus is not available in this succeeding cycle, the MMU will assert the signal MMU_HOLD_DVPN. The BIF will hold the captured data cache VPN. MMU_HOLD_DVPN will be deasserted in the cycle in which the physical address and command are finally sent to the BIF.

There are quite a few commands that apply to data cache miss. They are summarized in the next table.

MEM_CMD[4:0]

| 00000 | NOP | 10000 | store.nolock.cache.1 |
|---|---|---|---|
| 00001 | load.nolock.cache.16 | 10001 | store.nolock.cache.2 |
| 00010 | fetch.nolock.cache.32 | 10010 | store.nolock.cache.4 |
| 00011 | load.nolock.cache.64 | 10011 | store.nolock.cache.8 |
| 00100 | load.nolock.nocache.1 | 10100 | store.nolock.nocache.1 |
| 00101 | load.nolock.nocache.2 | 10101 | store.nolock.nocache.2 |
| 00110 | load.nolock.nocache.4 | 10110 | store.nolock.nocache.4 |
| 00111 | load.nolock.nocache.8 | 10111 | store.nolock.nocache.8 |
| 01000 | load.lock.nocache.1 | 11000 | TB invalidate single |
| 01001 | load.lock.nocache.2 | 11001 | TB invalidate all |
| 01010 | load.lock.nocache.4 | 11010 | mmu_store.unlock.nocache.4 |
| 01011 | load.lock.nocache.8 | 11011 | unassigned |
| 01100 | load.unlock.nocache.1 | 11100 | store.unlock.nocache.1 |
| 01101 | load.unlock.nocache.2 | 11101 | store.unlock.nocache.2 |
| 01110 | load.unlock.nocache.4 | 11110 | store.unlock.nocache.4 |
| 01111 | load.unlock.nocache.8 | 11111 | store.unlock.nocache.8 |

3.1.2 Cacheable Data Read Miss

In the typical data cache miss, the MEM_CMD(4:0) field is either 00001, LOAD.NOLOCK.CACHE.16, or the field is 00011, LOAD.NOLOCK.CACHE.64. The first command requests a cache fill of 16 bytes. The second command requests a cache fill of 64 bytes. This second command is issued only if the cache miss is triggered by a 64 bit floating point load at an address boundary that is zero mod 64.

The address presented with the data is the IP's exact load address. Before forwarding to the X-Bus address bit 3 must be unconditionally zeroed if a 16 byte fill. Address bits 5, 4 and 3 will naturally be zero if a 64 byte fill. This is required by the fill algorithm which is natural order beginning at the nearest lower byte boundary that is 0 modulo the fill size. The address mask bits must be forced to all ones before transferring on the X-Bus.

3.1.3 Unencacheable Data Read Miss

A load may reference data that is marked *unencacheable*. Load data may be declared unencacheable for one of the following reasons.

- The PMAPE's C bit is set in the virtual address mapping tables.

- The memory reference address is a physical one because virtual translation is not enabled.

- The memory reference address is a physical one required for an MMU table walk.

- The memory reference address is a physical one caused by a *load.physical* instruction.

- The CPU's instruction is a *load.lock*, requiring access to the bus.

- The CPU's instruction is a *load.unlock*, requiring access to the bus.

The caching decision is made by the MMU and communicated in the MMU command field. All of the remaining data cache miss codes other than those just mentioned in the last section apply to unencacheable references.

In an unencacheable data cache miss, only the requested data is returned. The address presented with the MMU command is forwarded as is to the X-Bus, and the read mask is appropriately constructed to reflect the request size. If the request is for an 8 byte quantity, a read multiple of 2 longwords will result.

3.1.4 Load.Lock

The *load.lock* instruction requires access to the X-Bus to gain the bus lock. For this reason an unencacheable data miss is declared by the MMU. When the load.lock's data returns, the bus lock can be assumed to be secured.

The MMU may issue a second locking read request before a previously acquired lock is released. The MMU may do so while processing a secondary TB miss during a locked code sequence. The BIF will properly nest this second request.

3.1.5 Load.Unlock

The *load.unlock* instruction requires access to the X-Bus to release the bus lock. For this reason an unencacheable data miss is declared by the MMU. When the load.unlock's data returns, the bus lock can be assumed to be released.

This instruction may be issued even when the bus lock is not held. This instruction will not release a bus lock not held by this CPU.

3.1.6 Data Cache Read Data Return

Once the data cache miss read address is transferred across the bus, the BIF awaits read data response. When the requested data finally returns, it is forwarded to the DATA(63:00) bus. The data is then used by the IP, FP or MMU and is optionally stored in the cache. The cache updating is refered to as *filling*.

3.1.6.1 Data Return Delay

Normally, returning read data is forwarded to the DATA bus in the cycle immediately following the data transfer on the X-Bus. In some cases however, DATA bus forwarding is delayed one additional cycle. The cases are summarized.

- The X-Bus data returns in the same cycle that the EASRC bus is being used to process an invalidate. A data cache fill cannot take place in the next cycle because the EA will not hold the proper fill address.

- The X-Bus data returns in a cycle immediately after an instruction cache miss that required delayed data forwarding. The immediately abutting X-Bus data returns do not afford an opportunity to remove the instruction cache miss's delay. The instruction cache fill may collide in the use of the PC in the same manner as just described for EA's use during data cache fill.

- The data read request was unencacheable. In this case, the possible need to rotate the returning read data requires an additional cycle of delay.

The data return delay is not visible to the MMU in handshake protocol.

3.1.6.2 Data Return Alignment

If the data read request is unencacheable, and is for one longword or less, and the longword address is even, the returning read data will be duplicated on both halves of the cache data bus. This is required by the MMU which can access only DATA(31:00). In all other cases, the returning data will be aligned on the DATA bus as it appears on the X-BUS.

3.1.6.3 Data Cache Fill Data Sourcing / MEM_RESP

If the data cache read miss is for a 16 or 64 byte fill, the requested data is provided 8 bytes at a time on the X-BUS. The data is then forwarded 8 bytes at a time to the DATA bus and written simultaneously with the data being accepted by the IP or FP.

The BIF will begin driving returning X-Bus data before X-Bus Read Response data has arrived. The BIF will first drive the bus in the cycle after the data cache miss MEM_CMD has been driven by the MMU.

Simultaneously with the DATA bus driving, the MEM_RESP(2:0) field is sourced by the MMU. Typically, code 001 will be driven. Codes 100 and 101 will be driven in the event of bus error. The data cache filling is strictly slaved to the X-Bus timing and normally takes place in uninterrupted cycles. See ECCU/ECCC below for the exceptions to this.

MEM_RESP[2:0] - Data Cache Miss

| 000 | NOP |
|---|---|
| 001 | Dcache Data Return |
| 010 | Icache Data Return |
| 011 | undefined |
| 100 | Load ECCU |
| 101 | Load No Response |
| 110 | Fetch ECCU |
| 111 | Fectch No Response |

3.1.6.4 Data Cache Fill Parity Sourcing

The returning data parity is regenerated while the data is on the DATA bus. If the request was a 16 or 64 byte fill, the parity is written into the data cache parity RAM's in the following cycle. Byte parity is maintained in the data cache.

3.1.6.5 Data Cache Fill Address Sourcing / BIF_PAARB BIF_INVOP

If the data cache read miss is for a 16 or 64 byte fill, the fill index is sourced by the BIF on the PA bus. The BIF requests this use of the PA bus one cycle in advance of the address transfer (two cycles in advance of the DATA transfer) by asserting the BIF_PAARB(1:0) signals. BIF_PAARB = 01 requests the joint use of the PA bus and the EASRC bus in anticipation of data cache fill. If there are simultaneous instruction and data cache misses posted, BIF_PAARB = 11 will be asserted. This requests both the PCSRC and EASRC bus's in case either returns on the bus.

The BIF will begin requesting the PA bus before X-Bus Read Response data has arrived. The BIF will first make an arbitration request on the PAARB signals in the X-Bus acknowledge cycle for the miss read address transfer.

BIF_PAARB[1:0]

| 00 | NOP |
|---|---|
| 01 | Arbitrate for PA/EASRC : cache fill or invalidate |
| 10 | |
| 11 | Arbitrate for PA/EA/PCSRC : cache fill or invalidate |

The BIF sources the 13 bit fill index on PA(15:03) one cycle in advance of the DATA transfer. Simultaneously, the BIF requests the *setting* of the data cache tag's 8 VALID bits in that next cycle by deasserting the BIF_INVOP[1:0] signals. BIF_INVOP = 00 implies setting the valid bits.

| | | |
|---|---|---|
| 000 | 0 | NOP |
| 001 | 1 | RESET VALID BITS |
| 010 | 2 | Selective TB Invalidate |
| 011 | 3 | Comprehensive TB Invalidate |
| 100 | 4 | Fill |
| 101 | 5 | Diagnostic Fill |
| 110 | 6 | *undefined* |
| 111 | 7 | *undefined* |

3.1.6.6 Data Cache Fill: MMU Tracking

While the BIF sources both the data and fill address, the RAM strobes and tag contents are provided by the MMU. The MMU does so in response to the BIF_PAARB and BIF_INVOP signals. The BIF sources these signals without knowing about return data availability. The BIF informs the MMU that data has been written only after the fact, by means of the MEM_RESP(2:0) signals.

The MMU guesses that the fill will be complete *next* cycle when the final fill entry index is on the PA bus and there is no request on the BIF_PAARB signals. If for some reason the fill does not complete in this cycle, both the MMU and BIF backup and try again. The MMU recognizes this situation by observing that the MEM_RESP field is 000 (NOP) in the cycle which should have been the last RAM data write.

3.1.7 Data Cache Read Miss Errors

Quite a few errors are possible in the course of processing a data cache read miss. They are summarized in this section.

3.1.7.1 External Invalidate Collision

In the interval between the read address transfer on the X-Bus and the read data return, a write to the returning data from another CPU is possible. The BIF watches for this situation and detects any write-read collision on the same physical page. If a collision is detected, the BIF_INVOP signals are asserted rather than deasserted in the cycle before the data cache write. BIF_INVOP = 01 will reset the tag's 8 valid bits.

BIF_INVOP[1:0]

| | |
|---|---|
| 00 | NOP |
| 01 | Reset Data/Inst Tag Valid Bits |
| 10 | |
| 11 | |

This write-read collision detection applies only to an external write. A locally generated write will only be issued on the X-Bus subsequent to a data cache read if the write was generated earlier in time, and the write does not conflict in address with the read.

3.1.7.2 Bus Acquisition Timeout

If the bus acquisition timer elapses before the data cache read gains access to the bus, a hardware failure is presumed. The BIF requests the clocks to stop and records this error status in scan state. The BIF continues to arbitrate for the bus.

3.1.7.3 No Acknowledge

If the data cache miss address transfer results in no bus acknowledge, a software failure is presumed. The BIF records this error status in the BCTRL register and freezes the ERRADDR register. The BIF returns a LOAD_NO_RESPONSE code, 101, on the MEM_RESP(2:0) signals.

3.1.7.4 Error Acknowledge

If the data cache miss address transfer results in an error bus acknowledge, a hardware failure is presumed. The BIF records this error status in scan state. The BIF otherwise acts as if it was a busy acknowledge to preserve state.

3.1.7.5 Read Return Timeout

If the read return timer elapses before the data cache read data completely returns, a hardware failure is presumed. The BIF requests the clocks to stop and records this error in the scan state. The continues to await read return data.

3.1.7.6 ECCU

A device error may prevent correct data return. The most common such error is a main memory ECCU. This same situation will also occur when a secondary bus gets a read timeout.

When only incorrect data can be returned, a READ RESPONSE ERROR command will be returnedd on the X-Bus. The BIF, in turn, will terminate the transfer. The MMU_RESP(2:0) code LOAD ECCU, 100, will be sent to the MMU.

If the READ RESPONSE ERROR occurs as one response in a READ MULTIPLE, no further response data will be accepted from the X-BUS.

3.1.7.7 ECCC

A correctable data error can occur upon access to main store. If this happens in an unencacheable reference, it is not visible to the MMU. If this happens in a 16 or 64 byte fill, this may result in the interpositioning of NOP's within the returning X-BUS read data. When a NOP interrupts this sequence, there will always be at least 2 NOP's present.

When the NOP interrupts the fill sequence, incorrect data is written to the RAM's. The BIF then *backs up* the fill address by eight bytes, awaits the corrected data, and rewrites the RAM location.

When the NOP arrives instead of the last 8 bytes of read return data, there is an additional complication in that the BIF may have relinquished control of the PA bus. The MMU will recognize this situation and hold the processor stall. The BIF rearbitrates for the PA and EASRC buses, then sources the last fill address and waits for corrected data. The need to arbitrate, then resupply the former fill address requires the two NOP's.

If a data returning X-Bus sequence is interrupted by NOP's, the responder will assert *arb inhibit* to prevent another party from gaining access to the bus. In consequence, the BIF does not have to be prepared to handle external invalidates or instruction cache read data response during such an interruption.

3.2 Data Cache Invalidates

Data cache invalidates may be posted from the BIF to the data cache. The overall sequencing of data cache invalidate is described in chapter 5.

3.2.1 Data Cache Invalidate Address Sourcing / BIF_PAARB BIF_INVOP

The BIF provides only the invalidate index for the cache location to be purged. The address is transferred over the PA bus. The BIF requests this use of the bus one cycle in advance of the address transfer (two cycles in advance of the tag invalidate) by asserting the BIF_PAARB(1:0) signals. BIF_PAARB = 01 requests the joint use of the PA bus and the EASRC bus. BIF_PAARB = 11 requests the joint use of the PA bus, EASRC bus and PCSRC bus. This code is used if both caches are to be invalidated.

BIF_PAARB[1:0]

| 00 | NOP |
|----|-----|
| 01 | Arbitrate for PA/EASRC : cache fill or invalidate |
| 10 | Arbitrate for PA/PCSRC : cache fill or invalidate |
| 11 | Arbitrate for PA/EA/PCSRC : cache fill or invalidate |

The 13 bit invalidate index will be on PA(15:03) one cycle in advance of the tag RAM write. Simultaneously, the BIF requests the *clearing* of the data cache tag's 8 VALID bits in that next cycle by asserting the BIF_INVOP[1:0] signals. BIF_INVOP = 01 will reset the tag's 8 valid bits.

BIF_INVOP[2:0]

| 000 | 0 | NOP |
|-----|---|-----|
| 001 | 1 | RESET VALID BITS |
| 010 | 2 | Selective TB Invalidate |
| 011 | 3 | Comprehensive TB Invalidate |
| 100 | 4 | Fill |
| 101 | 5 | Diagnostic Fill |
| 110 | 6 | *undefined* |
| 111 | 7 | *undefined* |

3.3 Data Cache Writes

Processor store data is both written to the data cache and forwarded to the X-Bus. This *write through* cache strategy requires the BIF to handle processor writes effectively.

Unlike reads, the CPU does not wait for a write request completion. The BIF simply queues the write data and address. This decouples the CPU from X-BUS acquisition latency.

3.3.1 MMU Request to the BIF

The write's 30 bit physical address is provided by the MMU on the PA bus. The MMU command accompanies the physical address.

The write's virtual page offset within segment, VPN, bits will be presented in advance of the physical address and command. Typically, the 7 bits are captured by the BIF from the external EA register every cycle. If a write occurs, the physical address and command will then arrive in the *following* cycle. If however, the PA bus is not available in this succeeding cycle, the MMU will assert the signal MMU_HOLD_DVPN. The BIF will hold the captured data cache VPN. MMU_HOLD_DVPN will be deasserted in the cycle in which the physical address and command are finally sent to the BIF.

Properly aligned write data will also be presented in advance of the physical address and command. Typically, the 64 bits are captured by the BIF from DATA bus directly every cycle. Again, the physical address and command will arrive in the *following* cycle. If however, the PA bus is not available in this succeeding cycle or a *write buffer full* stall is in effect, the MMU will deassert the signal MMU_HDATA_LD. The BIF will hold the captured data. MMU_HDATA_LD will be reasserted in the cycle in which the physical address and command are finally sent to the BIF.

There are quite a few commands that apply to data cache write. They are summarized in the next table.

MEM_CMD[4:0]

| | | | |
|---|---|---|---|
| 00000 | NOP | 10000 | store.nolock.cache.1 |
| 00001 | load.nolock.cache.16 | 10001 | store.nolock.cache.2 |
| 00010 | fetch.nolock.cache.32 | 10010 | store.nolock.cache.4 |
| 00011 | load.nolock.cache.64 | 10011 | store.nolock.cache.8 |
| 00100 | load.nolock.nocache.1 | 10100 | store.nolock.nocache.1 |
| 00101 | load.nolock.nocache.2 | 10101 | store.nolock.nocache.2 |
| 00110 | load.nolock.nocache.4 | 10110 | store.nolock.nocache.4 |
| 00111 | load.nolock.nocache.8 | 10111 | store.nolock.nocache.8 |
| 01000 | load.lock.nocache.1 | 11000 | TB invalidate single |
| 01001 | load.lock.nocache.2 | 11001 | TB invalidate all |
| 01010 | load.lock.nocache.4 | 11010 | mmu_store.unlock.nocache.4 |
| 01011 | load.lock.nocache.8 | 11011 | unassigned |
| 01100 | load.unlock.nocache.1 | 11100 | store.unlock.nocache.1 |
| 01101 | load.unlock.nocache.2 | 11101 | store.unlock.nocache.2 |
| 01110 | load.unlock.nocache.4 | 11110 | store.unlock.nocache.4 |
| 01111 | load.unlock.nocache.8 | 11111 | store.unlock.nocache.8 |

3.3.2 Cacheable Data Store

In the typical data cache store, the MEM_CMD(4:0) field ranges from 10000 to 10011, STORE.NOLOCK.CACHE.byte_count. The commands just indicate the store's request size.

The address presented with the command is the IP's exact store address.

Cacheable store data may be combined with previously issued cacheable store data to compose larger X-Bus transactions. This *write compaction* is described in chapter 6.

3.3.3 Unencacheable Data Store

A store may also be declared unencacheable for one of the following reasons.

- The PMAPE's C bit is set in the virtual address mapping tables.
- The memory reference address is a physical one because virtual translation is not enabled.
- The memory reference address is a physical one required for an MMU table walk.
- The CPU's instruction is a *store.unlock*, requiring access to the bus.

The caching decision is made by the MMU and communicated in the MMU command field. All of the remaining data store command codes other than those just mentioned in the last section apply to unencacheable references.

In an unencacheable data cache store, write compaction is not permitted. The address presented with the MMU command is forwarded as is to the X-Bus, and the write mask is appropriately constructed to reflect the exact request size. If the request is for an 8 byte quantity, a write multiple of 2 longwords will result.

3.3.4 Store.Unlock

The *store.unlock* instruction will be handled no differently than any other unencacheable store except that the bus lock may be released as a side-effect of the X-Bus request completion.

The IP will assume the bus lock is released as soon as the write is queued.

The MMU may issue a second locking read request before a previously acquired lock is released. The MMU may do so while processing a secondary TB miss during a locked code sequence. The BIF will properly nest this second request and require two store.unlocks before releasing the bus.

MMU.STORE.UNLOCK differs from other store.unlock's in that the write data will *always* be provided in the least significant 32 bits. When the longword store address is even, this requires a special write rotation before the data may be presented to the X-Bus.

This instruction may be issued even when the bus lock is not held. This instruction will not release a bus lock not held by this CPU.

3.3.5 Write Buffer Full

If the BIF is unable to accept much more store data, it will assert the signal WBUF_FULL back to the MMU in order to generate back pressure. The MMU interprets the assertion of this signal to mean that if there is currently a store in its data cache access phase, that store data will be accepted but the address will not. This will mean that the store must stall in its exception phase.

WBUF_FULL deserves more description than this.

3.3.6 Data Cache Write Errors

The few errors that are possible in the course of processing a data cache write are summarized in this section.

Because X-Bus writes are one way transfers, device errors such as auxiliary bus timeouts, ECCC's and ECCU's must be detected and recorded at the write's destination.

3.3.6.1 Bus Acquisition Timeout

If the bus acquisition timer elapses before the data cache write gains access to the bus, a hardware failure is presumed. The BIF requests the clocks to stop and records this error in scan state. The BIF continues to request the bus.

3.3.6.2 No Acknowledge

If the data cache write address transfer results in no bus acknowledge, a software failure is presumed. The BIF records this error status in the BCTRL register and freezes the ERRADDR register. The write request is forgotten.

3.3.6.3 Error Acknowledge

If the data cache write address transfer results in an error bus acknowledge, a hardware failure is presumed. The BIF records the error status in scan state, but otherwise treats the the acknowledge as a busy one to preserve state.

3.4 TB Invalidates

*Translation Buffer Invalidates* may be both posted by the MMU for forwarding to the X-Bus, or may be relayed from the X-Bus by the BIF to the MMU. The precise sequencing of TB invalidates is described in chapter 5.

3.4.1 Invalidates from the MMU

Similar to data cache writes, the CPU does not wait for a TB invalidate completion. The MMU relays and the BIF queues the TB invalidate request.

There are both *selective* and *comprehensive* TB invalidates. There is one MMU_CMD(4:0) code for each. Code 11000 is for a selective TB invalidate, and a 20 bit virtual address is expected to accompany it. The virtual address will be provided by the MMU on PA(01:00) || PA(29:12). The address will be relayed to the X-Bus where it will appear in the address bit positions 31 through 12. Code 11001 identifies a comprehensive TB invalidate. No address is required in this case.

No VPN is associated with a TB invalidate.

No data is associated with a TB invalidate.

MEM_CMD[4:0]

| 00000 | NOP | 10000 | store:nolock:cache:1 |
|---|---|---|---|
| 00001 | load:nolock:cache:16 | 10001 | store:nolock:cache:2 |
| 00010 | fetch:nolock:cache:32 | 10010 | store:nolock:cache:4 |
| 00011 | load:nolock:cache:64 | 10011 | store:nolock:cache:8 |
| 00100 | load:nolock:nocache:1 | 10100 | store:nolock:nocache:1 |
| 00101 | load:nolock:nocache:2 | 10101 | store:nolock:nocache:2 |
| 00110 | load:nolock:nocache:4 | 10110 | store:nolock:nocache:4 |
| 00111 | load:nolock:nocache:8 | 10111 | store:nolock:nocache:8 |
| 01000 | load:lock:nocache:1 | 11000 | TB invalidate single |
| 01001 | load:lock:nocache:2 | 11001 | TB invalidate all |
| 01010 | load:lock:nocache:4 | 11010 | mmu_store:unlock:nocache:4 |
| 01011 | load:lock:nocache:8 | 11011 | unassigned |
| 01100 | load:unlock:nocache:1 | 11100 | store:unlock:nocache:1 |
| 01101 | load:unlock:nocache:2 | 11101 | store:unlock:nocache:2 |
| 01110 | load:unlock:nocache:4 | 11110 | store:unlock:nocache:4 |
| 01111 | load:unlock:nocache:8 | 11111 | store:unlock:nocache:8 |

3.4.2 Invalidates from the MMU: Write Buffer Full

TB invalidates, both selective and comprehensive will occupy a position in the write queue. Consequently, they can result in write buffer full stalls. If the BIF is unable to accept another TB invalidate or more store data, the BIF will assert the signal WBUF_FULL as described in section 3.3.5.

3.4.3 Invalidates from the MMU: Bus Errors

Only two errors are possible in transmitting a TB invalidate on the X-Bus. Failure to secure the bus and a parity error upon transmission.

3.4.3.1 Bus Acquisition Timeout

If the bus acquisition timer elapses before the TB invalidate gains access to the bus, a hardware failure is presumed. The BIF requests the clocks to stop and records this as a write error in the scan state. The BIF continues to request the bus.

3.4.3.2 Error Acknowledge

If the TB invalidate transfer results in an error bus acknowledge, a hardware failure is presumed. The BIF records this as a write error in the scan state. The BIF otherwise treats this acknowledge as a busy one to preserve state.

3.4.4 Invalidates to the MMU

Incoming TB invalidates are forwarded by the BIF to the MMU. The forwarding follows the cache invalidate pipeline as described in chapter 5.
Both *selective* and *comprehensive* TB invalidates may be posted to the MMU. The BIF sources a 20 bit *virtual page number* on the PA bus if a selective TB invalidate is required. If a comprehensive invalidate is desired no address is required, but the BIF will arbitrate for and secure the PA bus nonetheless.

3.4.4.1 External Selective TB Invalidate Address Format

Incoming TB invalidate addresses are right shifted before transfer across the PA bus. The virtual page number bits 31 through 12 will be aligned on the PA bus in bit positions 22 through 3.

3.4.4.2 External TB Invalidate Address Sourcing / BIF_PAARB BIF_INVOP

The BIF uses the BIF_PAARB signals to request the PA bus to transfer the invalidate address. The BIF will usually request the use only of PA and EASRC buses, BIF_PAARB = 01. If an instruction cache fill is underway at the same time, BIF_PAARB = 11 will be driven. The decision as to whether to do an instruction cache fill or TB invalidate can then be deferred one cycle.

BIF_PAARB[1:0]

| | |
|---|---|
| 00 | NOP |
| 01 | Arbitrate for PA/EASRC : cache fill or invalidate |
| 10 | Arbitrate for PA/PCSRC : cache fill or invalidate |
| 11 | Arbitrate for PA/EA/PCSRC : cache fill or invalidate |

Either a selective TB invalidate or a comprehensive TB invalidate is requested in the same cycle as the PA bus use. If selective, the TB invalidate index will be on PA bus. The BIF requests the selective TB invalidate by setting BIF_INVOP = 10. If a comprehensive TB invalidate is desired, the BIF sets BIF_INVOP = 11.

BIF_INVOP[2:0]

| | | |
|---|---|---|
| 000 | 0 | NOP |
| 001 | 1 | RESET VALID BITS |
| 010 | 2 | Selective TB Invalidate |
| 011 | 3 | Comprehensive TB Invalidate |
| 100 | 4 | Fill |
| 101 | 5 | Diagnostic Fill |
| 110 | 6 | *undefined* |
| 111 | 7 | *undefined* |

CHAPTER 4        INSTRUCTION CACHE INTERFACE

4.1 Instruction Cache Read Miss

Processor instruction fetches are usually satisfied by the instruction cache. An *instruction cache read miss* occurs when the data cache does not presently have the requested instruction.

In the main, instruction cache read miss processing parallels that of data cache read miss. The major differences result from the many fewer request within instruction cache miss.

4.1.1 MMU Request to the BIF

The fetch's 30 bit physical address is provided by the MMU on the PA bus. The MMU command accompanies the physical address.

The read's virtual page offset within segment, VPN, bits will be presented in advance of the physical address and command. Typically, the 7 bits are captured by the BIF from the external PC register every cycle. If an instruction cache miss occurs, the earliest the physical address and command will arrive is the *following* cycle. If however, the PA bus is not used or is otherwise unavailable in this succeeding cycle, the MMU will assert the signal MMU_HOLD_IVPN. The BIF will hold the captured instruction cache VPN. MMU_HOLD_IVPN will be deasserted in the cycle in which the physical address and command are finally sent to the BIF.

There is only one command that applies to instruction cache miss.

MEM_CMD[4:0]

| 00000 | NOP                  | 10000 | store.nolock.cache.1   |
|-------|----------------------|-------|------------------------|
| 00001 | load.nolock.cache.16 | 10001 | store.nolock.cache.2   |
| 00010 | fetch.nolock.cache.32| 10010 | store.nolock.cache.4   |
| 00011 | load.nolock.cache.64 | 10011 | store.nolock.cache.8   |
| 00100 | load.nolock.nocache.1| 10100 | store.nolock.nocache.1 |
| 00101 | load.nolock.nocache.2| 10101 | store.nolock.nocache.2 |
| 00110 | load.nolock.nocache.4| 10110 | store.nolock.nocache.4 |
| 00111 | load.nolock.nocache.8| 10111 | store.nolock.nocache.8 |
| 01000 | load.lock.nocache.1  | 11000 | TB.invalidate.single   |
| 01001 | load.lock.nocache.2  | 11001 | TB.invalidate.all      |
| 01010 | load.lock.nocache.4  | 11010 | mmu_store.unlock.nocache.4 |
| 01011 | load.lock.nocache.8  | 11011 | unassigned             |
| 01100 | load.unlock.nocache.1| 11100 | store.unlock.nocache.1 |
| 01101 | load.unlock.nocache.2| 11101 | store.unlock.nocache.2 |
| 01110 | load.unlock.nocache.4| 11110 | store.unlock.nocache.4 |
| 01111 | load.unlock.nocache.8| 11111 | store.unlock.nocache.8 |

All instruction cache misses are cacheable and 32 bytes in length.

The address presented with the command is the IP's exact fetch address. Before forwarding to the X-Bus address bits 3 and 4 must be unconditionally zeroed. This is required by the fill algorithm which is natural order beginning at the nearest lower byte boundary that is 0 modulo 32. The address mask bits must be forced to all ones before transferring on the X-Bus.

4.1.2 Instruction Cache Read Data Return

Once the instruction cache miss read address is transferred across the X-Bus, the BIF awaits read data response. When the requested data finally returns, it is forwarded to the INST(63:00) bus. The instruction is then stored in the cache.

4.1.2.1 Instruction Return Delay

Normally, returning memory data is forwarded to the INST bus in the cycle immediately following the data transfer on the X-Bus. In some cases however, INST bus forwarding is delayed one additional cycle. The cases are summarized.

- The X-Bus data returns in the same cycle that the PCSRC bus is being used to process an invalidate. An instruction cache fill cannot take place in the next cycle because the PC will not hold the proper fill address.

- The X-Bus data returns in a cycle immediately after a data cache miss that required an insertion delay. The immediately abutting data and instruction fill data responses on the X-Bus does not afford an opportunity to remove the data cache miss's delay.

The data return delay is not visible to the MMU in handshake protocol.

4.1.2.2 Instruction Return Alignment

The instruction data is always aligned on the INST bus as it appears on the X-Bus.

4.1.2.3 Instruction Cache Fill Data Sourcing / MEM_RESP

The instruction cache data is provided 8 bytes at a time on the X-Bus and is forwarded to the INST bus 8 bytes at a time. The instruction cache filling is strictly slaved to the X-Bus timing and normally takes place in uninterrupted cycles. See ECCU/ECCC below for the exceptions to this.

The BIF will begin driving returning X-Bus data before X-Bus Read-Response data has arrived. The BIF will first drive the INST bus in the cycle after the instruction cache miss MEM_CMD has been driven by the MMU.

Simultaneously with the INST bus driving, the MEM_RESP(2:0) field is sourced by the MMU. Typically, code 010 will be driven. Codes 110 and 111 will be driven in the event of bus error. The instruction cache filling is strictly slaved to the X-Bus timing and normally takes place in uninterrupted cycles. See ECCU/ECCC below for the exceptions to this.

MEM_RESP[2:0] - Data Cache Miss

| | |
|---|---|
| 000 | NOP |
| 001 | Dcache Data Return |
| 010 | Icache Data Return |
| 011 | undefined |
| 100 | Load ECCU |
| 101 | Load No Response |
| 110 | Fetch ECCU |
| 111 | Fectch No Response |

4.1.2.4 Instruction Cache Fill Parity Sourcing

The returning instruction parity is regenerated while the data is on the INST bus. It is written into the instruction cache parity RAM's in the following cycle. One bit of parity is maintained over all even instruction bytes, and one over all odd instruction bytes.

4.1.2.5 Instruction Cache Fill Address Sourcing / BIF_PAARB BIF_INVOP

The instruction cache fill index is sourced by the BIF on the PA bus. The BIF requests this use of the PA bus one cycle in advance of the address transfer (two cycles in advance of the INST transfer) by asserting the BIF_PAARB(1:0) signals. BIF_PAARB = 10 requests the joint use of the PA bus and the PCSRC bus. BIF_PAARB = 11 requests the use of the EASRC bus in addition. This last code would be used if instruction cache miss and data cache miss are concurrently underway on the X-Bus.

The BIF will begin requesting the PA bus before X-Bus Read Response data has arrived. The BIF will first make an arbitration request on the PAARB signals in the X-Bus acknowledge cycle for the instruction miss read address transfer.

BIF_PAARB[1:0]

| 00 | NOP |
|----|-----|
| 01 |     |
| 10 | Arbitrate for PA/PCSRC : cache fill or invalidate |
| 11 | Arbitrate for PA/EA/PCSRC : cache fill or invalidate |

The BIF sources the 14 bit fill index on PA(29:16) one cycle in advance of the INST transfer. Simultaneously, the BIF requests the *setting* of the instruction cache tag's VALID bit in that next cycle by deasserting the BIF_INVOP signals.

BIF_INVOP[1:0]

| 00 | NOP |
|----|-----|
| 01 |     |
| 10 |     |
| 11 |     |

4.1.2.6 Instruction Cache Fill: MMU Tracking

While the BIF sources both the data and fill address, the RAM strobes and tag contents are provided by the MMU. The MMU does so in response to the BIF_PAARB and BIF_INVOP signals. The BIF sources these signals without knowing about return data availability. The BIF informs the MMU that data has been written only after the fact, by means of the MEM_RESP(2:0) signals.

The MMU guesses that the fill will complete the *next* cycle when the final fill entry index is on the PA bus and there is no request on the BIF_PAARB signals. If for some reason the fill does not complete in this cycle, both the MMU and BIF backup and try again. The MMU recognizes this situation by observing that the MEM_RESP field is 000 (NOP) in the cycle which should have been the last RAM data write.

4.1.3 Instruction Stream Writes

No attempt is made in hardware to interlock stores with instruction stream reads. If a program wishes to update the instruction stream it must follow this sequence.

- Execute the store.

- Execute a load.unlock. This assures that the store has been accomplished on the X-Bus.

- Wait for the invalidate pipeline to empty (5 instructions).

- Fetch the instruction.

4.1.4 Instruction Cache Read Miss Errors

The errors that are possible in the course of processing an instruction cache read miss are summarized in this section.

4.1.4.1 External Invalidate Collision

In the interval between the read address transfer on the X-Bus and the read data return, a write to the returning data from another CPU is possible. The BIF watches for this situation and detects any write-read collision on the same physical page. If a collision is detected, the BIF_INVOP[1:0] signals are asserted rather than deasserted in the cycle before the instruction cache write. BIF_INVOP = 01 will reset the tag's valid bit.

This potential cache invalidation will also apply to locally generated writes.

BIF_INVOP[1:0]

| 00 | NOP |
|----|-----|
| 01 | Invalidate Instruction/Data Cache |
| 10 | |
| 11 | |

4.1.4.2 Bus Acquisition Timeout

If the bus acquisition timer elapses before the instruction cache read gains access to the bus, a hardware failure is presumed. The BIF requests the clocks to stop and records this error status in the scan state. The BIF continues to arbitrate for the bus.

4.1.4.3 No Acknowledge

If the instruction cache miss address transfer results in no bus acknowledge, a software failure is presumed. The BIF records this error status in the BCTRL register and freezes the ERRADDR register. The BIF returns a FETCH_NO_RESPONSE code, 111, on the MEM_RESP(2:0) signals.

Any instruction fetch from a memory region that cannot support an X-Bus READ MULTIPLE will result in this error. An attempt to fetch from UTILITY board RAM will result in this error.

4.1.4.4 Error Acknowledge

If the instruction cache miss address transfer results in an error bus acknowledge, a hardware failure is presumed. The BIF records this error status in the scan state. The BIF otherwise treats this acknowledge as a busy one in order to preserve state. It's expected that the source of the acknowledge will request a clock freeze.

4.1.4.5 Read Return Timeout

If the read return timer elapses before the instruction cache read data completely returns, a hardware failure is presumed. The BIF records this error status in the scan state. The BIF continues to await read data return.

4.1.4.6 ECCU

A device error may prevent correct data return. The most common such error is a main memory ECCU.

When only incorrect X-Bus data can be returned, a READ RESPONSE ERROR command will be returned on the X-Bus. The BIF will terminate the transfer. The MMU_RESP(2:0) code FETCH ECCU, 110, will be sent to the MMU. No further response data for the READ MULTIPLE will be accepted from the X-BUS.

4.1.4.7 ECCC

A correctable data error can occur upon access to main store. If this happens in an instruction cache fill, this may result in the interpositioning of NOP's within the returning X-BUS read data. When a NOP interrupts this sequence, there will always be at least 2 NOP's present.

When the NOP interrupts the fill sequence, incorrect data is written to the RAM's. The BIF then *backs up* the fill address by eight bytes, awaits the corrected data, and rewrites the RAM location.

When the NOP arrives instead of the last 8 bytes of read response data, there is an additional complication in that the BIF may have relinquished control of the PA bus. The MMU will recognize this situation and hold the processor stall. The BIF rearbitrates for the PA and PCSRC buses, then sources the last fill address and waits for corrected data. The need to arbitrate, then resupply the former fill address requires the two NOP's.

If a data returning X-Bus sequence is interrupted by NOP's, the responder will assert *arb inhibit* to prevent another party from gaining access to the bus. In consequence, the BIF does not have to be prepared to handle external invalidates or data read data response during such an interruption.

4.2 Instruction Cache Invalidates

Instruction cache invalidates may be posted from the BIF to the instruction cache. The overall sequencing of instruction cache invalidate is described in chapter 5.

4.2.1 Instruction Cache Invalidate Address Sourcing / BIF_PAARB BIF_INVOP

The BIF provides only the invalidate index for the cache location to be purged. The address is transferred over the PA bus. The BIF requests this use of the bus one cycle in advance of the address transfer (two cycles in advance of the tag invalidate) by asserting the BIF_PAARB(1:0) signals. BIF_PAARB = 10 requests the joint use of the PA bus and the PCSRC bus. BIF_PAARB = 11 requests the joint use of the PA bus, EASRC bus and PCSRC bus. This code is used if both caches are to be invalidated.

BIF_PAARB[1:0]

| 00 | NOP |
|----|-----|
| 01 |     |
| 10 | Arbitrate for PA/PCSRC : cache fill or invalidate |
| 11 | Arbitrate for PA/EA/PCSRC : cache fill or invalidate |

The 14 bit invalidate index will be on PA(29:16) one cycle in advance of the tag RAM write. Simultaneously, the BIF requests the *clearing* of the instruction cache tag's VALID bit in that next cycle by asserting the BIF_INVOP signals. BIF_INVOP = 01 will reset the tag's valid bit.

BIF_INVOP[1:0]

| 00 | NOP |
|----|-----|
| 01 | Invalidate Instruction/Data Cache |
| 10 |     |
| 11 | .   |

CHAPTER 5   INVALIDATE PIPELINE

5.1 Duplicate Tag Stores

The Duplicate Tag Store (DTS) is a copy of the CPU's Instruction and Operand Cache Tag Store used to compare addresses being modified on the X-BUS against the contents of the caches. If a match between a location being modified on the X-BUS and DTS entry is found then that entry is invalidated in the corresponding cache. Performing this operation without the DTS would mean wasting many cycles in the caches to compare the cache tags against X-BUS memory modify transactions.

The duplicate instruction tag store is known as *DITS*. The duplicate date or operand tag store is known as *DOTS*.

5.1.1 DTS Addressing

The DTS are addressed as are the principal caches with virtual addresses. The X-BUS deals only with physical addresses so that the virtual address of a transaction is formed by useing the 12 LSB's of the physical address which are the same as the 12 LSB's of the virtual address and concatenating them with enough of the virtual address to index the cache. In the case of the CPU's 128kB instruction cache 5 virtual bits are required. In the case of the CPU's 64kB data cache 4 virtual bits are required. These bits accompany the physical address on the X-BUS.

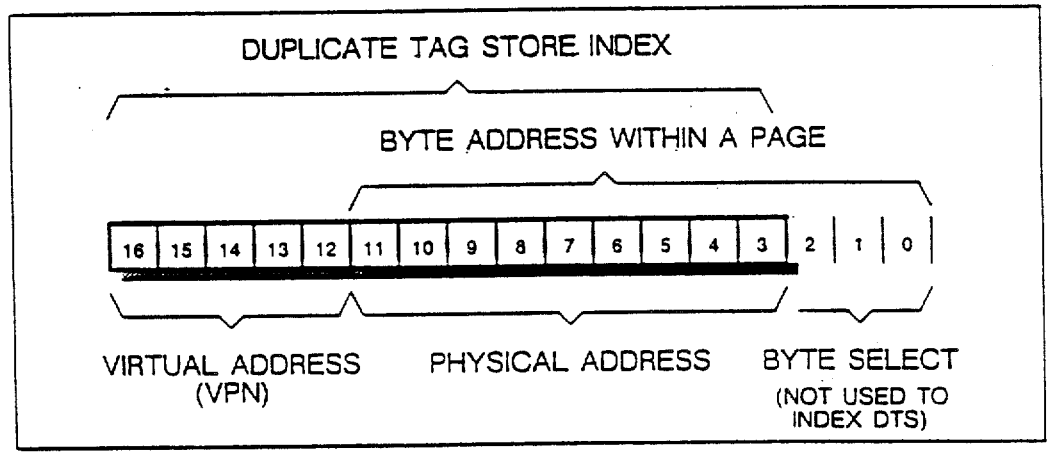

*DUPLICATE TAG STORE ADDRESSING. Bits 16 through 3 are used to address the Duplicate Tag Store. Bits 16 through 12 are taken from the VPN of the X-BUS transaction and bits 11 through 3 are taken from the Physical Address. One less bit is required to address the Duplicate Operand Cache Store than the Duplicate Instruction Cache Store. Only 13 bits are used to address the DOTS, bit 16 is tied to a fixed value.*

DITS and DOTS are commonly addressed.

5.1.2 DTS Contents

Each DTS entry contains two fields:
- o 18 bit physical tag
- o 1 bit parity check bit The physical tag is the 18 bit physical page number which along with a 12 bit byte index addresses 1 gigabyte (30 bits) of physical address space.

The parity bit is an odd parity check bit so that the sum of all the bits which are set in the physical tag, the valid entry bit and the parity bit will be odd.

There is no explicit valid bit. In invalid entry will simply point to an unlikely memory location, 0.

Example:
physical tag = 000000000000000000
parity bit = 1

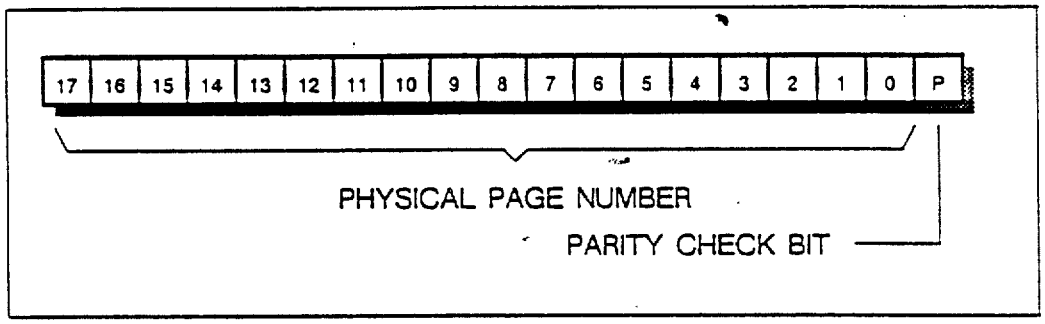

*DUPLICATE TAG STORE CONTENTS. The Duplicate Tag Stores contain an 18 bit physical page number and a Parity Check Bit.*

5.2 DTS Functional Overview

Duplicate Tag store operations can be divided into the following catagories:

- DTS lookup
- DTS hit
- DTS allocate from processor write
- DTS allocate from read response The DTS acts as an imperfect filter for cache invalidates. Any time some other system device (including another CPU) modifies a memory location the DTS is checked to see if that location is currently resident in either of the CPU's caches. If it is present then a cache cycle is stolen from the cache that contains that location and the entry in the cache as well as the entry in the DTS is invalidated. The DTS may actually have labeled as valid entries which are not valid in the caches. The only effect this will have is to generate a needless cache invalidate cycle.

The DTS is updated in two separate situations just as the main caches are. The first is when the CPU modifies a location by executing a STORE operation. The second is when a cache miss is generated and the data returns on the X-BUS.

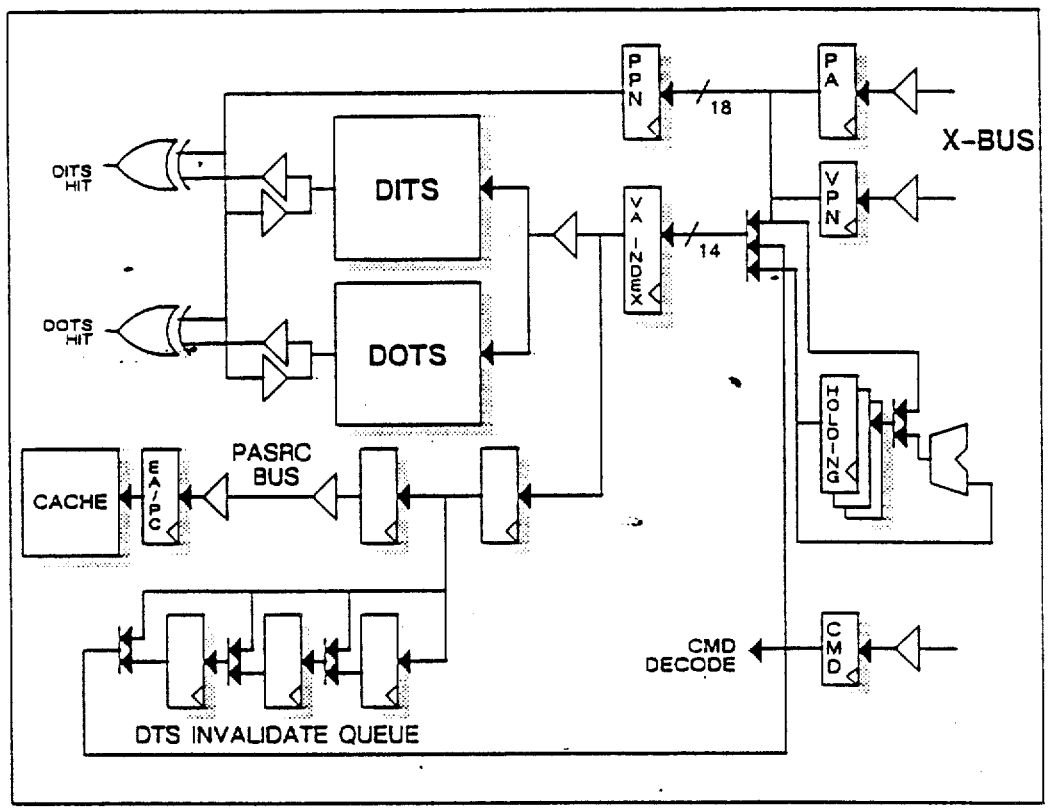

*BASIC DUPLICATE TAG STORE DATAPATHS.* ▭ *areas indicate off-chip logic*

5.3 DTS Lookup

A joint lookup of the DITS and DOTS is performed whenever the following transactions are detected on the X-BUS:

- WRITE *from another device*
- WRITE MULT followed by WRITE DATA *from another device*

A lookup only of the DITS is performed whenever the following transactions are detected on the X-BUS:

- WRITE *from this cpu*
- WRITE MULT followed by WRITE DATA *from this cpu*

The DTS lookup is basically handled in three pipeline stages. The stages are slaved to the operation of the X-BUS.

- COMMAND DECODE
- DTS ACCESS
- TAG COMPARE

5.3.1 DTS Lookup: Write

In the first cycle after the X-BUS bus write transaction, the CMD field is decoded. If a WRITE operation is decoded then the address to be used as a DTS index is loaded into the DTS INDEX register. The following cycle the DITS is accessed in a read operation and the DOTS is optionally accessed. The tags are compared as required to the physical page number. If the PPN and DTS tag match, a cache entry invalidate and a DTS entry invvalidate are scheduled.

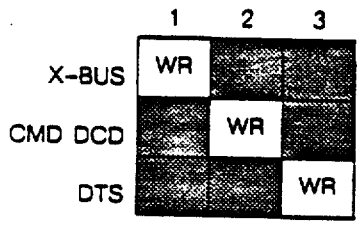

*DTS LOOKUP PIPELINE SCHEDULE for WRITE or WRITE UNLOCK*

CYCLE 1   A WRITE transaction on bus.
         The transaction is loaded into the BIF's X-BUS input registers.

CYCLE 2   The command is decoded.
         If it is a WRITE the DTS index reg is loaded from the physical address and the VPN.
         The physical address is piped-forward for the tag compare(s).

CYCLE 3   A DTS read access takes place, the tag is compared to the physical address.
         If a match occurs a cache entry invalidate and a DTS entry invalidate
         are scheduled.

5.3.2 DTS Lookup: Write Multiple

If the command is decoded and determined to be a WRITE MULTIPLE transaction then the address is stored in the DTS index. During the following cycle when the corresponding WRITE MULTIPLE DATA is decoded the first lookup is *optionally* done if the WRITE MULTIPLE began on an odd longword boundary. Otherwise, the address is held in the DTSINDEX. Thereafter, the DTSINDEX is loaded with its former contents plus or minus 8 bytes, depending on whether the WRITE MULTIPLE was ascending or descending, in anticipation of the next WRITE MULTIPLE DATA cycle.

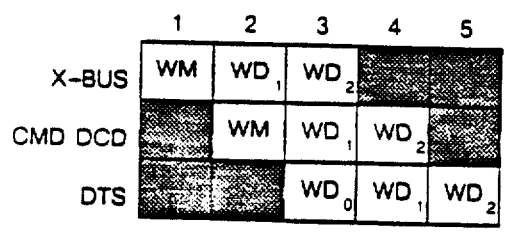

*DTS LOOKUP PIPELINE SCHEDULE for WRITE MULTIPLE with TWO DATA TRANSFER CYCLES*

CYCLE 1   A WRITE MULTIPLE (WM) transaction on bus.
         The transaction is loaded into the BIF's X-BUS input registers.

CYCLE 2    The command is decoded.
If it is a WRITE MULTIPLE the address formed to index the DTS is loaded into the DTSINDEX register.
At this time the first quadword of the WRITE MULTIPLE DATA is on the X-BUS($WD_1$).

CYCLE 3    WRITE MULTIPLE DATA is decoded and the address in the DTSINDEX is optionally incremented or decremented by 4 bytes.
The optional odd longword, $WD_0$, lookup occurs.
If a match occurs schedule cache entry invalidate and DTS entry invalidate CYCLE 4    A DTS read access takes place for $WD_1$, the tag is compared to the physical address.
If a match occurs schedule cache entry invalidate and DTS entry invalidate CYCLE 5    A DTS read access takes place for $WD_2$, the tag is compared to the physical address.
If a match occurs schedule cache entry invalidate and DTS entry invalidate

5.3.3    DTS Lookup Hit Processing

When a memory modify operation by another device causes a hit in either DTS, or a locally generated write hits in the DITS, two events are scheduled. The first is an invalidate of the entry or entries which caused the hit in the main cache and the second is an invalidate of that entry or entries in the DTS in order to maintain the DTS consistant with the main caches.

It usually takes six cycles for a WRITE modifying a memory location which is also in the local caches to proceed from the X-BUS to that entry being invalidated.

- transaction on X-BUS
- command decoded
- DTS accessed
- PA bus arbitration
- PA BUS/EASRC/PCSRC transfer
- cache tag write(s)

The DTS entry invalidate is placed in a queue awaiting a free DTS cycle.

Once a hit has been detected, the hitting index is loaded into the address register of the cache corresponding to the DTS in which it has hit. The cycle after the DTS lookup is used to complete the address compare and request use of the PA bus the following cycle. The PA bus will always be available except when the DTS invalidate pipeline is pre-empted by a READ RESPONSE operation filling a cache miss (discussed later). The cycle following PA arbitration the index is driven off the BIF address chip and the drivers to either the PCSRC bus or the EASRC bus or both are enabled by the MMU. An index hitting in the DITS makes it's way to the PC register while one hitting in the DOTS must be loaded into the EA register. An index hitting in both the DITS and DOTS will be loaded into both EA and PC registers.

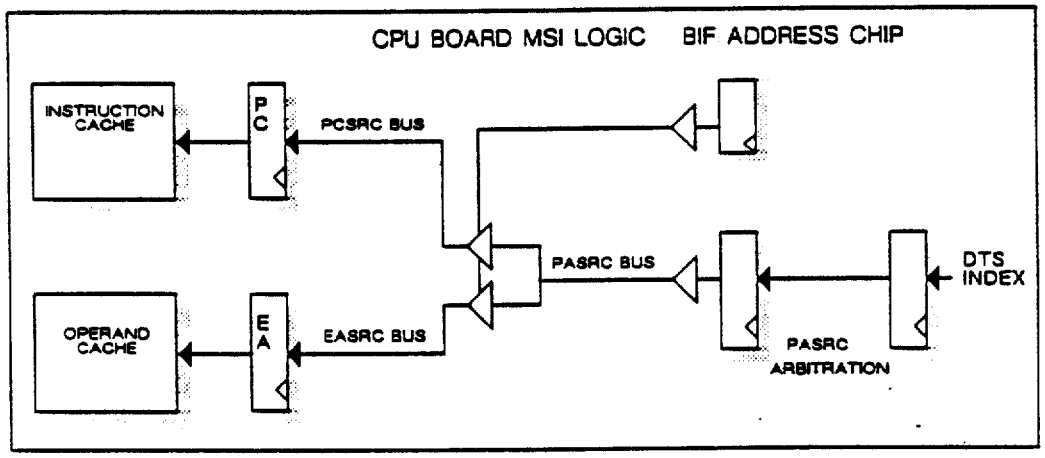

CACHE INVALIDATE DATAPATHS (not all bus sources are shown)

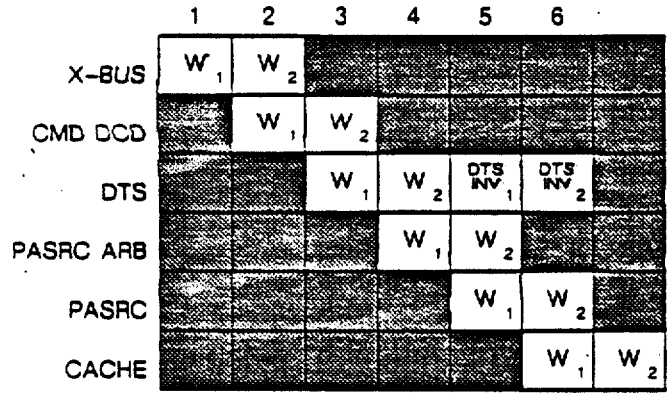

DTS HIT WITH CACHE ENTRY INVALIDATE and DELAYED DTS ENTRY INVALIDATE.

CYCLE 1   A WRITE (W) transaction on bus.
          The transaction is loaded into the BIF's X-BUS input registers.

CYCLE 2   The command is decoded.
          The physical address is piped forward for the tag compare.
          The virtual index is loaded into the DTS index register.

CYCLE3    A read operation is performed on the DTS.

CYCLE 4   The results of the tag compare are available.
          Since there was a hit the PASRC bus is requested.
          The DTS entry invalidate(s) are queued for execution when DTS is available.

CYCLE 5   The virtual index of the location to be invalidated is passed via the
          PASRC bus to the appropriate cache address register.

CYCLE 6   The cache entry causing the DTS hit is invalidated.

5.4 DTS Allocate from Processor Writes

When the CPU modifies an operand cache location via a store instruction the DOTS must also be updated to reflect the cache's new state. The update occurs after the transaction is placed on the X-BUS. This avoids DTS conflicts by using the X-BUS as a synchronization point for DTS access. Only one device can use the X-BUS at a time and that device had to arbitrate to obtain the bus. The only DTS operations which are not synchronized through the X-BUS are the DTS entry invalidates and those are lower priority than the rest.

5.4.1 DTS Allocate: Write

When the BIF address chip decodes a WRITE operation on the X-BUS that it has generated the following cycles it will write the new tag into the DOTS while doing a lookup into the DITS. The DITS lookup procedure has been previously described. A hit occurs in the DITS at this point means that the processor is modifying a location that has been cached in the instruction cache. An instruction cache entry invalidate and a DITS entry invalidate are scheduled.

While the DTS write allocate is occurring the DTS index must be compared against all the indices in the DTS entry invalidate queue that are scheduled to invalidate an entry in the DOTS. If any of the compares succeed then that DTS entry invalidate must itself be invalidated. If the invalidate was scheduled for both the DITS and DOTS then it is retagged as being only for the DITS. In this way an old pending DOTS entry invalidate won't destroy a recently allocated entry.

5.4.2 DTS Allocate: Write Multiple

A WRITE MULTIPLE from the CPU will be treated just like a WRITE MULTIPLE from another device with the only difference being that the DOTS is written into with the physical tag rather than read and checked for tag match.

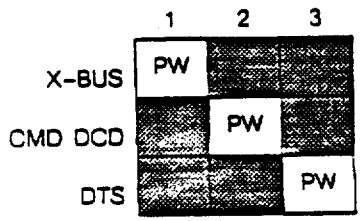

DTS ALLOCATE from PROCESSOR WRITE

CYCLE 1    Processor write is placed on X-BUS from WRITE BUFFER.

CYCLE 2    The write is decoded and also determined to be from the same CPU.

CYCLE 3    The DOTS is updated with the new physical tag and the valid bit set
                     The DITS is checked for a tag compare and if a hit occurs the instruction cache entry invalidate and DITS entry invalidate are scheduled in the usual way.

5.5 DTS Allocate from Read Response

The DTS is also written upon the return of a READ RESPONSE in reply to a READ MULTIPLE made by the same CPU. When a *cacheable* miss occurs in a cache a READ MULTIPLE request is sent to main memory. Main memory returns the requested data in the form of sccessive READ RESPONSE's. Upon decoding the expected READ RESPONSE command the BIF sends the associated tag to the awaiting cache and enters the tag into the DTS using the conventional DTS pipeline. No tag comparison is performed during this DTS cycle and only the DTS corresponding to the cache that missed is updated.

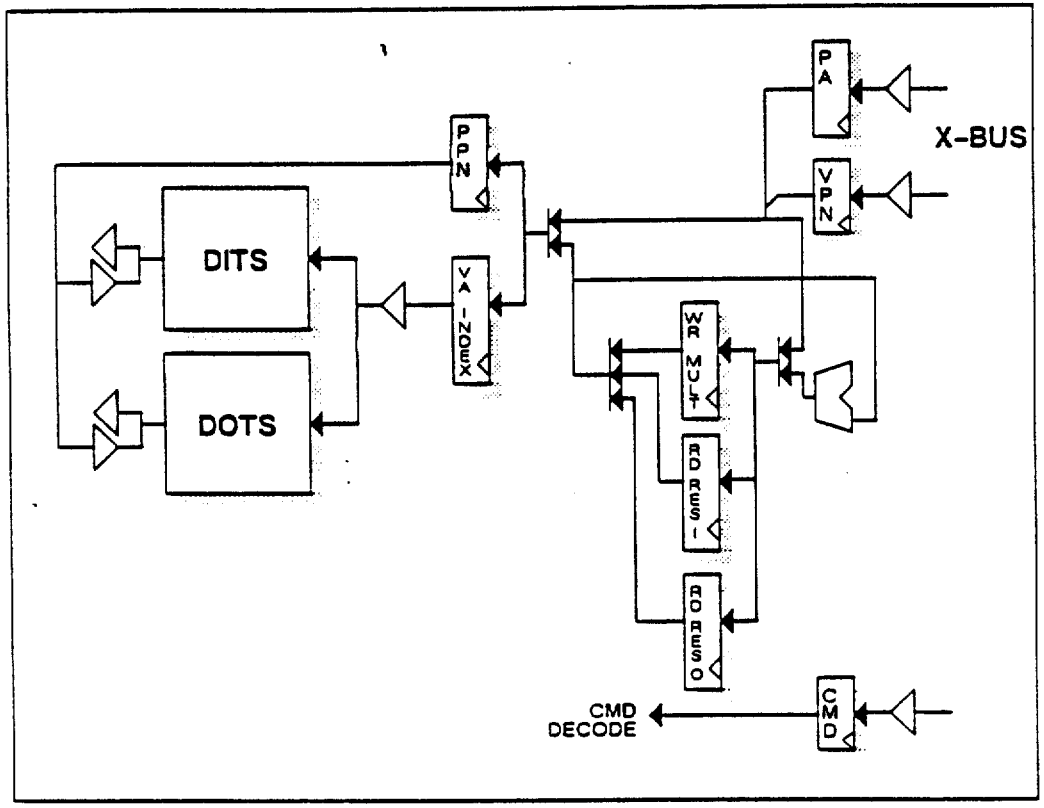

*DTS INDEX INCREMENT/DECREMENT DATAPATHS.* ☐ *areas indicate off-chip logic.*

Three sets of addresses must be stored and manipulated in addressing the DTS. The DTS index register already mentioned used in processing WRITE MULTIPLES, and two registers to hold the addresses associated with two possible pending cache miss READ RESPONSES

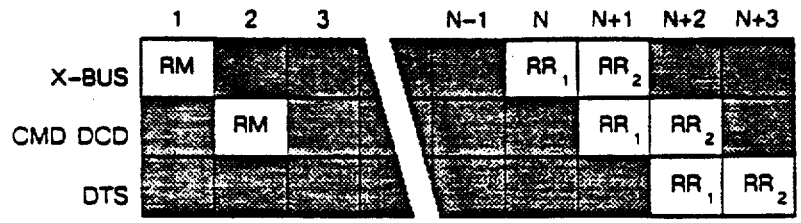

READ MULTIPLE REQUEST and READ RESPONSE SCENARIO with DTS UPDATE.

CYCLE 1   A cache miss causes the BIF to place a READ MULTIPLE request on the X-BUS.

CYCLE 2   The command is decoded and is determined to be a self generated READ MULTIPLE.
The VPN and physical address are stored in the appropriate pending operation holding register depending on the X-BUS SUBID signaling whether it is an instruction or operand cache miss.

CYCLE 3...N-1   The memory subsystem is processing the READ MULTIPLE.

CYCLE N   The memory subsystem places the first of two READ RESPONSE transactions on the X-BUS.

CYCLE N+1   The second READ RESPONSE is on the X-BUS.
The first READ RESPONSE is decoded and the corresponding address is loaded from the holding register to the DTS index. The holding register is then loaded with it's contents ± 8 bytes depending on the ordering for that type of operation. (I-miss or D-miss).

CYCLE N+2   The first READ RESPONSE is updating the DTS.
The second READ RESPONSE is decoded and the contents of the holding register are again transferred to the DTS index register and the holding register is stepped (± 8 bytes).

CYCLE N+3   The second READ RESPONSE updates the DTS.

CHAPTER 6

WRITE PIPELINE

6.1 Write Buffer Overview

The purpose of the *write buffer* is twofold. Firstly, it isolates the processor from memory and bus latencies during stores and secondly, it reduces overall bus traffic.

The write buffer isolates the processor from memory and bus latencies by offering a high bandwidth fifo queue for store operations. The processor can submit many back-to-back stores and continue functioning while this queue is emptied through the X-Bus into memory as both become available.

The write buffer serves to reduce bus traffic by collapsing and grouping small adjacent writes into large single blocks which make better use of the X-Bus and main memory resources.

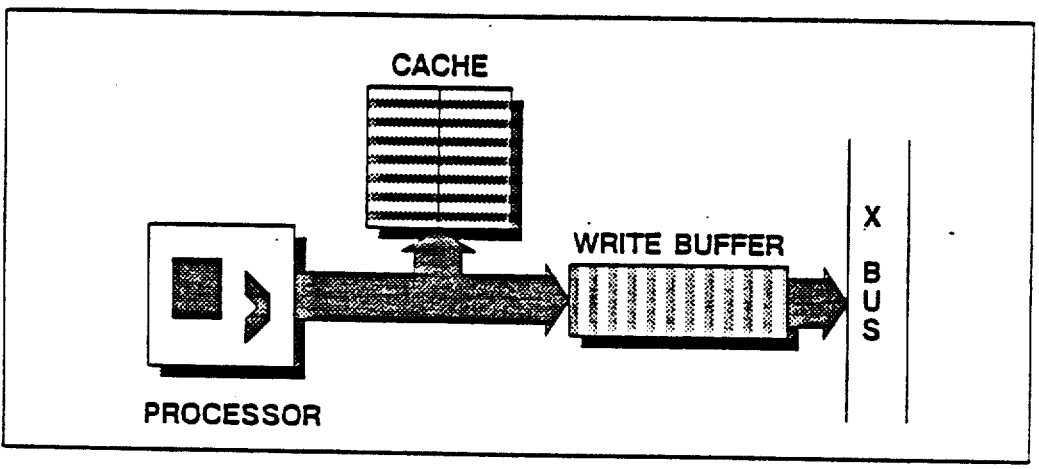

The WRITE BUFFER acts as a collapsing fifo queue for stores from the processor to the X-BUS.

6.1.1 FIFO Organization

The write buffer is physically split across the CBA and CBD gate arrays. The CBA holds the address portion of the queue and the CBD holds the associated data. There is 64 bits of data associated with every queue address.

The queue is structured as a variable depth FIFO. Entries are *added* to the *bottom* of the queue and *removed* from the *top*. The top of the queue is always at a fixed point. The bottom of the queue varies depending on the current number of queue entries.

There are address comparators at every queue entry. These comparators are used to decide whether newly arriving write data may be *merged* with the current queue contents. This write compaction reduces bus and memory bandwidth requirements. The address comparator is also used to permit reads to bypass writes. The address comparators indicate any read/write address collisions that would forbid the bypass.

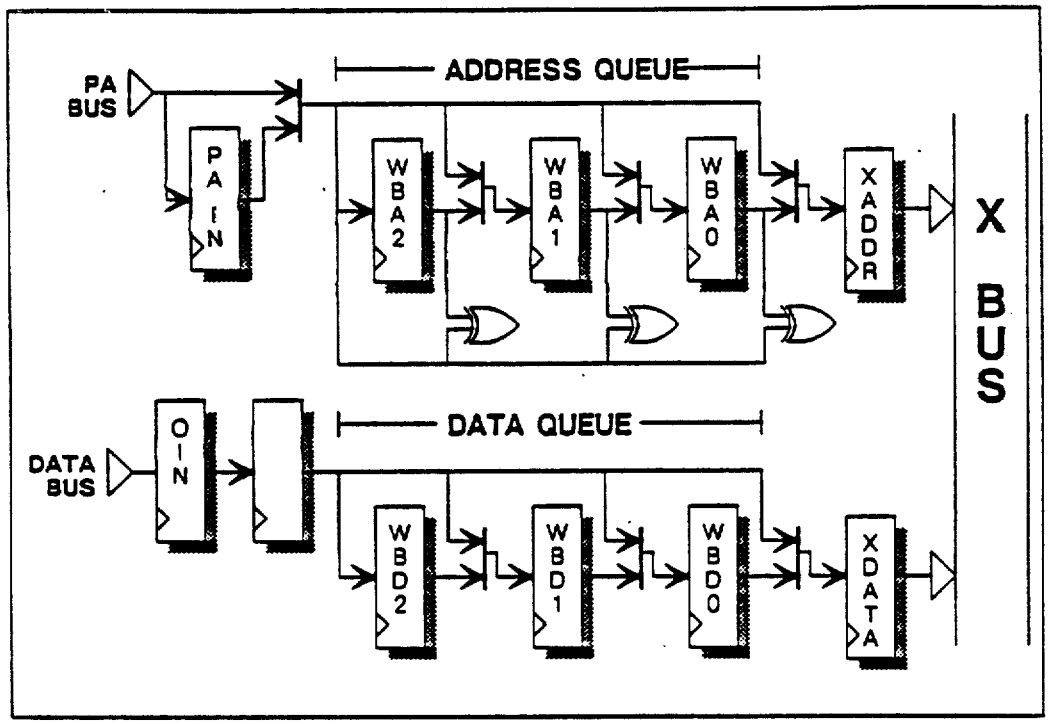

*The WRITE BUFFER pipeline showing data and addresses flowing from the processor to the X-BUS sometimes by way of a fifo queue. The actual number of stages in the queue is yet to be determined.*

Queue entries are actually not unloaded until a successful X-Bus acknowledge is seen. *Transmit Bypass* is used when a second or successive X-Bus write is initiated before that first acknowledge. Transmit bypass picks the first untransmitted queue entry as the next address or data to send. The transmit bypass is not shown in the figure.

6.2  Write Address/Data Staging

The processor store data is captured from the cache DATA bus during the store's access stage. Typically, the address will follow in the next cycle on the PA bus. If the PA bus is not available in that cycle, or there is a processor EVALID stall in effect, the data is held in place by the MMU deasserting the MMU_HDATA_LD signal.

As in the prior figure, there are two inbound data staging registers and one address staging register before the write queue proper. One data staging register is to compensate for the early data arrival. The second, and the address staging register, are to allow the address comparisons to take place and control the load enables in the queue. The address comparisons condition whether the store data may be merged with data already present.

6.3  Write Queue Contents

In addition to holding the data, each CBD data queue has a MSHALF_VALID and LSHALF_VALID flags. The valid bits are used to determine whether there are any contents in the entry. LSHALF_VALID and MSHALF_VALID are also used to control the output write rotation needed for a 32 bit or smaller write to an even longword address. There is a NOSWAP flag which defeats that output write rotation in the case of the MMU which already rotates the data properly. If MSHALF_VALID and LSHALF_VALID are both valid, during the address phase of a write multiple transfer, a "2" is sourced with correct parity

| MS_VALID | LS_VALID | NO_SWAP | |
|----------|----------|---------|---|
| 0 | 0 | - | EMPTY |
| 1 | 0 | 0 | EVEN LONG |
| 1 | 0 | 1 | EVEN LONG - MMU |
| 0 | 1 | - | ODD LONG |
| 1 | 1 | - | QUAD |

In addition to holding the address, the CBA address queue holds 4 BYTE_VALID bits in addition to the MSHALF_VALID and LSHALF_VALID flags. LSHALF_VALID is *almost* address bit 2, and the four byte valid bits correspond to the 4 bit byte mask required for a 32 bit bus write. The CBA sources these onto the X-Bus during the address phase of a write or write multiple. There is no need for the NO_SWAP bit.

| MS_VALID | LS_VALID | BYTE_VALID | |
|----------|----------|------------|---|
| 0 | 0 | --- | EMPTY |
| 1 | 0 | BBBB | EVEN LONG |
| 0 | 1 | BBBB | ODD LONG |
| 1 | 1 | --- | QUAD |

The CBA IC also has other flags that control internal arbitration and write compaction. There are NOCACHE, UNLOCK, INVTLBALL, and INVTLBE flags associated with each address. Any of these flags being set inhibits write compaction and read around write. UNLOCK also releases the bus lock if the nesting level is 0 and this CBA holds the lock. The invalidate TB flags force the selection of the TB invalidate bus command.

6.4 Write Queue Loading

Unless the queue is full, processor stores are accepted and added to the queued data without stalling the CPU. Typically, the store's data and address are added simultaneously to the bottom of the address and data queues. The position of the queue's bottom is determined by the first queue entry which is empty, measured from the queue's top. The affiliated flags are set.

6.4.1 Load Merge

If cacheable store data is being added to the queue, and the last valid entry in the queue is also cacheable and agrees in the quadword address, the load data may be *merged* into that entry. The merging would logically OR the valid bits. The merging can always happen if the data to load is a longword or quadword quantity. The merging may be permitted if the data to load is a byte or word in length. The merging will be allowed if the queue entry is already a quadword, or if the merge result will not spill over into the second longword.

6.4.2 Write Buffer Full

When the last entry in the write queue is occupied, and the inbound data address register is occupied or about to be (MEM_CMD is requesting the use), the signal WBUF_FULL is sent to the MMU to prevent any further stores from advancing. If there is a store currently in its cache access stage cache, that store's data will be captured and held, but will freeze in its EXC stage.

The signal WBUF_FULL will be deasserted when the write queue next advances. Note that there's some magic here when a store is stuck with its MEM_CMD asserted.

6.5 Write Queue Unloading

The queue entries are not unloaded until the cycle after receiving a successful acknowledge for the address or data transfer on the X-Bus. If retry is required, the address/data is then still available in the write queue.

Write addresses are always taken from the write address queue. Only reads will use the fast pass address paths from the MMU. The fast pass paths are for quick posting of read miss addresses in the event of default bus ownership.

6.5.1 Transmit Bypass

The address or data to send on the X-Bus is normally at the top of the queue. If however, the top of queue has been transmitted but not acknowledged, the *next to top* of queue would be used. During write multiples, queue data is being transmitted every cycle. Since the queue must be accessed the cycle before the X-Bus transmission, and the queue unload occurs in the third cycle *after* the X-Bus transmission, 4 levels of transmit data bypassing is required! The four levels of bypassing allow reaching back to the fifth queue entry from the top. This is illustrated in the next figure.

| ACCESS   | D1 | D2 | D3 | D4 | D5 |
|----------|----|----|----|----|----|
| TRANSMIT |    | D1 | D2 | D3 | D4 |
| PEND     |    |    | D1 | D2 | D3 |
| ACK      |    |    |    | D1 | D2 |
| UNLOAD   |    |    |    |    | D1 |

TRANSMIT BYPASSING

An additional level of transmit bypassing is provided in the address queue output delivery. This allows a level of address *look-a-head* that permits an early detection of write multiples. The write multiple gets ahead when the first X-Bus cycle transmits only an address, no data. This one cycle gap is enough to let the address transmit bypass sneak ahead of the data by one cycle.

Transmit bypass requires a *sent* flag be associated with the top 3 data and top 4 address queue entries. A queue entry is bypassed if it is already sent, or the queue element in front of it is already sent and there is a transfer on the bus now.

6.5.2 Transmit Retry

If a data or address X-Bus transfer receives an error or busy acknowledge, all queue element *sent* bits are reset. The requests are retried. The REJECT signal may also be asserted.

6.5.3 Write Multiple Collapse

If the next address to send is for a quadword, a WRITE MULTIPLE command is sent. While the address is being transmitted on the X-Bus, the *next* queue addressed is checked to see if it's also a quadword and in an adjacent quadword.
The adjacency direction is *suggested* by the write queue by examining the lower order bits of the next two addresses to transmit.

Write multiples are arbitrarily broken up on 256 byte boundaries to prevent bus hogging.

6.6 Read Around Write

If an instruction cache read is posted, the read is free to pass around previously queued up writes.

If a data cache read is posted, the read is free to pass around previously queued up writes only if the address doesn't collide with a pending write. The write queue detects this address collision and reports it to the internal BIF arbitration logic. The read bypass is inhibited if there are read and write side-effects as well, see chapter 2.

6.7 Write Parity

Parity for both address and data is regenerated just before X-Bus transmission.

CHAPTER 7 REGISTERS

7.1 Interrupt Posting

There are 16 *interrupt posting* longword addresses to which the BIF responds as a destination. The addresses are in subsequent longwords.

INTERRUPT POSTING ADDRESS  00pp 0100 to 00pp 013C 31  00

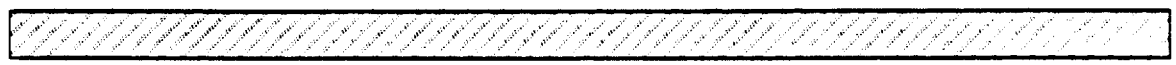

```
                              DATA NOT INTERPRETED    WRITE ONLY
                              PP = PROCESSOR SELECT NUMBER
                                   00, 04, 08, 0C    10, 14, 18, 1C
                                   20, 24, 28, 2C    30, 34, 38, 3C
```

Interrupts are always accepted by the processor to which they are directed. The interrupt originator receives no acknowledge. In effect, storing to an interrupt posting address simply requests an interrupt in the destination processor. There are 16 interrupt *classes*. The lower numbered interrupt posting address corresponds to the lower numbered interrupt class.

7.2 Interrupt Control Register

Associated with each interrupting address in an AT processor are both an *interrupt enable* and an *interrupt pend* flags. These 2 bits are available in the interrupt control register, ICTRL. The register should be read and written only as a longword quantity.

INTERRUPT CONTROL (ICTRL)  00pp 0208

31 30  16 15  00

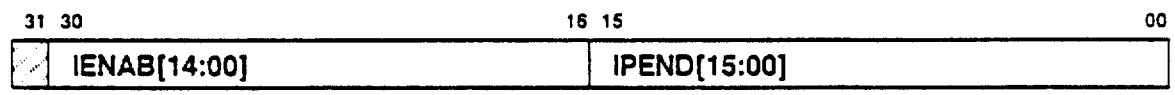

| IENAB[14:00] | IPEND[15:00] |

```
IENAB = INTERRUPT ENABLES FOR INTERRUPT CLASSES 0 TO 14    READ, WRITE 1 TO XOR
IPEND = INTERRUPT REQUESTS FOR INTERRUPT CLASSES 0 TO 15   READ ONLY

N.B., INTERRUPT CLASS 15 IS ALWAYS ENABLED
                              PP = PROCESSOR SELECT NUMBER
                                   00, 04, 08, 0C    10, 14, 18, 1C
                                   20, 24, 28, 2C    30, 34, 38, 3C
```

The *interrupt pend* bit is set when a write to the associated interrupting address is detected. The pended interrupt will be responded to when its specific *interrupt enable* bit is set and there is no comprehensive trap masking otherwise in effect. The highest priority enabled interrupt pend bit is cleared automatically upon the processor reading the interrupt summary register. The corresponding interrupt enable bit will also be cleared simultaneously.

The interrupt enable bits may be set and cleared directly by processor writes to the ICTRL register. Storing to the ICTRL register loads the interrupt enable portion of the register with the XOR of the current register contents and the store data. This permits the needed selective updates of register contents.

7.2.1 Non Maskable Interrupt

Interrupt level 15 cannot be masked.

7.3 Interrupt Summary Register

The *interrupt summary register* identifies the highest priority interrupt that is both pending and enabled. If no interrupt is pending, ISUM<4:0> will be zero. The register should be read only as a longword quantity.

```
INTERRUPT SUMMARY REGISTER (ISUM)                              00pp 0200
31                                                       05 04 03      00
[////////////////////////////////////////////////////////] | I | ISUM |
```

```
ISUM = HIGHEST INTERRUPTING LEVEL        READ ONLY
I = 1 -> ENABLED INTERRUPT PENDING

N.B., READING CLEARS IPEND(ISUM) AND IENAB(ISUM)
                                    PP = PROCESSOR SELECT NUMBER
                                         00. 04. 08. 0C    10. 14. 18. 1C
                                         20. 24. 28. 2C    30. 34. 38. 3C
```

7.4 Bus Control Register

The *bus control register* permits operational code access to the DTS force hit and miss functions. In addition, the BCTRL register captures overall state of any software recoverable error detected by the BIF. The register should always be read and written only as a longword quantity.

The Hi and Ho bits force the duplicate instruction and data/operand tag stores to hit when a lookup for an X-Bus write is in progress. The Mi and Mo bits force that lookup to miss. The operation when both the force hit and force miss bits for the same duplicate tag store are set, is undefined.

The En and El bits are the trap enables for Bus *write no response* and *bus lock timeout* respectively. When either trap is pending, whether enabled or not, the corresponding W or L bit will also be set. The trap must be explicitly acknowledged in software by writing 0's to W and L. Setting W or L nonzero while the associated trap is enabled, will trigger an IP trap. Breaking a lock by *trap_dispatch* will not be recorded as a lock timeout.

BUS CONTROL REGISTER (BCTRL)                                   00pp 0210

```
31 30 29 28 27 26 25                                          06 05      02 01 00
┌──┬──┬──┬──┬──┬──┬─────────────────────────────────────────────┬────────┬──┬──┐
│Hi│Ho│Mi│Mo│En│El│/////////////////////////////////////////////│ NORESP │W │L │
└──┴──┴──┴──┴──┴──┴─────────────────────────────────────────────┴────────┴──┴──┘
```

| | | | |
|---|---|---|---|
| Hi = 1 -> | FORCE HIT, DITS | | READ/WRITE |
| Ho = 1 -> | FORCE HIT, DOTS | | READ/WRITE |
| Mi = 1 -> | FORCE MISS, DITS | | READ/WRITE |
| Mo = 1 -> | FORCE MISS, DOTS | | READ/WRITE |
| En = 1 -> | ENABLE BUS NO RESPONSE TRAP | | READ/WRITE |
| El = 1 -> | ENABLE LOCK TIMEOUT TRAP | | READ/WRITE |
| W = 1 -> | BUS WRITE NO RESPONSE TRAP PENDING | | READ/WRITE |
| L = 1 -> | LOCK TIMEOUT TRAP PENDING | | READ/WRITE |

NORESP                                                     READ/WRITE

| | |
|---|---|
| 0000 | NO ADDRESS CAPTURED |
| 1--0 | READ ADDRESS CAPTURED |
| -1-0 | WRITE ADDRESS CAPTURED |
| --10 | FETCH ADDRESS CAPTURED |
| 1--1 | READ ADDRESS CAPTURED, SUBSEQUENT NO RESPONSE |
| -1-1 | WRITE ADDRESS CAPTURED, SUBSEQUENT NO RESPONSE |
| --11 | FETCH ADDRESS CAPTURED, SUBSEQUENT NO RESPONSE |

PP = PROCESSOR SELECT NUMBER
00, 04, 08, 0C    10, 14, 18, 1C
20, 24, 28, 2C    30, 34, 38, 3C

The NORESP field indicates what address has been captured in the ERRADDR register. This field will usually be zero except after a *no response ack* on the X-Bus. When this field becomes non-zero, whether by software action or because of no bus response, the ERRADDR register ceases to clock. If mutliple failures to respond have occurred, the LSB of the field will be set. The remaining bits and the ERRADDR will reflect only the *first* failure. The lack of bus acknowledge will result in either a write no response trap from the BIF, or a trap from the MMU. The NORESP field should be zeroed by the trap handler after the ERRADDR has been recovered.

7.5 Bus Error Address

The physical address of any read, write or fetch request that receives no bus acknoweldge upon transfer is captured in the *bus error address* register, ERRADDR. The register begins clocking again only after software has cleared the NORESP field of the BCTRL register. This field also associates the ERRADDR register contents with the transfer type. The ERRADDR register format follows.

BUS ERROR ADDRESS REGISTER (ERRADDR)

00pp 0218

```
31 30 29                                              02 01 00
  ┌────┬──────────────────────────────────────────────┬──────┐
  │////│ ADDRESS(29:02)                               │//////│
  └────┴──────────────────────────────────────────────┴──────┘
```

*READ ONLY*

PP = PROCESSOR SELECT NUMBER
00, 04, 08, 0C   10, 14, 18, 1C
20, 24, 28, 2C   30, 34, 38, 3C

The captured error address may not correspond directly to the program requested address because of cache fill address zeroing, or write merging.

7.6 BIF Buried/Scan State

Buried state, state readable and writable under scan control only, is provided in the BIF. Some of the state is needed for functional operation, e.g. the board id. Some of the state is used to selectively disable various *accelerators* in the BIF. This latter state is used for diagnostic assistance.

7.6.1 Board ID

There is a four bit board identifier field, BD_ID(3:0), in the scan ring. The field is used for slave address decoding and read address source ID. The lower two bits also decide which class B arbitration level the is IC is operating on.

This field is only in the CBA gate array.

7.6.2 Arbitration Level

There is a two bit arbitration level field, ARB_LEVEL(1:0), in the scan ring. The field should be set to the same value as BD_ID(1:0). It is used to decide which class B arbitration level the is IC is operating on in the CBD IC's.

This field is in the CBD gate arrays.

7.6.3 Write Multiple Inhibit

There is a one bit WRITE_MULTIPLE_INHIBIT bit in the scan ring. When set, the BIF will not generate write multiples other than quadwrites.

This field is only in the CBA gate array.

7.6.4 Write Merge Inhibit

There is a one bit WRITE_MERGE_INHIBIT bit in the scan ring. When set, the BIF will not generate write multiples other than quadwrites.

This field is only in the CBA gate array.

7.6.5 Read Before Write Inhibit

There is a one bit READ_BEFORE_WRITE_INHIBIT bit in the scan ring. When set, the BIF will not permit data cache reads to precede data cache writes.

This field is only in the CBA gate array.

7.6.6 Write Holdoff Inhibit

There is a one bit WRITE_HOLDOFF_INHIBIT bit in the scan ring. When set, the BIF will issue queued writes as soon as possible.

This field is only in the CBA gate array.

7.6.7 Instruction Cache Parity Inhibit

There is a one bit NO_ICACHE_PARITY bit in the scan ring. When set, the BIF will never check instruction cache data parity.

This field is only in the CBD gate arrays.

7.6.8 Data Cache Parity Inhibit

There is a one bit NO_DCACHE_PARITY bit in the scan ring. When set, the BIF will never check data cache data parity.

This field is only in the CBD gate arrays.

7.6.9 DTS Parity Inhibit

There is a one bit NO_DTS_PARITY bit in the scan ring. When set, the BIF will never check parity in the DITS or DOTS.

This field is only in the CBA gate array.

7.6.10 Force Parity Sense

There are two FORCE_PARITY(1:0) bits in the scan ring. When zero, the BIF will generate normal parity. When nonzero, the BIF will force all output parity to 1's or 0's in the DITS, DOTS, instruction and data caches. FORCE_PARITY = 10 generates 0's. FORCE_PARITY = 11 generates 1's.

This field is present in both the CBA and CBD gate arrays. The CBA field controls simultaneously both the DITS and DOTS parity. The CBD field controls both the instruction cache data and data cache data parity.

7.6.11 DTS Parity Error

There is a one bit DTS_PARITY_ERR bit in the scan ring. It's set when a DTS parity error is detected and remains set until cleared under scan control. When set, the BIF will request the clocks to stop.

This bit is only in the CBA gate array.

7.6.12 Instruction Cache Parity Error

There is a one bit INST_PARITY_ERR bit in the scan ring. It's set when an instruction cache data parity error is detected and remains set until cleared under scan control. When set, the BIF will request the clocks to stop.

This bit is only in the CBD gate array.

7.6.13 Data Cache Parity Error

There is a one bit DATA_PARITY_ERR bit in the scan ring. It's set when a data cache data parity error is detected and remains set until cleared under scan control. When set, the BIF will request the clocks to stop.

This bit is only in the CBD gate array.

7.6.14 X-BUS Overlap Control

There is a one bit ONE_ATATIME bit in the scan ring. When set, the BIF will not issue a second X-Bus reference before the last is fully complete. For a write, that means a successful ACK. For a read, that means a successful read data return.

This field is only in the CBA gate array.

7.6.15 Retry Backoff Inhibit

There is a one bit NO_BACKOFF bit in the scan ring. When set, the BIF will reissue retry requests as soon as possible.

This field is only in the CBA gate array.

7.6.16 Read Response Error

There is a READ_RESPONSE_ERROR bit in the scan ring. It's set when the BIF accepts a READ RESPONSE which triggers an error acknowledge. Typically, this would be a parity error. The bit remains set until cleared under scan control. When set, the BIF will request the clocks to stop.

This field is only in the CBD gate arrays.

7.6.17 Arbitration Timeout

There is an ARB_TIMEOUT bit in the scan ring. It's set when the BIF's arbitration timer elapses before acquiring the X-Bus. The bit remains set until cleared under scan control. When set, the BIF will request the clocks to stop.

This field is only in the CBA gate array.

7.6.18 Read Return Timeout

There is a READ_RETURN_TIMEOUT bit in the scan ring. It's set when the BIF's read return timer elapses before an expected READ RESPONSE arrives. The bit remains set until cleared under scan control. When set, the BIF will request the clocks to stop.

This field is only in the CBA gate array.

7.6.19 Error Acknowledge

There is an ERROR_ACKNOWLEDGE in the scan ring. It's set when the BIF receives an error acknowledgement to an address transfer. It's also set when a no acknowledge response to a data transfer cycle of a write multiple occurs. The bit remains set until cleared under scan control. This bit does not request clock stopping.

This field is only in the CBA gate array.

7.6.20 DTS RAM Diagnostic Address Generation

There is a one bit DTS_DIAGADDR bit in the scan ring. When set, the BIF CBA will generate increasing DTSINDEX addresses. These addresses are used for the selftest of the DTS and the primary cache RAM's. See chapter 9.

This bit is only in the CBA gate array.

7.6.21 DTS Diagnostic Data Generation Control

There is a one bit DTS_DATALD bit in the scan ring. It is used to control the source of data for writing and comparison during the DTS selftest. See chapter 9.

This bit is only in the CBA gate array.

7.6.22 DTS Diagnostic Data Writing Control

There is a one bit DTS_DIAGWE bit in the scan ring. When set, diagnostic data will be written into the DTS RAM's every cycle. See chapter 9.

This bit is only in the CBA gate array.

7.6.23 DTS Diagnostic Error

There is a one bit DTS_TESTERR bit in the scan ring. It is set if there is a miscompare during the selftest of the DTS RAM's. See chapter 9.

This bit is only in the CBA gate array.

7.6.24 Cache Diagnostic Data Generation Control

There is a one bit CACHE_DATALD bit in the scan ring. It is used to control the source of data for writing and comparison during the cache data selftest. See chapter 9.

This bit is in the CBD gate arrays.

7.6.25 Cache Diagnostic Data Writing Control

There is a one bit CACHE_DIAGWE bit in the scan ring. When set, diagnostic data will be written into the cache data RAM's every cycle. See chapter 9.

This bit is in the CBD gate arrays.

7.6.26 Cache Diagnostic Error

There is a one bit CACHE_TESTERR bit in the scan ring. It is set if there is a miscompare during the selftest of the cache data and parity RAM's. See chapter 9.

This bit is in the CBD gate arrays.

7.7 IP Trapping

A three bit trap code is sent from the BIF to the IP. There are only five useful codes. BIF_ERROR is either a write bus no response acknowledge or lock timeout. The BCTRL register must be read to determine which.

BUS_TRAP_REQ(2:0)

```
000   NO REQUEST
001   BIF ERROR
010   INTERRUPT
011   BIF ERROR/INTERRUPT
1--   NMI
```

Whenever the IP initiates a trap sequence, the signal IP_TRAP_DISP will be asserted. The assertion of this signal will unconditionally release the bus lock.

CHAPTER 8

CACHE PARITY

8.1 Instruction Cache Data Parity

The BIF CBD IC's maintain and check parity on the 64 bits of the instruction cache data RAM's. There is one parity bit over each 32 bits. INST_PARITY(0) holds parity over all even bytes of the INST bus. INST_PARITY(1) holds parity over all odd bytes of the INST bus. This odd even division permits one bit to be maintained per CBD gate array.

Odd parity is maintained, that is the sum of all ones in the 32 bits of data plus the parity bit should be odd.

INST_PARITY(1:0) are bidirectional. There is one 16KX4 RAM devoted to holding the parity. The parity RAM is always accessed in the cycle after the instruction cache's data RAM's. The address is piped forward unconditionally in external registers. The instruction parity is always good.

8.1.1 Instruction Parity Checking

The parity is always checked on the INST bus unless the CBD gate array is driving it. The CBD gate arrays drive it only during instruction cache miss.

The parity is checked in the cycle of the instruction parity RAM access. If a parity error is detected, a hardware fault is assumed. The CBD gate array requests the SCR to halt the system clocks and freezes error status in the embedded scan state.

8.1.2 Instruction Parity Generation

When instruction cache fill is underway, instruction parity is computed from the X-Bus parity. The 8 X-Bus parity bits are reduced to 2. These 2 parity bits are loaded into an outbound instruction parity register for sourcing onto INST_PARITY(1:0) the cycle after the instruction data. If the instruction cache's data RAM's are being written, the parity RAM will be written unconditionally in the cycle to follow.

Embedded state may force the INST_PARITY(1:0) bits to always be 1, or always be 0.

Diagnostic RAM update, see chapter 9, mimics an extended instruction cache fill. Parity will typically be part of the diagnostic pattern generation.

8.2 Data Cache Data Parity

The BIF CBD IC's maintain and check parity on the 64 bits of the data cache data RAM's. There is one parity bit over each 8 bits. This is forced by the need to update bytes individually. DATA_IPARITY(0) provides parity over DATA(63:58). DATA_IPARITY(7) holds parity over DATA(07:00). Each CBD gate array is responsible for 4 parity bits.

Odd parity is maintained, that is the sum of all ones in the 8 bits of data plus the parity bit should be odd.

There are 8 16KX1 RAM's devoted to holding the parity. The RAM's have separate data in and out pins. Correspondingly, there are separate DATA_IPARITY(7:0) and DATA_OPARITY(7:0) signals. The parity RAM's are always accessed in the cycle after the data cache's data RAM's. The address is piped forward unconditionally in external registers. The data parity is always good.

8.2.1 Parity Checking

The parity is checked on the DATA bus when the signal CHECK_DATA is asserted. This signal is externally derived from the RAM controls of the data cache. This signal should be asserted to the CBD IC's in the cycle after reading the data RAM's whenever the RAM's are read. That should be most of the time except during processor stores and data cache filling.

The parity is checked in the cycle of the data parity RAM's access using DATA_IPARITY(7:0). If a parity error is detected, a hardware fault is assumed. The CBA gate array requests the SCR to halt the system clocks and freezes error status in the embedded scan state.

8.2.2 Parity Generation

Parity is always provided by the CBD. When a data cache fill is *underway*, data parity is passed directly from the X-Bus parity. These 8 parity bits are loaded into an outbound instruction parity register for sourcing onto DATA_OPARITY(7:0) the cycle after the data. Parity is also always being computed on the DATA bus directly. When a cache data fill is *not underway* this parity is sourced onto the DATA_OPARITY(7:0) instead. If the data cache's data RAM's are being written, the parity RAM's will be written unconditionally in the cycle to follow.

Embedded state may force the DATA_OPARITY(7:0) bits to always be 1, or always be 0.

Diagnostic RAM update, see chapter 9, mimics an extended data cache fill. Parity will typically be part of the diagnostic pattern generation.

8.2.3 Secondary TB Data Parity

The CBD IC's are unaware of whether a secondary TB look up, or a data cache read is underway in the data cache.

8.3 Instruction Cache Duplicate Tag Store Parity

The CBA IC maintains and checks parity on the 18 bits of the DITS' RAM's. There is one parity bit over all 18 bits, DITS_PARITY.

Odd parity is maintained, that is the sum of all ones in the 18 bits of data plus the parity bit should be odd.

DITS_PARITY is bidirectional and is accessed in the same cycle as the tag contents. The DITS parity is always good.

8.3.1 Parity Checking

The parity is *always* checked on the DITS_DATA(29:12) unless the CBA gate array is sourcing it. The CBA gate arrays does so only in association with the READ RESPONSE phases of an instruction cache fill's READ MULTIPLE, or during a DITS entry invalidation cancellation.

The parity is checked in the cycle after the RAM access. This may change if timing permits. If a parity error is detected, a hardware fault is assumed. The CBD gate array requests the SCR to halt the system clocks and freezes error status in the embedded scan state.

8.3.2 Parity Generation

Two cycles after the READ RESPONSE to an instruction cache miss's READ MULTIPLE, the DITS is being updated. The DITS is also updated during RAM diagnostic operation and during entry invalidation. In all cases, parity is generated the cycle before the RAM write.

Embedded state may force the DITS_PARITY to always be 1, or always be 0.

8.4 Data Cache Duplicate Tag Store Parity

The CBA IC maintains and checks parity on the 18 bits of the DOTS' RAM's. There is one parity bit over all 18 bits, DOTS_PARITY.

Odd parity is maintained, that is the sum of all ones in the 18 bits of data plus the parity bit should be odd.

DOTS_PARITY is bidirectional and is accessed in the same cycle as the tag contents. The DOTS parity is always good.

8.4.1 Parity Checking

The parity is *always* checked on the DOTS_DATA(29:12) unless the CBA gate array is sourcing it. The CBA gate arrays does so only in association with the READ RESPONSE phases of a data cache fill's READ MULTIPLE, during DOTS entry invalidation cancellation, or after a cacheable local store.

The parity is checked in the cycle after the RAM access. This may change if timing permits. If a parity error is detected, a hardware fault is assumed. The CBA gate array requests the SCR to halt the system clocks and freezes error status in the embedded scan state.

8.4.2 Parity Generation

Two cycles after the READ RESPONSE to an cacheable data cache miss's READ MULTIPLE, the DOTS is being updated. The DOTS is also updated during RAM diagnostic operation and during entry invalidation. Finally, the DOTS is updated two cycles after a locally generated cacheable write is transfered on the bus. In all cases, parity is generated the cycle before the RAM write.

Embedded state may force the DOTS_PARITY to always be 1, or always be 0.

CHAPTER 9  RAM SELFTEST

9.1 DTS RAM Diagnosis

The BIF CBA provides assistance for the accelerated and simultaneous testing of both the DITS and DOTS external RAM's and address logic. Four functions are provided that may operate at functional clock speed.

- 16K entries may be set to a fixed value.

- 16K entries may be read and compared against a fixed value.

- 16K entries may be set to an incrementing value. A modulo 15 counter is used. Data is replicated every 4 bits.

- 16K entries may be read and compared against an incrementing value. Data is replicated every 4 bits.

The parity bits associated with these RAM's may also be controlled. They may be jointly forced to 1, jointly forced to 0, or allowed to operate functionally. During the read and compare mode, the similarly controlled parity is checked for.

Only the CBA and the external MSI should be clocked while in this test mode. The number of locations to fill, or check, is decided by the *burst count* field in the SCR.

9.1.1 DTS Address Generation

Setting the DTS_DIAGADDR bit in the CBA scan path will cause an alternative DTS address source to be used. The address will begin at the value scanned into the DTSINDEX register. The address will increment through 14 bits with every functional clock.

The address is sent to both DITS and DOTS concurrently.

9.1.2 DTS Data Generation

Clearing the DTS_DATALD bit in the CBA scan path will cause whatever value is loaded into the DTSDATA register to be held for the duration of the RAM test. The generated parity is whatever was scanned into the DTSDATA parity flops.

Setting the DTS_DATALD bit will cause the DTSDATA register contents to increment every cycle. On four bit boundaries, the data will increment 0,1, ... 14, then recycle. A count modulus that was relatively prime to the RAM address was chosen. The generated parity will either be correct, or all ones or all zeroes, depending on the state of force parity sense scan bits in the CBA, FORCE_PARITY(1:0). Code 00 is normal, code 10 is force all zeroes and code 11 is force all ones.

9.1.3 DTS Data Writing

Setting the DTS_DIAGWE bits in the CBA scan path will cause the DTS data source be written every cycle.

9.1.4 DTS Data Comparison

Clearing the DTS_DIAGWE bit will cause the RAM data to be compared to the DTSDATA register every cycle. The parity bits will be checked for as well as the data.

If a compare error is found, the scan bit DTS_TESTERR is set. Once set, the bit remains so until cleared by scan.

In functional operation, this bit will probably frequently be inadvertantly set.

9.2 Cache Data RAM Diagnosis

The BIF CBA provides assistance for the accelerated and simultaneous testing of both the INST and DATA RAM's and address logic. Four functions are provided that may operate at functional clock speed.

- 16K entries may be set to a fixed value.

- 16K entries may be read and compared against a fixed value.

- 16K entries may be set to an incrementing value. A modulo 15 counter is used. Data is replicated every 4 bits.

- 16K entries may be read and compared against an incrementing value. Data is replicated every 4 bits.

The parity bits associated with these RAM's may also be controlled. They may be jointly forced to 1, jointly forced to 0, or allowed to operate functionally. During the read and compare mode, the similarly controlled parity is checked for.

Because the data cache is only one half the size of the instruction cache. The data cache testing with incrementing data values will have to be stopped after 8192 entries.

Only the CBA, CBD and the external MSI must be clocked while in this test mode. The MMU is likely to be clocked as well. MMU buried scan state must be set to drive the PA bus onto both the EASRC and PCSRC buses and to defeat the MMU's driving of the PA bus. MMU buried state must also force the selection of the data half of the data cache's data store. The secondary TB half of the data cache's data store will be diagnosed by the MMU. MMU buried state must force the write enable generation in the data cache RAM's when required. MMU buried state must prevent the MMU from inadvertantly sourcing the DATA or INST buses. The other IC's which touch these buses are assumed not to clock and to be loaded with a state vector that will keep them from interfering with the RAM diagnostic test. The number of RAM locations to fill, or check, is decided by the *burst count* field in the SCR.

9.2.1 Cache RAM Address Generation

The cache RAM address will be *derived* from the DTSINDEX. Setting the DTS_DIAGADDR bit in the CBA scan path will cause an alternative DTS address source to be used. The address will begin at the value scanned into the DTSINDEX register. The address will increment through 14 bits with every functional clock.

The address is sent to *through* the invalidate address pipeline to both instruction and data caches. This pipeline, on top of the external EA and PC registers, makes it a little harder to configure the address generation. The first desired address should be scanned into INVXFER, the second to INVARB, the third to DTSINDEX and the fourth and thereafter will be algorithmically generated.

Setting the DTS_DIAGADDR bit in the CBA scan path will also cause the PA bus to be sourced by the CBA and the invalidate address queue path to be chosen as CBA's internal the PA source.

9.2.2 Cache RAM Data Generation

Clearing the CACHE_DATALD bit in the CBD scan path will cause whatever value is loaded into the XDATAIN register to be held for the duration of the RAM test. The generated parity is whatever was scanned into the XDATAIN 8 parity flops.

Setting the CACHE_DATALD bit will cause the XDATAIN register contents to increment every cycle. On four bit boundaries, the data will increment 0,1, ... 14, then recycle. A count modulus that was relatively prime to the RAM address was chosen. The generated parity will either be correct, or all ones or all zeroes, depending on the state of force parity sense scan bits in the CBD, FORCE_PARITY(1:0). Code 00 is normal, code 10 is force all zeroes and code 11 is force all ones.

9.2.3 Cache Data Writing

Setting the CACHE_DIAGWE bits in the CBD scan path will cause the cache data source to be driven every cycle, and the cache data parity source to be driven every *next* cycle. It's expected that corresponding state in the MMU will generate the write strobes.

The writing of the RAM parity one cycle after the RAM data will make the proper testing of the last RAM parity location troublesome.

9.2.4 DTS Data Comparison

Clearing the CACHE_DIAGWE bit will cause the RAM data to be compared to the XDATAIN register every cycle. The parity bits will be checked for as well as the data.

If a compare error is found, the scan bit CACHE_TESTERR is set. Once set, the bit remains so until cleared by scan.

In functional operation, this bit will probably frequently be inadvertantly set.

9.3 Cache Tag RAM Diagnosis

The BIF CBA cache RAM diagnostic address generation can be used for the cache tag RAM diagnosis. The MMU is responsible for data sourcing and comparison.

9.4 Secondary TB Data RAM Diagnosis

The BIF CBA cache RAM diagnostic address generation can be used for the secondary TB data RAM diagnosis. The MMU is responsible for data sourcing and comparison.

APPENDIX A

PIN DEFINITION

A.1 X-Bus Interface

This section describes the set of signals of the bus interface chips which actually are used to communicate on the X-Bus. A more detailed description of the X-Bus and its operation can be found in the *X-Bus AT Specification (KLINE 86)*. The *CPX_* prefix for the X-Bus signals denotes the CPU's transceived X-Bus, rather than the backplane.

CPX_DATA[63:0]     CBA: 32 io     CBD: 32 io

The CPX_DATA bus is the transceived version of the X-Bu's multiplexed address and data signals. The CBA will drive and receive the most significant 32 bits of this bus for address information and CSR access while the CBD's will drive and receive the entire bus for data information. One data chip will access all the even bytes of the bus and the other all the odd bytes.

The CPX_DATA[63,62,1,0] signals also hold the 4 valid byte indications needed on the 32 bit read and write commands. When CPX_DATA[63] is asserted, CPX_DATA[31:24] is to be read or written.

CPX_PARITY[7:0]     CBA: 4 ts_o     CBD: 4 io

The CPX_PARITY bus will reflect the byte parity of the CPX_DATA bus where CPX_PARITY[0] is an odd parity bit for CPX_DATA[63:56]. Parity will be maintained such that the sum of all the bits that are set in a byte plus the parity bit for that byte will equal an odd number. ( An all zero byte will have a parity bit of 1. ) Parity will be driven when the CPX_DATA bus is driven and checked by this interface when addressed.

CPX_VPNIN[4:0]     CBA: 5 io

The CPX_VPNIN bus receives the 5 least significant X-Bus VPN bits needed by the CBA for proper indexing of the DTS and primary caches.

When the CBA observes a write operation occuring on the bus, including one that it generated, it will use a concatenation of CPX_VPNIN[4:0] and CPX_DATA[43:35] as an index into the Duplicate Instruction Tag Store (DITS) and CPX_VPNIN[3:0] and CPX_DATA[43:35] as an index into the Duplicate Operand Tag Store (DOTS).

CPX_VPNOUT[6:0]     CBD: 4 out

The CPX_VPNOUT bus is driven by the two CBD gate arrays. One drives 3, the other 4 signals. The CPX_VPNOUT bus is sourced during a BIF address transfer.

CPX_ID[3:0]     CBA: 4 io

The CPX_ID bus is driven with the Board ID when the CBA is using the X-Bus. CPX_ID is monitored to detect a match with Board ID when a READ RESPONSE is decoded on the bus. A match signifies that this CBA is the destination of the READ RESPONSE transfer.

CPX_SUBID[0]     CBA: 1 io

The CPX_SUBID pin is used by the CBA to distinguish between a data cache and an instruction cache READ RESPONSE when both requests are outstanding. The CBA also receives and returns this signal during BIF CSR access.

CPX_CMD[4:0]     CBA: 5 io

The CPX_CMD bus is driven and monitored to signal the type of bus cycle being performed. See the *X-Bus AT Specification* for a detailed description of the bus operations.

The CBA will only generate and respond to a subset of the commands.

CBA_ACK[1:0]     CBA: 2 io     CBD: 2 in

The CBA_ACK bus is driven and monitored by the CBA to signal and receive the status of a bus transaction. The CBA drives CBA_ACK only for a successful acknowledge, or non-parity related transfer failure. The CBD monitors this signal only to make write queue unloading and arbitration result decisions. The encodings are listed in the following table:

| Code | Response | Description |
| --- | --- | --- |
| 11 | ERROR | Parity error or command reject on previous transmission |
| 10 | BUSY | Destination device is not available to accept a command now |
| 01 | CMD ACCEPTED | Positive acknowledgement |
| 00 | NO RESPONSE | No device has responded |

Activity on the CBA_ACK bus alway refers to the bus cycle that occured two cycles earlier.

CBD_ACK[1:0]     CBD: 2 out

The CBD_ACK bus is driven by the CBD's when a parity error on received bus data is detected, and this bus interface was the destination. The are two bus's on the board, CBD0_ACK(1:0) and CBD1_ACK(1:0) logically or'd by the backplane drivers.

CPX_ARB_INHIBIT     CBA: 1 io     CBD: 1 In

The CPX_ARB_INHIBIT signal will be asserted by the CBA during all but the last cycle of a multi-cycle transaction for which it has ownership of the bus for. The CBA will never attempt to use the X-Bus the cycle immediately following a cycle in which the ARB signal has been deasserted. The CBD monitors this signal to deduce the arbitration result.

CPX_LOCKIN     CBA: 1 in

The CPX_LOCKIN signal is received by the CBA. If the CBA has a READ operation pending which wants the bus lock, it will not attempt to arbitrate for the bus until the CPX_LOCKIN signal is unasserted or if it is the one that is asserting CPX_LOCKOUT.

CPX_LOCKOUT     CBA: 1 out

The CPX_LOCKOUT signal is asserted by the CBA when it has conducted a READ bus cycle that needed the bus lock. The CBA will keep CPX_LOCKOUT asserted until it completes either a READ or WRITE operation which releases the bus lock, or a lock timeout occurs.

| | | |
|---|---|---|
| CPX_AREQ | CBA: 1 in | CBD: 1 in |

The CPX_AREQ signal is a transceived version of AREQ_SUM on the backplane. This signal is asserted if any of the class A devices, all of which are at a higher priority than a CPU, want the bus.

| | | |
|---|---|---|
| CPX_BREQ(3:0) | CBA: 4 in | CBD: 4 in |

The CPX_BREQ signals are the transceived version of the class B request lines on the backplane. The CBA will be assigned one of these request levels. The arbitration algorithm is described in section 2.1. Both CBA and CBD monitor these signals to concurrently decide arbitration outcome.

| | |
|---|---|
| CPX_MYREQ | CBA: 1 out |

The CPX_MYREQ signal is driven by the CBA when the X-Bus is required and not already held.

| | |
|---|---|
| CPX_REJECTIN | CBA: 1 in |

The CPX_REJECTIN signal will monitored by the CBA to determine if a CSR write or read should be cancelled.

| | |
|---|---|
| CPX_REJECTOUT | CBA: 1 out |

The CPX_REJECTOUT signal will be driven by the CBA the cycle immediately following one in which the CBA was the bus master, when the effects of that last transaction are to be aborted.

| | |
|---|---|
| DRIVEXA- | |
| DRIVEXB- | |
| DRIVEXC- | |
| DRIVEXD- | |
| MYACK- | CBA: 5 out |

These 5 signals enable the X-Bus transceivers. The signals are sourced by the CBA.

A.2 MMU Interface

| | | |
|---|---|---|
| PA[29:0] | CBA: 30 Io | CBD: 3 in |

The PA bus provide the physical address for all memory references made by the MMU. Physical addresses are presented to the CBA for processor writes, table walking, read miss requests, all read/write/fetch requests when the MMU is disabled, fetch miss requests, and for broadcasting TLB invalidates. This bus is tristated when the CBA secures it for a data cache, instruction cache, or TLB invalidate. In this case, the CBA drives the PA bus with the invalidate address which is then routed to the EASRC or the PCSRC bus via the invalidate transceivers depending upon the type of invalidation being requested. The CBD receives the 3 lower order pins to permit it to determine which bytes are valid on a write.

| | |
|---|---|
| PCVPN[6:0] | CBD: 4 in |

The 7 PCVPN signals are received by the CBD's and forwarded to the CPX_VPNOUT for processor reads and writes. One CBD handles 4 signals, the other 3.

EAVPN[6:0]                                         CBD: 4 in

The 7 EAVPN signals are received by the CBD's and forwarded to the CPX_VPNOUT for processor reads and writes. One CBD handles 4 signals, the other 3.

MMU_CMD[4:0]              CBA: 5 in         CBD: 5 in

A memory request is initiated when the MMU by asserting the MMU_CMD[4:0] signals. The interpretation table is in chapter 3 and 4.

The CBA/CBD will always accept commands from the MMU_CMD bus unless WBUF_FULL is asserted. The MMU_CMD bus, together with PA(2:0), determine which bytes are affected if the operand size is less than or equal to eight bytes.

BIF_PAARB[1:0]            CBA: 2 out

For the interactions between the BIF and the MMU that require the use of the EASRC, PCSRC, or PA busses, the BIF will assert BIF_ARB[1:0] to aquire control of the necessary buses. The encoding is available in chapters 3 and 4.

BIF_INVOP[1:0]            CBA: 2 out

When the BIF detects a write on the X-Bus that hits on the local processor's cache it issues a cache invalidate request by first arbitrating for the appropriate buses and in the following cycle, asserting BIF_INVOP signals, which cause the MMU to clear the valid bits in the identified caches or TB. The encoding of BIF_INVOP[1:0] is available in chapters 3 and 4.

If the BIF detects that a write over the X-Bus that collides with an outstanding cache fill request, which is not in the DTS, it asserts the code for Cache Invalidate on the BIF_INVOP lines so that the subsequently returned data is allocated as invalid in the appropriate cache.

MEM_RESP[2:0]           CBA: 3 out

The CBA asserts MEM_RESP in response to a load or fetch MEM_CMD. MEM_RESP indicates the disposition of the returning read data in the cache. The encoding is available inchapters 3 and 4.

HOLD_IVPN                           CBD: 1 in

HOLD_IVPN is asserted whenever the IVPN is not immediately succeeded, in the next cycle by the PA and the MEM_CMD, which is the case for icache misses that must wait for use of the PA/MEM_CMD busses, for example.

HOLD_DVPN                             CBD: 1 in

HOLD_DVPN is asserted whenever the DVPN is not immediately succeeded, in the next cycle by the PA and the MEM_CMD, which is the case for write buffer full stalls, for example.

MMU_HDATA_LD          CBA: 1 in         CBD: 1 in

The MMU assists the CBD in the load control of its input holding register to its write buffer. This signal is asserted when the MMU wishes to allow a previously transmitted data to be loaded into the write buffer, and to free up the input holding register for another transaction. The CBA monitors this signal as well.

WBUF_FULL             CBA: 1 out

WBUF_FULL is asserted by CBA when it can only take one more write request before its write buffer fills.

A.3     IP Interface

BUS_TRAP_REQ(2:0)      CBA: 3 out

BUS_TRAP_REQ is asserted to the IP when the CBA requests an external interrupt, non-maskable extrernal interrupt or BIF related error such as lock timeout, or write no response.

TRAP_DISP              CBA: 1 in

TRAP_DISP signals that the IP is entering a trap sequence. The signal always releases the bus lock, if held.

A.4     Duplicate Tag Store Interface

DTS_INDEX_SRC[16:03]     CBA: 14 out

The DTS_INDEX_SRC bus is used to load the external address register that's used to jointly address the duplicate instruction and data cache tag store rams.

DITS_DATA[29:12]        CBA: 18 Io

The DITS_DATA bus is used to read and write the instruction cache duplicate tag store contents.

DITS_PARITY            CBA: 1 Io

DITS_PARITY will contain parity information for the DITS.

DOTS_DATA[29:12]        CBA: 18 Io

The DOTS_DATA bus is used to read and write the data cache duplicate tag store contents.

DOTS_PARITY           CBA: 1 Io

DOTS_PARITY will contain parity information for the DOTS.

DTS_CMND[1:0]          CBA: 2 out

DTS_CMND indicates what functions, read or write, are to be performed on the duplicate tag stores.

A.5 Cache Interface

DATA[63:00]   CBD: 32 Io

The 64 bit data cache data bus is directly received and driven by the CBD's. Each IC handles 4 bytes, split even and odd.

DATA_IPARITY[7:0]   CBD: 4 in

There are 8 data cache parity signals. There are separate input and output signals, reflecting the external 16Kx1 RAM organization. DATA_IPARITY are the 8 RAM *outputs*. The CBD will check data cache data parity based on these. Again, there is an odd/even byte split.

DATA_OPARITY[7:0]   CBD: 4 out

There are 8 data cache parity signals. There are separate input and output signals, reflecting the external 16Kx1 RAM organization. DATA_OPARITY are the 8 RAM *inputs*. The CBD will generate and source data cache data parity onto these. Again, there is an odd/even byte split.

CHECK_DATA   CBD: 1 in

The CHECK_DATA signal is externally derived and instructs the CBD IC's when to check data cache parity.

INST[63:00]   CBD: 32 Io

The 64 bit instruction cache data bus is directly received and driven by the CBD's. Each IC handles 4 bytes, split even and odd.

INST_IPARITY[1:0]   CBD: 1 Io

There are 2 instruction cache data parity bits. One covers all odd bytes, and one all even. The signals are bidirectional. Instruction cache data parity is checked and generated by the CBD's.

A.6 CBA-CBD Control

WBQ_CTL(2:0)]   CBA: 3 out   CBD: 3 in

A three bit code from the CBA instructs the CBD to transmit, load or load and merge write data.

NEXTREQ[1:0]   CBA: 2 out   CBD: 2 in

A two bit code from the CBA to the CBD informs the latter of the results of the internal arbitration; i.e., what goes next on the bus.

FILL_CTL[1:0]   CBA: 2 out   CBD: 2 in

A two bit code from the CBA to the CBD controls whether to drive the data or instruction cache data bus.

DUPMS                    CBA: 1 out         CBD: 1 in

The DUPMS signal from the CBA to the CBD instructs the latter to duplicate the more signifcant 32 bits of data on the DATA[31:00] signals for the benefit of the MMU.

DELAYDATA                CBA: 1 out         CBD: 1 in

The DELAYDATA signal from the CBA to the CBD causes the CBD to inject a one cycle delay in the return of read data.

DEST_IS_ME               CBA: 1 out         CBD: 1 in

The DEST_IS_ME signal from the CBA to the CBD causes the CBD to drive its CBD_ACK bus in the next cycle, to generate an error acknowledge, if there is a parity mismatch on currently held X-Bus data.

A.7  Miscellany

CLOCK_STOP-              CBA: 1 od          CBD: 1 od

Each IC in the system may cause the clock to freeze in the event of hardware error. CLOCK_STOP- is an open drain signal asserted low to request a clock freeze of the SCR.

SCAN_CTRL[6:0]           CBA: 7             CBD: 7

There are 7 scan path control signals: A, B, C, D, and E plus scan data in and scan data out.

CLOCK                    CBA: 4 in          CBD: 4 in

There are 4 clock trees on each IC. Each tree requires a separate input pin.

VDD                      CBA: 18            CBD: 11

GND                      CBA: 36            CBD: 22

A.8  Pin Count Summary

ALLOCATED PINS:          CBA: 247           CBD: 198

SPARE PINS:              CBA: 9             CBD: 10

APPENDIX II

Chapter 2
X-Bus

2.1 Overview

The X-Bus is the medium used for communications between the eight (future systems based on this design may use up to twelve) interconnecting processors, memory systems, and interfaces within the Series 10000 system. It is implemented using open-collector drivers where signals are active low on the bus. Each device on the X-Bus uses it for all communications (data transfers, requests for data transfers, interrupts, etc.) with other system devices. The X-Bus supports tightly coupled processors, but there is no requirement that the processors in the system be tightly coupled.

The X-Bus is a synchronous bus that achieves its performance by dividing all bus transfers into a set of one or more bus transactions. Each bus transaction consists of the maximum amount of information that can be transferred within a single bus cycle. The bus cycle is defined by the CLOCK* signals. During a given bus cycle there is enough time to pass an address and/or data from one device to another. Devices are not allowed to hold the bus for memory access times. The full bandwidth of the bus is available for transferring information from device to device and is not impacted by a slow device on the bus.

The 64-bit wide X-Bus connects several heterogeneous and/or homogeneous processors, memory systems, and interfaces within the Series 10000 system. Each device on the bus uses the bus for all communications with other devices. The communications operations include data transfers, requests for data transfers, interrupts, and TB invalidate operations.

The X-Bus has a 64-bit wide data path with several devices connected to it. Each device on the bus has a unique device ID, which is used as part of the address selection mechanism during certain types of commands. Any device on the bus may arbitrate for the bus, become master on the bus, and send a command to any other device on the bus.

These commands occupy the bus for a single cycle, although the command operations may occupy the bus for several cycles. WRITE transfers both address and data information while READ transfers only address information. The device receiving these commands responds with an acknowledgment and completes the requested operation. During read operations, the receiving device gains access to the X-Bus and initiates a READ RESPONSE command to the requesting device when the data is available. After the the READ or READ MULT command initiation, and before the READ RESPONSE, the bus is available for other bus transactions.

2.2 Conventions

This section explains the X-Bus register conventions.

2.2.1 Data Formats

The basic data structures used are the byte (8 bits), word (16 bits), long word (32 bits), and the quad word (64 bits). The least significant bit of each of these data structures is bit 0, the most significant bit is bit N-1 (where N is the number of bits in the data structure). The most significant byte in each structure is byte 0, the least significant byte is byte M-1 (where M is the number of bytes in the data structure).

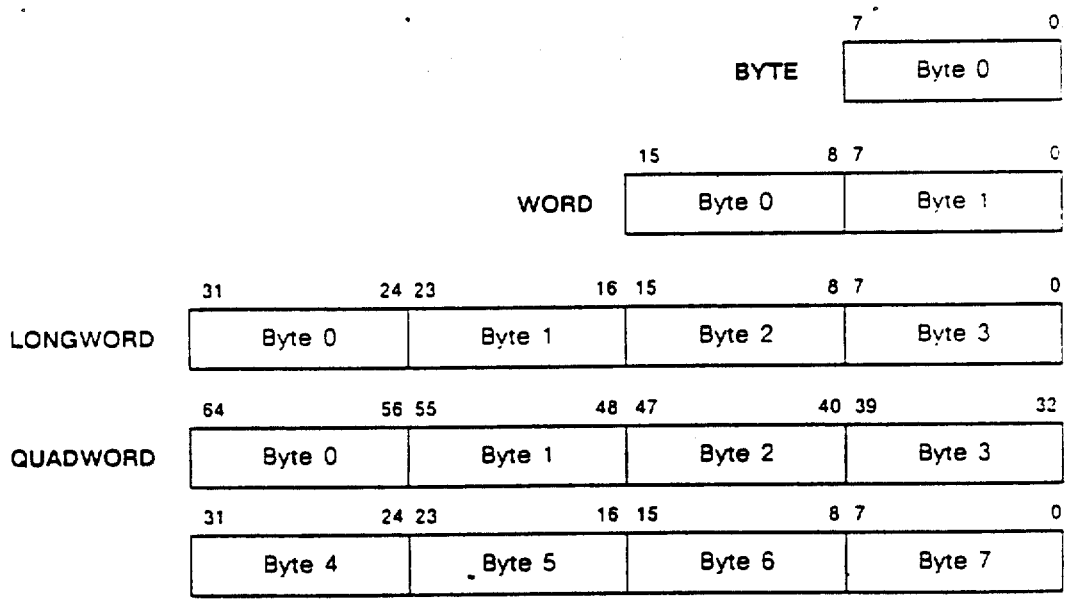

*Figure 2-1. Data Formats*

2.2.2 Parity

The parity on the X-Bus data fields is odd parity (i.e., the total number of ones in the data field, including its associated parity bit, equal an odd number where a one is true high) unless specified otherwise.

2.3 X-Bus Signal Definitions

Subsections 2.3.1 through 2.3.3.22 contain descriptions of the X-Bus signals.

NOTICE: An asterisk (*) after a signal name indicates that the signal is active-low (true). States in this manual refer to the state of the signal on the backplane. Most drivers/receivers invert the signal so it is seen on the backplane as Signal_Name*.

2.3.1 X-Bus Address Path Signals

The X-Bus address path contains the following elements:

- 28-bit Physical Address — ADR*(29:2)/DAT*(61:34)
- 4-bit Valid Byte field — VALDBYT*(3:0)/DAT*(63,62,33,32)
- 7-bit Virtual Address Page Number — VPN*(6:0)
- 4-bit Device ID — ID*(3:0)
- 2-bit Subdevice ID — SUBID*(1:0)

2.3.1.1 ADR*

The ADR* field is used to select a device on the X-Bus and to specify an offset within that device's address space. The address contained in ADR* is a 30-bit longword address that is right justified in the field. Data elements that are only a portion of a 32-bit word are specified via the VALDBYT* field. Writes on the X-Bus consist of a write address and a 32-bit data transfer, or a write address followed by one or more 64-bit data transfers. Reads may involve multiple 64-bit data transfers or a single 32-bit transfer.

A WRITE MULT transfer must start and end on an even boundary. A READ MULT transfer may start and end on an odd boundary. A transfer that starts on a 32-bit boundary, but not a 64-bit boundary, is indicated by ADR*(2) = 1 in a MULT transfer. A WRITE or READ MULT transfer may end by writing only the most-significant 32 bits of a 64-bit word. If ADR*(2) = 1 and the number of 32-bit words to be transferred is even. A READ MULT transfer may only end this way if ADR*(2) = 0 and the number of 32-bit words to be transferred is odd. ADR* is shared with the most-significant bits of the data path DAT*(63:32). The parity bits DATP(0:3) must be valid whenever the ADR* field is asserted.

2.3.1.2 Addressing

Except for commands such as READ RESPONSE and INVALIDATE, devices determine whether a bus transaction is directed to it based on ADR(29:22). Devices such as memory controllers, I/O interfaces, and graphics controllers have a set of programmable registers, accessible via the Diagnostic Bus (D_Bus), which determine the address range of messages directed to it. Processor devices reside in the address range 0. If ADR(29:22) are zero, devices must compare ADR(21:18) with their Device ID to determine if the transaction is directed to it. This is the mechanism for addressing system level control and status registers, and processors. Memory controllers must respond to both an address range and an ID-directed address. If the command for the transaction is a READ RESPONSE, devices must compare their ID with the ID field to determine if the transaction is for it.

General X-Bus Addressing

| 31 30 29 | 22 21 | 02 01 00 |
|---|---|---|
| Address Range | Address Offset | |

*Figure 2-2. General X-Bus Addressing*

*Table 2-1. Address Space*

| Address Range | Size | Device |
|---|---|---|
| 00.000.000 - 00.3FF.FFF | 4 MB | Control Registers |
| 00.400.000 - 07.FFF.FFF | 124 MB | Reserved (Disk and Network Controllers) |
| 08.000.000 - 0F.FFF.FFF | 128 MB | Service Processor |
| 10.000.000 - 17.FFF.FFF | 128 MB | Graphics Processor 1 |
| 18.000.000 - 1F.FFF.FFF | 128 MB | Graphics Processor 2 |
| 20.000.000 - 2F.FFF.FFF | 256 MB | Memory Controller 1 |
| 30.000.000 - 3F.FFF.FFF | 256 MB | Memory Controller 2 |

X-Bus Control Register Addressing

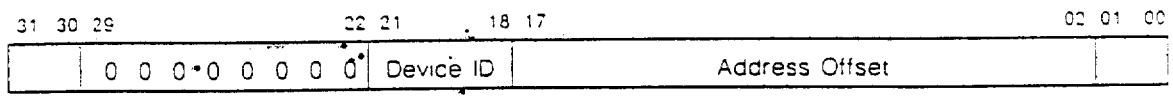

*Figure 2-3. X-Bus Control/Status Register Addressing*

*Table 2-2. Control Register Address Space*

| Device ID | CSR Range | Device |
|---|---|---|
| 0 | 000.000 - 03F.FFF | CPU 0 |
| 1 | 040.000 - 07F.FFF | CPU 1 |
| 2 | 080.000 - 0BF.FFF | CPU 2 |
| 3 | 0C0.000 - 0FF.FFF | CPU 3 |
| 4 | 100.000 - 13F.FFF | Unused |
| 5 | 140.000 - 17F.FFF | Graphics Processor 1 |
| 6 | 180.000 - 1BF.FFF | Graphics Processor 2 |
| 7 | 1C0.000 - 1FF.FFF | Reserved |
| 8 | 200.000 - 23F.FFF | Disk Controller 1 |
| 9 | 240.000 - 27F.FFF | Disk Controller 2 |
| A | 280.000 - 2BF.FFF | Network Controller |
| B | 2C0.000 - 2FF.FFF | Service Processor * |
| C | 300.000 - 33F.FFF | Reserved |
| D | 340.000 - 37F.FFF | Memory Controller 1 |
| E | 380.000 - 3BF.FFF | Memory Controller 2 |
| F | 3C0.000 - 3FF.FFF | Unused |

\* The Service Processor is assigned a device ID of 'B', but it does not use the Specified CSR range.

2.3.1.3 VALDBYT*

VALDBYT* is used only on READ or WRITE commands to indicate which bytes within the 32-bit word addressed by ADR* should be written or read. On a write operation, VALDBYT*(3) = 1 indicates a write to bits 24 through 31 (most-significant byte) of the 32-bit word. VALDBYT*(0) = 1 indicates a write to bits 0 through 7 (least-significant byte) of the 32-bit word. On read operations, VALDBYT* has significance only when reading a location has some side effects (that is, reading a control register in an I/O device controller, or causing a halfword or byte transfer on the VMEbus). One of the VALDBYT* bits being set or not set does not determine whether the data for that particular location is placed on the X-Bus.

Because VALDBYT* is only significant when an address is on the X-Bus, it shares the DAT* field with ADR* when ADR* is valid on the bus.

2.3.1.4 VPN* (Virtual Page Number)

VPN* is used to maintain cache coherency among the various processors in the system. ADR* represents a physical address, while the processor caches are virtually indexed. The Virtual Page Number (VPN*) part of the virtual address is placed on the X-Bus along with the physical address. This provides the information needed to invalidate entries in the caches during a write over the X-Bus. The cache logic monitors this field along with the ADR* and ID* fields to determine if there is a cache hit. If there is a cache hit, and it is caused by another device writing into that location, the cache logic has to invalidate or update that location in its cache.

The logic that handles read data for caches must also pay attention to this field. Writes to a location that has a read pending must flag the read so that it does not appear in the cache as a valid entry. VPN* is actually bits 18 through 12 of the virtual address (the virtual page number). Although the VPN* is used only during X-Bus write operations, it is permissable to place information in this field during all X-Bus operations.

The VPN* information is conveyed to the I/O interfaces as part of the I/O mapping tables setup, prior to the initiation of an I/O transfer. If the new virtual-to-physical mapping is not known when these tables are set up, the previous virtual mapping of the page is used in the VPN*. This causes any cache entries for the old mapping to be invalidated while the I/O transfer is in progress. For certain operations (that is, the Service Processor modifying a portion of memory), the relevant VPN* information is not known. Therefore, memory modification by the SP must be handled very carefully. All the processors must be brought to an idle state before the SP can make its transfer. After the SP transfer, all the caches must be invalidated.

2.3.1.5 ID*

The ID* field has two main uses. During most commands it is used to identify the device that has the bus. During the READ RESPONSE command it is used to identify the device that is to receive the data. Each device on the X-Bus is assigned a unique ID, via a Device ID field, that is loaded at system initialization. Each device places its Device ID into the ID field when it is accessing the X-Bus. It is, however, possible that another device's Device ID can be placed there under special circumstances (that is, X-Bus diagnostic testing). It may also be possible for one device to issue a read request and direct the data to another device by putting the other device's Device ID in the ID* field when issuing the request. In this mode of operation, the other device must be ready to accept the incoming data.

2.3.1.6 SUBID*

The SUBID* field is used to distinguish between two or more pending read operations from a given device. Because read operations can take several cycles to complete, a device may issue several read operations before any data is returned. Depending on the implementation of the memory controller, the data may not be returned in the order in which the reads were initiated. Therefore, the initiating device assigns a unique SUBID* field to each read operation that is initiated. The slave device returns the SUBID* field when it returns its data. The device uses this field to identify which request the response is satisfying. This mechanism is useful in the case of a processor board that has independent Instruction and Data caches, where each could make its own read request to memory.

2.3.2 X-Bus Data Path Signals

The X-Bus data path contains the following elements:

- 64-bit Data Path — DAT*(63:0)
- 8-bit Data Parity field — DATP*(7:0)

2.1 DAT*

During commands such as READ or WRITE, DAT*(63:32) is used as the ADR* path. During WRITE commands, DAT*(31:0) is used to transfer the data that is to be written. During READ RESPONSE commands, DAT*(63:0) is used to transfer the data.

2.3.2.2 DATP*

The parity bits DATP*(7:0) are associated with the DAT* bits in the following manner:

- DATP*(0) is the parity bit used with DAT*(63:56)
- DATP*(1) is the parity bit used with DAT*(55:48)
- DATP*(2) is the parity bit used with DAT*(47:40)
- DATP*(3) is the parity bit used with DAT*(39:32)
- DATP*(4) is the parity bit used with DAT*(31:24)
- DATP*(5) is the parity bit used with DAT*(23:16)
- DATP*(6) is the parity bit used with DAT*(15:8)
- DATP*(7) is the parity bit used with DAT*(7:0).

Parity bits should be valid for all bytes in the transfer, regardless of whether the data will actually be used.

2.3.3 X-Bus Control Path Signals

The X-Bus control path contains the following elements:

- 5-bit Command field — CMD*(4:0)
- 2-bit Acknowledge field — ACK*(1:0)
- Inhibit Arbitration signal — INH_ARB*
- Bus Lock signal — LOCK*
- X-Bus Lock Request — X_LOCK_REQ*
- 12 Bus Request lines — BUSREQ*(11:0)
- Reject signal — REJ*
- Reset signal — RESET*
- Eight Clock lines — CLOCK*(7:0)
- One Bus Request Summary line — BUSREQ_SUM*

2.3.3.1 CMD*

The CMD* field is driven by the device that is master on the X-Bus during any given cycle. Typical commands are READ, WRITE, READ RESPONSE, etc.

There are a set of commands that specify a bus broadcast mode where one device may send a command to all other devices or some subset of devices on the bus. If the two most-significant bits of the command field are set, the command is a broadcast command and all devices on the X-Bus accept the command. The bits in the ADR* field could be used as a mask field to indicate that only a subset of the devices on the X-Bus can pay attention to the current broadcast command. The implementation of this feature requires the following special considerations:

- The acknowledge phase of the transfer must be inhibited.
- Each device that is capable of receiving such a transfer must be able to unconditionally accept such a transfer.

The acknowledge phase must be inhibited to avoid unpredictable results if several devices were trying to acknowledge a transfer at the same time. If a transfer that requires a positive action (that is, invalidating a TB entry) is sent to a device, and the device is not capable of accepting the transfer, system damage may result because the master device does not get any indication that the transfer is not successful.

Table 2-3 shows the command codes used in the CMD* field.

*Table 2-3. X-Bus Command Code Descriptions*

| Code on Backplane | Command | Description |
|---|---|---|
| 00000 | WRITE | Write a word of data to the destination device |
| 01000 | READ | Initiate a read operation on destination device, single word |
| 01111 | READ RESPONSE | Return of longword as a result of a prior READ operation |
| 00111 | WRITE DATA | Data transfer associated with a WRITE MULT command |
| 00100 | WRITE MULT | Initiate a write operation of one or more 32-bit longwords |
| 01100 | READ MULT | Initiate a read operation on destination device, longwords |
| 01110 | READ RESP ERR | Return of longword with an uncorrectable error |
| 11xxx | broadcast command | A command that is sent to all devices on the X-Bus |
| 11100 | INVALIDATE TB | Invalidate all TB entries (Broadcast) |
| 11110 | INVAL TB SEL | Invalidate selected TB entry (Broadcast) |
| 11111 | NOP | No Operation |

2.3.3.2 ACK*

The ACK* field is driven in cycle N+2 by the slave device in cycle N. Typical responses are ERROR, COMMAND ACCEPTED, BUSY, and NO RESPONSE. NO RESPONSE is the response for a nonexistent device.

Table 2-4 lists the ACK* field response codes.

*Table 2-4. ACK* Field Response Codes*

| Code on Backplane | Command | Description |
|---|---|---|
| 00 | ERROR | Parity error or command reject on previous transmission |
| 01 | BUSY | Destination device is not available to accept command |
| 10 | CMD* ACCEPTED | Positive acknowledgement |
| 11 | NO RESPONSE | No device has responded |

Acknowledging BUSY signifies that the destination device is currently not able to accept the transaction but should be available to accept it soon. Unfortunately, the length of time that a device is busy can vary from device to device. It is a function of the command it is currently processing and the amount of X-Bus traffic. The VMEbus interface, for instance, could be busy for several hundred milliseconds, depending on the response time of the VMEbus device with which it is communicating.

If a device receives a BUSY acknowledgement to a given transaction, it retries the transaction.

2.3.3.3 BUSREQ

One BUSREQ line is assigned to each device on the bus. Each device looks at the BUS-REQ lines from the devices of higher priority on the bus, as well as its own. Each device is given a specific priority level. Whenever a device wants access to the bus, it asserts its BUSREQ line. During any cycle in which the INH_ARB* line is not asserted, each device that requests the bus looks at all the BUSREQ lines of higher priority. If none are active, it takes control of the X-Bus in the next cycle. When it takes control of the bus, the device deasserts its BUSREQ line and asserts INH_ARB* if it is going to hold onto the bus for more than one cycle.

Devices such as memory controllers are the highest priority devices on the X-Bus because it is important for them to empty their queues before further commands can be issued to them. I/O interface controllers are the next highest priority, thus preventing overrun conditons in time-critical devices. Processors are lowest priority on the bus.

2.3.3.4 BUSREQ_SUM*

The BUSREQ_SUM* line represents the logical OR of the BUSREQs from the Class A X-Bus devices. This means that the Class B devices do not have to look at all 11 other BUSREQs in the arbitration process. They only have to look at BUSREQ_SUM* and the three other Class B BUSREQs. The Class A devices have to look at only seven other BUS-REQs because they have higher priority than the Class B devices. The Class A devices generate BUSREQ_SUM* by driving this line low (signal is asserted true low) whenever they assert their BUSREQ signal. BUSREQ_SUM* is asserted whenever any Class A devices request the X-Bus.

2.3.3.5 INH_ARB*

The Inhibit Arbitration (INH_ARB*) signal is asserted true low. It is pulled up on the backplane so that its idle state is deasserted. The device that is master on the X-Bus may assert the signal to ensure that it maintains mastership of the bus for additional cycles. Arbitration for mastership of the bus proceeds whenever the INH_ARB* line is deasserted. The master holds this signal asserted for as long as it wants to hold the bus, typically not more than a few cycles. If the device is only going to use the bus for a single cycle, it should not assert INH_ARB* at all so that bus arbitration may proceed in parallel with its transfer.

2.3.3.6 LOCK*

The bus lock is the most primitive synchronizing method in the system. It is a single system-wide resource whose ownership is enforced by the backplane bus protocol. Instructions that reference memory can request the acquisition or release of the bus lock as part of the reference. When one processor holds the bus lock, any attempt by another processor to also acquire the bus lock results in the other processor stalling. Nonlocking memory operations by any processor are unaffected. The bus lock also plays a crucial role in assuring program sequentiality because that program's behavior is visible to a second processor.

The bus lock should be held for short time durations only. Extended holding of the bus lock may hinder multiprocessor performance. There is a timer maintained in the bus interface to limit the duration that a lock may be held to about 200 microseconds.

The processor's bus interface is designed to implement a lock acquisition fairness algorithm. The interface guarantees that every processor that requests the bus lock has an opportunity to secure it before any of the processors may reacquire the lock a second time. For this reason, the software does not require any minimum wait period between bus lock acquisitions that would otherwise be necessary to avoid lock starvation.

The bus lock can be acquired only by the load lock instruction. The lock is released under program control by either a load unlock or a store unlock instruction. The bus lock is also released in the hardware as a side effect of trap invocation. The bus lock may also be acquired and released in user mode.

Only one processor can hold the bus lock at a given time. Thus, the lock provides the basis for mutual exclusion. Holding a bus lock stops other processors from seizing it, but does not interfere with any other memory system activity. In particular, bus locks do not slow down either DMA or noninterlocked processor reads and writes.

Securing a bus lock guarantees that all memory stores prior to the load lock instruction have reached main memory. The load lock that flushes out any buffered writes guarantees that interlocked code can assume all instructions prior to the interlocked sequence executed without error. A second benefit of this is that the duration of time that a bus lock must be held is shortened.

2.3.3.7 LOCK_REQ*

X-Bus lock request is used by a processor requesting a bus lock. This signal is held in the lock protocol fairness arbitration scheme described in Subsection 2.3.3.6. Bus lock request ensures that a processor requesting a bus lock gets it before the current bus lock owner receives a second one.

2.3.3.8 REJ*

The REJ* line is used to invalidate the transfer in the previous cycle. REJ* in cycle N+1 is used when a processor wants to issue another write operation before it receives the acknowledge from its previous write operation (it still cannot execute writes in consecutive cycles). The processor actually issues the second write in the same cycle that it is receiving the acknowledge from the first write and then asserts or deasserts the REJ* signal in the cycle that follows the second write, based on whether it received a busy or positive acknowledgement to the first write. If the first write was not accepted, the second write is cancelled, preserving write order.

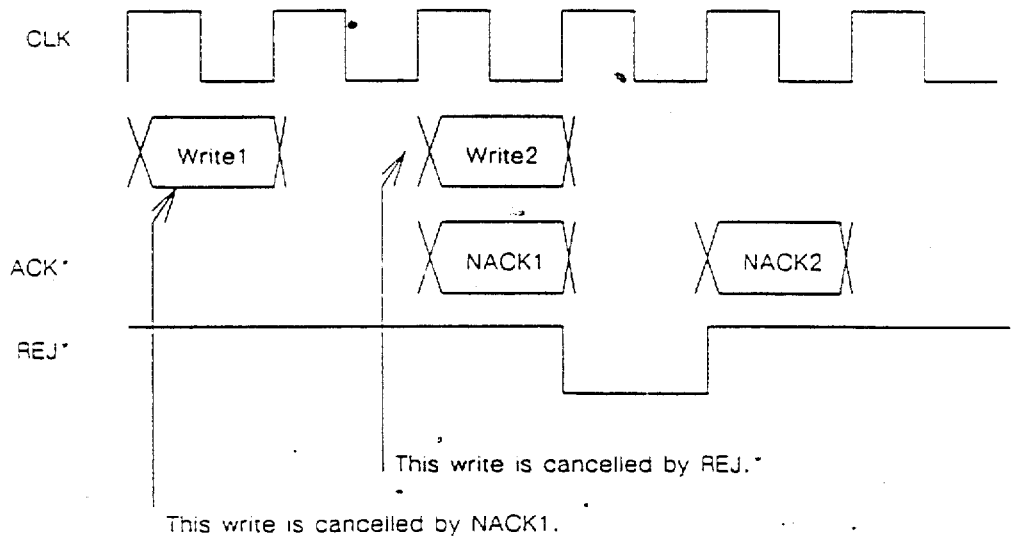

*Figure 2-4. Timing on Consecutive Writes from Same Device with the First Write NACKed*

2.3.3.9 RESET*

RESET* is a synchronous signal that is used to initialize all processors in the system. Using this signal ensures that important machine state information is not destroyed (that is, as might happen if the memory refresh circuitry were arbitrarily reset while a refresh is in progress). RESET* is held asserted at power-up time to ensure that there are no tri-state clashes on buses while interfaces are being initialized.

2.3.3.10 BUSRESET*

BUSRESET* is a synchronous signal that is used to clear a problem on the X-Bus. A bus monitor continually checks the bus to make sure that the INH_ARB* line is not asserted for an abnormally long period of time; if this condition occurs, BUSRESET* is asserted to remove the condition. Devices must use this signal to reset as much logic as necessary to remove an abnormal bus condition. BUSRESET* is asserted at power-up time to ensure that there are no tri-state clashes on the bus while interfaces are being initialized.

2.3.3.11 CLOCK*

One CLOCK* line goes to each device on the X-Bus. Each CLOCK* line carries a 50% duty cycle signal that runs at the X-Bus frequency. All CLOCK* lines are arranged to minimize the skew between them at the device's backplane slot. The loads, routing, and terminations on each device are carefully controlled so that each CLOCK* line sees identical loading. The CLOCK* signal is used as a reference input to the phase locked loop (PLL) on each device. The PLL, in conjunction with the SCR, generates a set of clocks that are synchronous and in phase with the clocks on all other devices, and run at the rate of the X-Bus.

2.3.3.12 ACLO

ACLO is a signal from the power controller that indicates the ac power is not within specifications. On a power-up situation, this signal will not be deasserted until the stability of the power source is ensured. On a power-down situation, ACLO will be asserted at least 5 msec before dc power becomes out of specifications. On power-up, the RESET* and BUS RESET signals are held asserted until at least 200 msec after ACLO is deasserted.

2.3.3.13 SHUT_SW

SHUT_SW is sent from the system's front panel to the SP on the Utility board. The SP sends SHUT_CMD to the power subsystem to shut down the system's power.

2.3.3.14 SHUT_CMD

SHUT_CMD is sent from the SP to the power supply to initialize a power shut down sequence.

2.3.3.15 TEMP1

TEMP1 is sent to the power supply when the temperature sensing circuitry senses that the temperature at certain checkpoints has reached a dangerous level. This signals the power supply to shut down, preventing possible system damage.

2.3.3.16 TO_SCR

TO_SCR is the line used to initialize communications from each X-Bus board to the SCR.

2.3.3.17 FM_SCR

FM_SCR is the line used to initialize communications from the SCR to each X-Bus board.

2.3.3.18 REQ_OUT

REQ_OUT is the arbitration line used by each X-Bus board to request use of the X-Bus.

2.3.3.19 +12V

+12V is the +12 volts signal from the PSE to the X-Bus controllers.

2.3.3.20 -12V

-12V is the -12 volts signal from the PSE to the X-Bus controllers.

2.3.3.21 -5V

-5V is the -5 volts signal from the PSE to the X-Bus controllers.

2.3.3.22 +5V

+5V is the +5 volts signal from the PSE to the X-Bus controllers.

2.4 X-Bus Arbitration

All X-Bus interfaces except the default owner must request the bus prior to use. There is one bus request level on the backplane for each X-Bus device. Devices are grouped into two classes. Class A devices are awarded the bus in strict priority order. Class B devices participate in fair arbitration and may also be default bus owners. CPUs are class B devices.

Bus arbitration is decentralized. Every bus interface decides for itself whether it has gained access to the X-Bus. Bus arbitration can be inhibited by asserting the ARB_INHIBIT backplane signal. Only the current owner of the bus may assert this signal. The current owner does so if the intended bus transfer requires multiple cycles.

2.4.1 Class A Request Override

To request the bus, a Class A device asserts both its assigned request level and the bus request sum line on the bus. When the BIF detects the bus request sum assertion in an active bus arbitration cycle, it defers to the class A device(s).

2.4.2 Class B/CPU Requesting

The Class B devices, the four CPUs also have fixed priority assignments. Priority assignments are 0 through 3, with 3 being the highest priority. The assignment is scanned into the BIF and used to determine which of the four Class B request parallel backplane signals each CPU uses. The CPU drives its assigned level, and defers to requestors at higher levels.

Class B devices exercise fair arbitration, and don't reassert their request lines on demand. Instead, Class B devices snapshot all other lower priority Class B request lines during the final cycle of a bus ownership. The Class B device then relinquishes the bus and doesn't reassert a request line until all the snapshotted requests are satisfied. The class B devices observe the current state of the other request lines to determine that the other requestors have been serviced. When a request line is deasserted, service is underway or completed. If a request line is still asserted, but arbitration is enabled, that requestor wins and service resumes.

2.4.3 Default Ownership

When the bus is otherwise idle, the last successful bidder among the Class B requestors remains as the default bus owner. The default bus owner may use the bus at the end of any cycle during which no other request line was asserted. The default bus owner does not have to assert its request line. The default remains in effect until another Class B device wins the bus.

A Class B device's bus ownership may be suspended by a Class A device. If a Class A device assumes control of the bus, the former Class B owner device waits for the bus to become idle again before reclaiming bus ownership (i.e., the Class B device reassumes ownership in the cycle following one during which arbitration was permitted, but does not assert its request line). If another Class B device wins the bus before it becomes idle, default bus ownership transfers to the latest Class B bus owner.

2.4.4 Acquisition Timeout

When a BIF first asserts a bus request line, it starts a timer. If the timer elapses before the bus is acquired, a bus acquisition timeout occurs. The bus timeout duration is approximately 3.2 milliseconds (16-bit counter). If a timeout occurs, the system is assumed broken and a clock freeze request is made of the SCR. The internal BIF state is preserved as much as possible.

The timer is not stopped until either a NOACK* or ACK* signal is received for the request address transfer. The timer, therefore, expires if a device is continually busy. Broadcast transfers, such as TB invalidates, stop the timer regardless of the acknowledge line state.

2.4.5 Local Request Prioritization

Three competing local requestors are internal to the BIF. They include data cache read, data cache write, and instruction cache read. Data cache read is prioritized over instruction cache read. In turn, instruction cache read is prioritized over data cache write. The following list contains exceptions to these rules:

- If the write data queue is full, data cache write is prioritized over an instruction cache miss.

- If a data cache miss collides in address with a previously queued write, data cache write is given priority over both data and instruction cache miss.

- If a write to an unencacheable memory location is queued, data cache write is given priority over both data and instruction cache misses.

- If a write and unlock is queued, data cache write is given priority over both data and instruction cache misses.

- If a data cache miss from an unencacheable memory location is posted, data cache write is given priority over both data and instruction cache misses.

- If a data cache miss and lock is posted, data cache write is given priority over both data and instruction cache reads.

- If a data cache miss and unlock is posted, data cache write is given priority over both data and instruction cache reads.

- If a tb invalidate is queued in the write buffer, data cache write is given priority over both instruction and data cache misses.

A locally generated READ RESPONSE required for a BIF CSR read is given precedence over all other transmitters.

2.4.6 Subsequent Request Arbitration Delay

The BIF issues subsequent requests from the data cache every other bus cycle (or later). This assures write order between processors, and read-write order within one processor. The instruction cache miss request is not restricted to every other cycle. For load and lock, load and unlock, and store and unlock, subsequent requests are not issued until a successful bus acknowledge of the prior request is received.

The BIF issues subsequent requests from a CPU every other bus cycle (or later). This assures write order. For load and lock, load and unlock, and store and unlock, subsequent requests are not issued until a successful bus acknowledge of the prior request is received.

A fair arbitration scheme is used among the processors, while a strict priority scheme si used for other X-Bus devices and the processor group. The memory controllers always have a higher priority than the processors, but one processor cannot lock out the other processors because of heavy X-Bus requirements.

2.4.6.1 Implementing Fair Arbitration

Implementating arbitration for the processor group is different from implementating arbitration for the other X-Bus devices because of the need for "fair" arbitration and because of the need to optimize their X-Bus access latency. Because the processors are both the lowest priority devices and the most frequent X-Bus users, they are the default owners of the bus.

For purposes of implementing fair arbitration, bus request lines are divided into two classes: A and B. An X-Bus device may only be in one class. Its relative priority position in that class is established by information which is scanned into the device at system initialization time.

2.4.6.2 Class A Request Override

To request the bus, a Class A device asserts both its assigned request level and the bus request sum line on the bus. When the BIF detects the bus request sum assertion in an active bus arbitration cycle, it defers to the class A device(s).

2.4.6.3 Class B/CPU Requesting

The Class B devices, the four CPUs also have fixed priority assignments. Priority assignments are 0 through 3, with 3 being the highest priority. The assignment is scanned into the BIF and used to determine which of the four Class B request parallel backplane signals each CPU uses. The CPU drives its assigned level, and defers to requestors at higher levels.

Class B devices exercise fair arbitration, and don't reassert their request lines on demand. Instead, Class B devices snapshot all other lower priority Class B request lines during the final cycle of a bus ownership. The Class B device then relinquishes the bus and doesn't reassert a request line until all the snapshotted requests are satisfied. The class B devices observe the current state of the other request lines to determine that the other requestors have been serviced. When a request line is deasserted, service is underway or completed. If a request line is still asserted, but arbitration is enabled, that requestor wins and service resumes.

2.4.6.4 Default Ownership

When the bus is otherwise idle, the last successful bidder among the Class B requestors remains as the default bus owner. The default bus owner may use the bus at the end of any cycle during which no other request line was asserted. The default bus owner does not have to assert its request line. The default remains in effect until another Class B device wins the bus.

A Class B device's bus ownership may be suspended by a Class A device. If a Class A device assumes control of the bus, the former Class B owner device waits for the bus to become idle again before reclaiming bus ownership (i.e., the Class B device reassumes ownership in the cycle following one during which arbitration was permitted, but does not assert its request line). If another Class B device wins the bus before it becomes idle, default bus ownership transfers to the latest Class B bus owner.

2.5 Command Formats

Except for the NOP command, correct parity must be maintained on the DAT* field (in some cases labeled ADR) at all times. The sample commands in the following subsections are shown as being initiated by a device with an ID of 0x05 and a SUBID of 0x03.

> NOTE: All fields and notes in the following illustrations are shown in backplane polarity.

2.5.1 Write
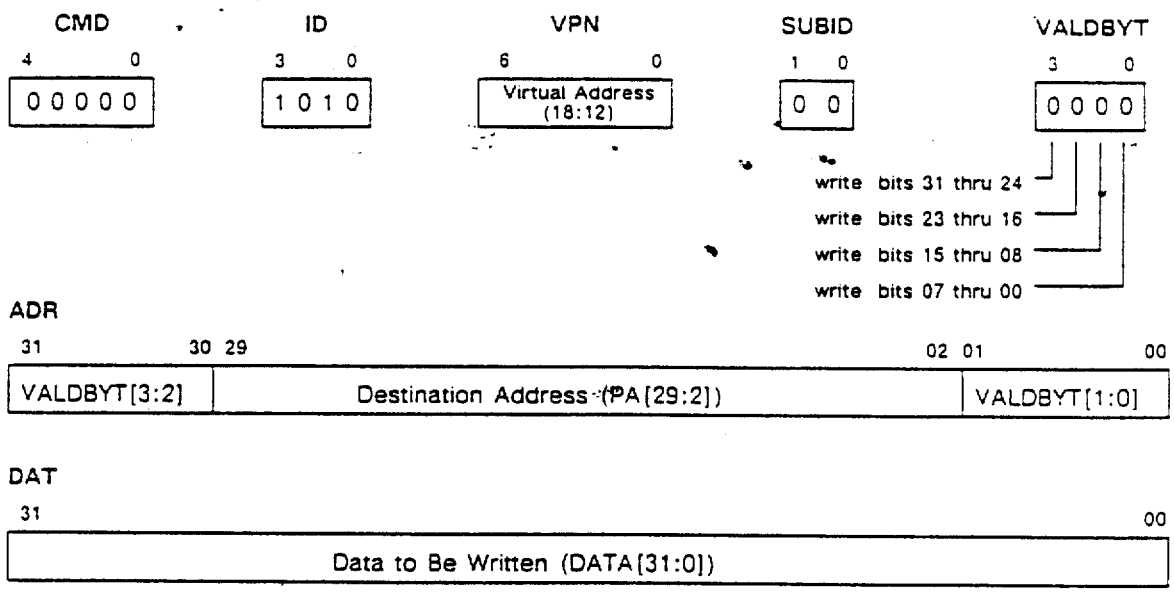
*Figure 2-5. X-Bus WRITE Command Example*
2.5.2 Read
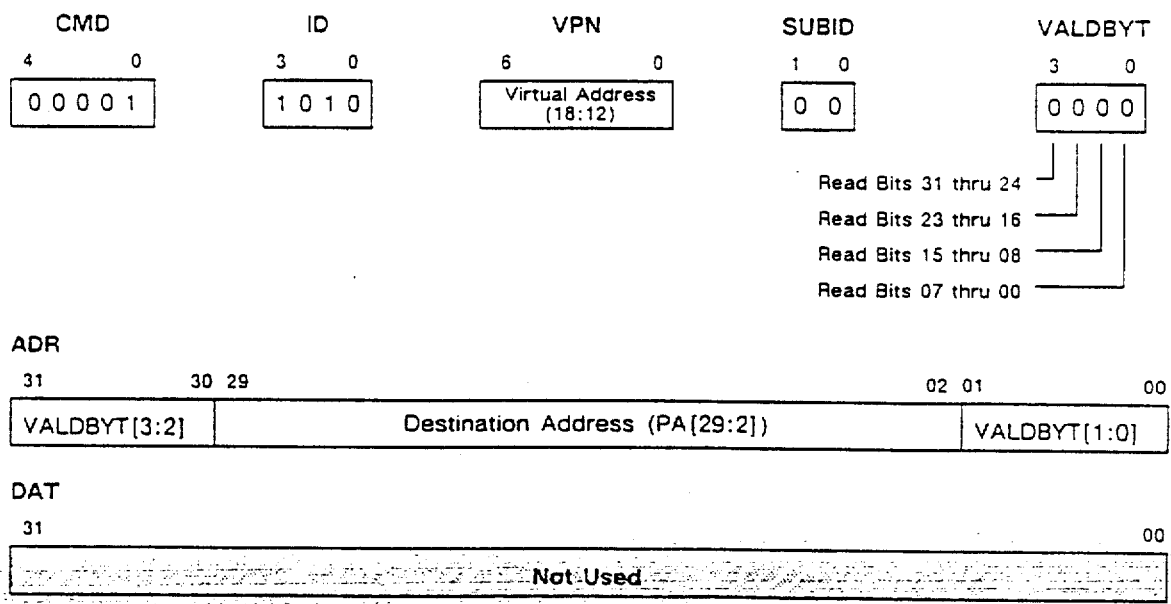
*Figure 2-6. X-Bus READ Command Example*

2.5.3 Read Response
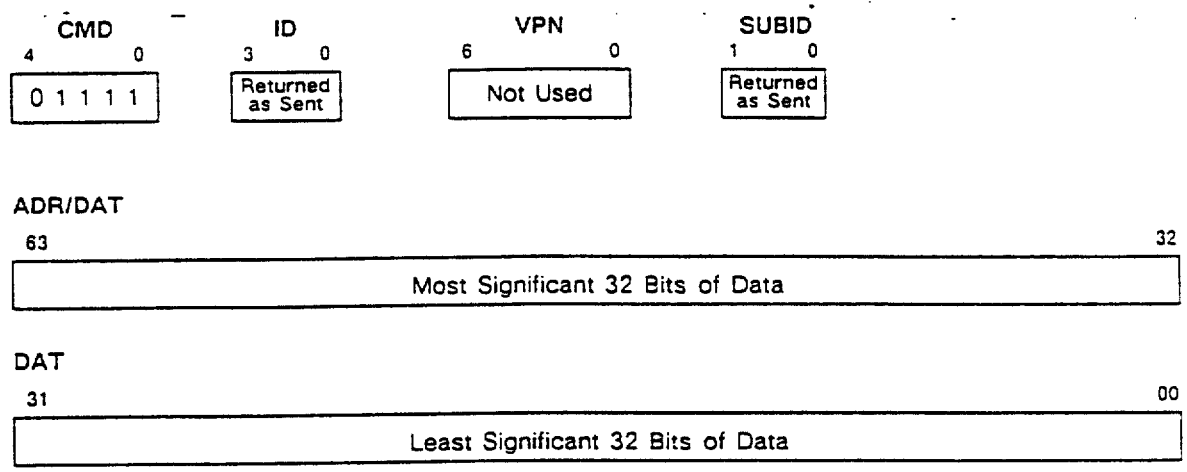
*Figure 2-7. X-Bus READ RESPONSE Command Example*
2.5.4 Write Data
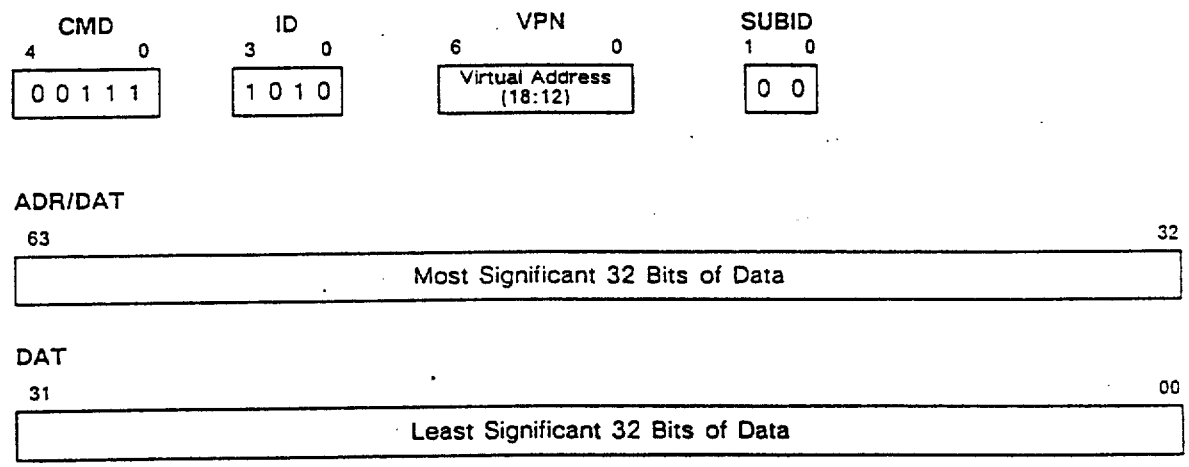
*Figure 2-8. X-Bus WRITE DATA Command Example*
2.5.5 Write Mult
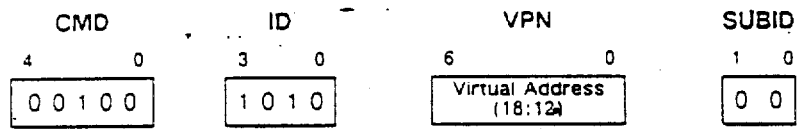

ADR

```
63 62 61                                              34 33 32
┌──┬──────────────────────────────────────────────────┬──┐
│  │              Physical Address                    │ D│
└──┴──────────────────────────────────────────────────┴──┘
```

DAT

```
31                                                             0
┌───────────────────────────────────────────────────────────────┐
│ First 32 Bits of Data if Address is an Odd Longword (32-Bit) Address │
└───────────────────────────────────────────────────────────────┘
```

| D | Direction |
|---|---|
| 1 | Ascending |
| 0 | Decending |

*Figure 2-9. X-Bus WRITE MULT Command Example*

2.5.6 Read Mult

```
   CMD            ID           VPN            SUBID
  4      0      3     0      6       0       1    0
┌───────────┐ ┌───────┐  ┌──────────────┐  ┌───────┐
│ 0 1 1 0 0 │ │ 1 0 1 0│  │Virtual Address│  │ 0  0 │
└───────────┘ └───────┘  │   (18:12)    │  └───────┘
                         └──────────────┘
```

ADR

```
63 62 61                                              34 33 32
┌──┬──┬───────────────────────────────────────────────┬──┬──┐
│ L│ L│            Physical Address                   │ W│ E│
└──┴──┴───────────────────────────────────────────────┴──┴──┘
```

DAT

```
31                                        08 07          00
┌─────────────────────────────────────────┬───────────────┐
│           Not Used                      │ Longword Count│
└─────────────────────────────────────────┴───────────────┘
```

LL

11 TRANSFER LENGTH = 2 LONGWORDS
10 TRANSFER LENGTH = 4 LONGWORDS
01 TRANSFER LENGTH = 8 LONGWORDS
00 TRANSFER LENGTH = 16 LONGWORDS

| E | COUNT ENABLE |
|---|---|
| 1 | Count in DATA[7:0] |
| 0 | Count defined by LL |

| W | Address Wrap |
|---|---|
| 1 | No Wrap |
| 0 | Modulo Wrap |

*Figure 2-10. X-Bus READ MULT Command Example*

2.5.7 Read Response Error

```
   CMD            ID           VPN            SUBID
  4      0      3     0      6       0       1    0
┌───────────┐ ┌─────────┐  ┌──────────┐  ┌──────────┐
│ 0 1 1 1 0 │ │Returned │  │ Not Used │  │Returned  │
└───────────┘ │ as Sent │  └──────────┘  │ as Sent  │
              └─────────┘                └──────────┘
```

ADR/DAT

```
63                                                             32
┌───────────────────────────────────────────────────────────────┐
│                         Not Used                              │
└───────────────────────────────────────────────────────────────┘
```

DAT

```
31                                                    00
[////////////// Not Used //////////////]
```

*Figure 2-11. X-Bus READ RESPONSE Command Example*

The READ RESPONSE ERROR command is sent back to the requesting device in place of a READ RESPONSE command when a condition arises during the read operation that prevents it from being completed. The READ RESPONSE ERROR terminates the read operation. The read operation is considered to be fulfilled and subsequent data in a READ MULT operation is discarded.

2.5.8 Invalidate TB

| CMD | ID | VPN | SUBID |
|---|---|---|---|
| 4       0 | 3    0 | 6        0 | 1    0 |
| 1 1 1 0 0 | 1 0 1 0 | Not Used | Not Used |

ADR

```
31                                                    00
[////////////// Not Used //////////////]
```

DAT

```
31                                                    00
[////////////// Not Used //////////////]
```

*Figure 2-12. X-Bus INVALIDATE TB Command Format*

2.5.9 Invalidate TB Sel

| CMD | ID | VPN | SUBID |
|---|---|---|---|
| 4       0 | 3    0 | 6        0 | 1    0 |
| 1 1 1 1 0 | 1 0 1 0 | Not Used | Not Used |

ADR

```
31                                    12            00
| Virtual Address to be Invalidated |//Not Used//|
```

DAT

```
31                                                    00
[////////////// Not Used //////////////]
```

*Figure 2-13. X-Bus INVALIDATE TB SEL Command Format*

2.5.10 NOP

| CMD | ID | VPN | SUBID |
|---|---|---|---|
| 4....0 | 3....0 | 6....0 | 1....0 |
| 1 1 1 1 1 | Not Used | Not Used | Not Used |

ADR

| 31 .... 00 |
|---|
| Not Used |

DAT

| 31 .... 00 |
|---|
| Not Used |

*Figure 2-14. X-Bus NOP Command Format*

2.6 Write Sequences

The following subsections describe the transactions that take place during write and write multiple bus transfers.

2.6.1 WRITE (Single 32-Bit Write)

A write sequence on the X-Bus consists of four phases: request, arbitration, transfer, and acknowledge. Some of these phases may happen in the same bus cycle. All may be overlapped with some phases from other transfers. During the request phase a device asserts its BUSREQ line to indicate to all other devices that it wants to gain access to the bus. If the INH_ARB* line is not asserted when a device asserts its BUSREQ line, the request and arbitration phases occur in the same cycle. If higher priority devices are asserting their BUSREQ lines, the arbitration phase may last for several cycles. Once a device has asserted its BUSREQ line, the INH_ARB* line is not asserted, and there are no higher priority BUSREQs asserted, the device owns the X-Bus in the next bus cycle.

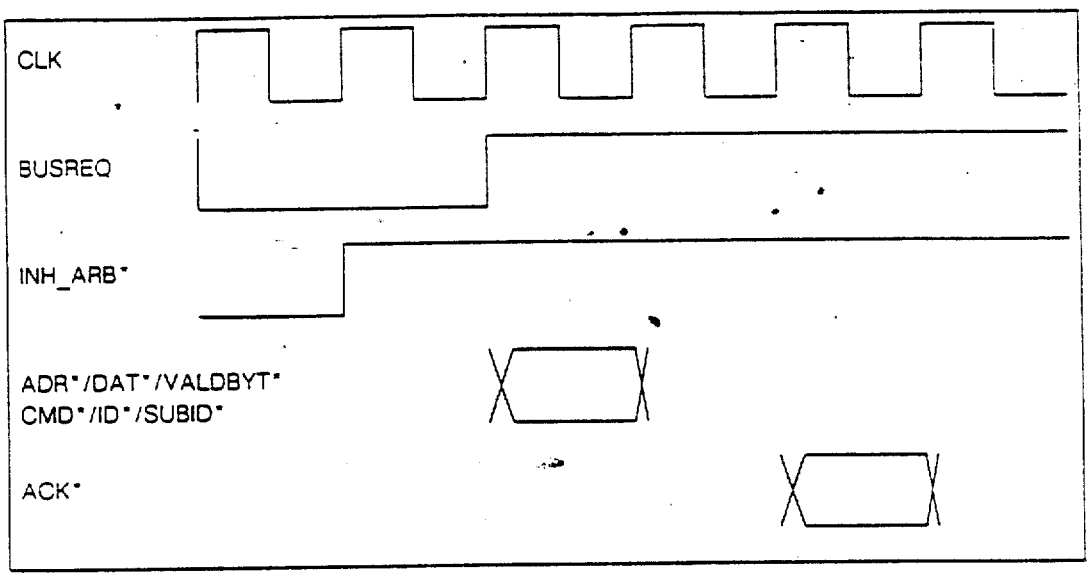

*Figure 2-15. WRITE Timing*

When the device gains access to the bus, the transfer phase begins. For a WRITE, the transfer phase lasts only one cycle. During this cycle the master device:

- Deasserts its BUSREQ signal

- Does not assert the INH_ARB* signal

- Asserts the WRITE command on the CMD* signals

- Asserts its own device ID on the ID* signals

- Asserts a unique ID on SUBID*. This field is optional and could be used to help steer error information returned from the slave device to the proper area within the master device.

- Asserts the address to be written on ADR

- Asserts the virtual page number of the address to be written on VPN

- Identifies the bytes to be written by asserting the valid bits within VALDBYT

- Asserts the data to be written on DAT*(31:0)

In the cycle after the transfer phase, the slave does some preliminary checking on the transmission (Is the command valid? Is it addressed to this device? Is the parity good? Is the device able to accept such a command at this time? etc.). At this time, the master deasserts all of the signals that it asserted in the transfer phase. In the next cycle, the master and slave devices enter the acknowledge phase where the slave sends the master some preliminary data regarding the status of the transfer. Since the slave may be busy processing the transfer request for several bus cycles, it needs to have some buffering, or a way to reject a transfer request when busy, or both.

To insure that write order is preserved, it is illegal for a device to attempt writes in two consecutive cycles. If a write were attempted in the cycle following a write, there would not be any way to prevent it from executing before the previous write if the previous write received a negative acknowledgement. A second write may be issued in the same cycle as the acknowledgement from the first write is received if the REJ* signal is used to cancel the second write (if the first write was not accepted).

2.6.2 WRITE MULT (Multiple 32-Bit Write)

Figure 2-16 shows the timing of the WRITE MULT command.

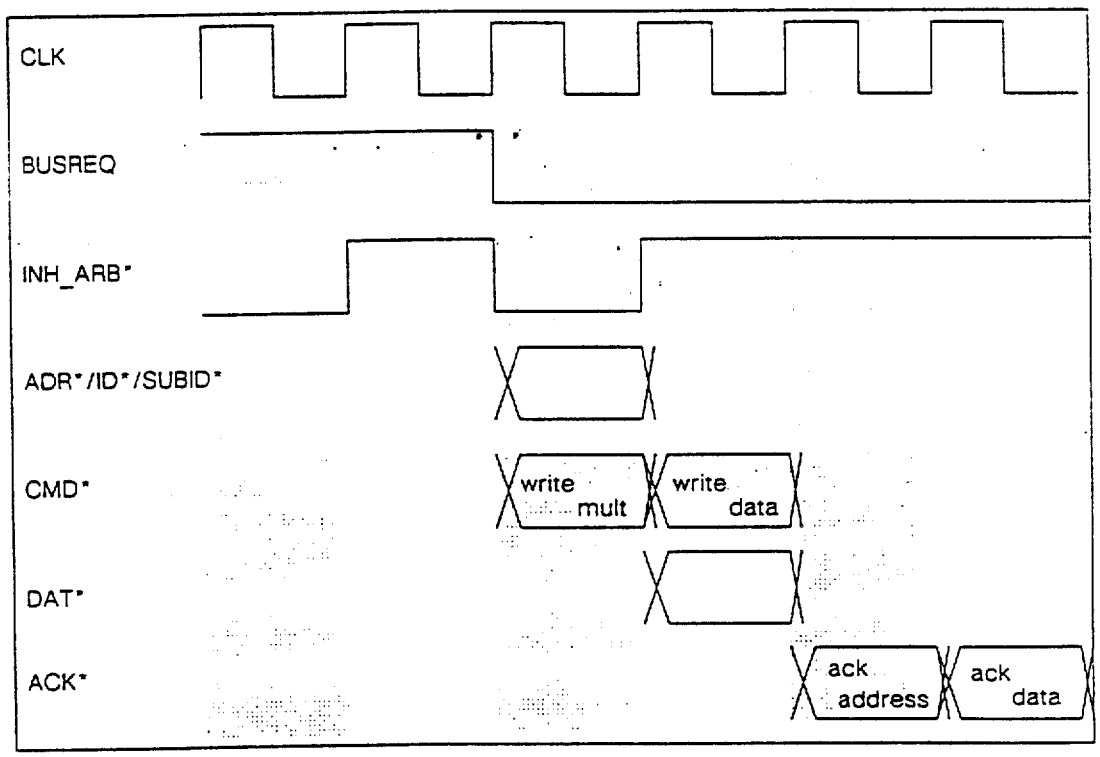

*Figure 2-16. WRITE MULT Command Timing*

A WRITE MULT instruction involves the transfer of one or more 32-bit words. The transfers must adhere to 32-bit boundary alignment at the start of the transfer and they must adhere to 64-bit boundary alignment thereafter. WRITE MULT differs from WRITE in that the VALDBYT signals are ignored in WRITE MULT (writes of partial 32-bit words are not allowed). If the transfer is a WRITE MULT, the sequence of X-Bus events is different than for a WRITE transfer. The request and arbitration phases proceed in the same fashion as the WRITE sequence, but the transfer and acknowledgement phases proceed differently. During the first transfer cycle the master device:

- Deasserts its BUSREQ signal.

- Asserts the INH_ARB* line

- Asserts the WRITE MULT command on the CMD* signals

- Asserts its own device ID on the ID* signals

- Asserts a unique ID on SUBID*. This field is optional but could help steer error information from the slave device to the proper area within the master device.

- Asserts the starting address to be written on ADR*

- Asserts the virtual page number on VPN*

- Does not use the VALDBYT* lines

- Asserts the first 32 bits of te transfer on DAT*(31:0) if the transfer does not start on a 64-bit boundary During the next transfer cycle the master device:

- Asserts the WRITE DATA command on the CMD* signals

- Asserts the data to be transferred on DAT*(63:0)

- Leaves the other bus signals as they were set in the previous bus cycle, unless this cycle contains the last data transfer. In this case, the INH_ARB* line is deasserted.

The slave device:

- Performs some preliminary checks on the transaction of the previous cycle

- Sends an acknowledgment to the master during the next cycle, based on these preliminary checks This cycle is repeated until sufficient data has been transferred. The slave device responds to each transfer cycle with an acknowledgement two cycles after the transfer cycle.

2.6.3 Error Recovery During Writes

Writing data that is less than a longword is not possible with the WRITE MULT command. Data is stored and checked in memory as 32-bit quantities. When writing a portion of a 32-bit word, the memory controller must first read, check, and correct the word that is currently at that location. Then it merges the new data with the old data, computes new check bits, and writes the new data and check bits. If the check portion of this operation detects an uncorrectable data error, continuing of the operation could destroy data. In this case, the write is inhibited.

2.6.4 Features

There are some restrictions on using the WRITE MULT command concerning the starting address of the block to be written. The memory controller has more than one bank. The WRITE MULT command cannot cross a bank boundary. If it does cross this boundary, the memory controller may reject only part of the transfer because of a busy bank condition. This causes the entire transfer to be retried. The retry operation then finds that the other bank is busy, causing further retries. Since memory is managed on a virtual page basis, and virtual pages don't cross bank boundaries, this restriction has minimal impact.

2.7 Read Sequences

2.7.1 READ and READ MULT

The READ and READ MULT commands are very similar. The READ command involves a single 32-bit transfer, uses the VALDBYT* signals, and attaches significance to ADR(2)*. READ MULT deals with transfers involving multiples of 32-bits, and does not use the VALDBYT* signals. The remainder of this section focuses on the READ MULT command.

The read sequence on the X-Bus is more complex than the write sequence. It is actually broken down into two distinct sequences: a read command sequence, and a read response sequence. The read command sequence resembles the write sequence, except that the DAT* and VPN* fields are not used. If the command is a READ MULT, a code specifying the number of longwords to be transferred is placed in DAT*(7:0). After completing the read command sequence, the master device gives up the bus to any requesting device. Then the target device fetches the requested data. When the data is available, the device that was the target of the read command initiates the read response sequence.

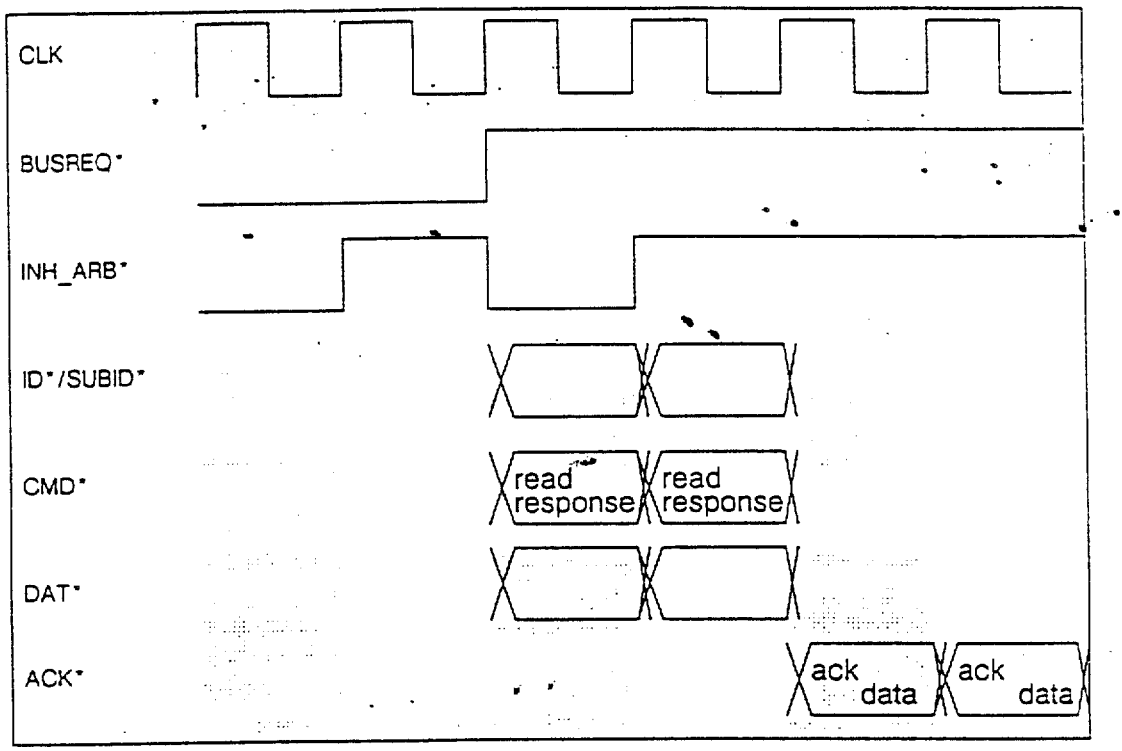

Figure 2-17. READ RESPONSE Command Timing

The read response sequence, initiated by the target of the read command sequence, proceeds as follows:

- The device executes the request and arbitration bus phases. It then enters the transfer phase.

- Deasserts its BUSREQ signal. The device may leave its BUSREQ asserted until the beginning of the last transfer cycle.

- Allows the INH_ARB* line to stay deasserted (i.e., does not assert the INH_ARB* signal) if the transfer is a single transfer. If this is a multiple transfer, the INH_ARB* line must be asserted until the beginning of the last transfer.

- Asserts the READ RESPONSE command on the CMD* signals.

- Asserts the device ID of the device that initiated the read command sequence on the ID* signals.

- Asserts the unique ID that was sent on the SUBID* field during the read command sequence back onto the SUBID* signals.

- Asserts the read data on DAT*(63:0).

At this point, the first cycle of the transfer phase in the read response sequence is complete. The transfer phase may continue if the read requested multiple transfers. In either case, both devices enter an acknowledge phase and may, in fact, be simultaneously in an acknowledge and transfer phase. There must be an acknowledge cycle for each transfer cycle. The transfer and acknowledge phases continue for as many cycles as necessary to deliver the requested amount of data.

2.7.2 Error Recovery During Reads

When the device being read is a memory controller, the device anticipates the availability of the data and requests access to the X-Bus before the data is actually ready. This minimizes the access time for the requesting processor. In some situations, the data is available at the beginning of the cycle in which the data is to be transferred over the bus. This presents some problems concerning what is to be done about correctable and uncorrectable errors on the data that is being sent. This information is available at the end of the cycle in which the data is transferred. This is too late to stop the transfer, but not too late to assert the REJ* line in the next cycle. REJ* tells the destination device to disregard the data it has just received. This causes the destination device to ignore the last transaction and go back to waiting for the read response (equivalent to executing a NOP command). If the transfer is a multiple quad word transfer (i.e., the response from a READ MULT command), only the transfer that was sent in the cycle prior to activating REJ* should be discarded. If the memory controller needs to cancel two successive transfers, it must assert the REJ* line for two consecutive cycles.

If a correctable error is detected while the memory controller is still asserting the INH_ARB* line, the pipelines in the memory controller are stalled. The corrected data is also transmitted across the X-Bus, and then the pipelines are unstalled. If the error is not detected until the INH_ARB* line has already been deasserted, it is too late for the memory controller to hold onto the bus, so it must rearbitrate. Once the controller acquires the bus again, it re-transfers the data, starting with the data that was corrected.

If an uncorrectable error was detected, the memory controller returns the data that was read with a READ RESPONSE ERROR command and continues processing data in the normal manner. The error address is saved in registers accessible via the X-Bus and the scan interface.

2.7.3 Features

Read returns from the memory system have a high priority to minimize read latency time and to keep the memory queues as empty as possible. Since, in many cases, the processor is stalled until the read data it requested is returned, the read process must be as efficient as possible.

The READ MULT command is used for I/O block transfer and cache fill operations. For cache fill operations, the cache might request 4 quad words of data aligned on a quad word boundary. In addition, the cache might want the second quad word in that group to be delivered first in order to streamline the cache-to-IP interface. The memory controllers support this function by allowing the requesting device to specify the starting quad word address and the amount of data to be transferred. In addition to specifying the amount of data to be transferred, the parameter for the number of quad words to be transferred is also used to determine the starting address of the block to be transferred (don't confuse this with the starting address of the quad word to be transferred). For instance, if the transfer size is two, the two quad words with ADR(3)* = 0 and 1 starting at the address specified in ADR* are transferred. If the transfer size is four, the four quad words with ADR(3)* and ADR(4)* = {00, 01, 10 and 11} starting at the address specified in ADR* are transferred. Figure 2-18 shows the complete X-Bus timing cycle for the READ, WRITE, and READ RESPONSE commands.

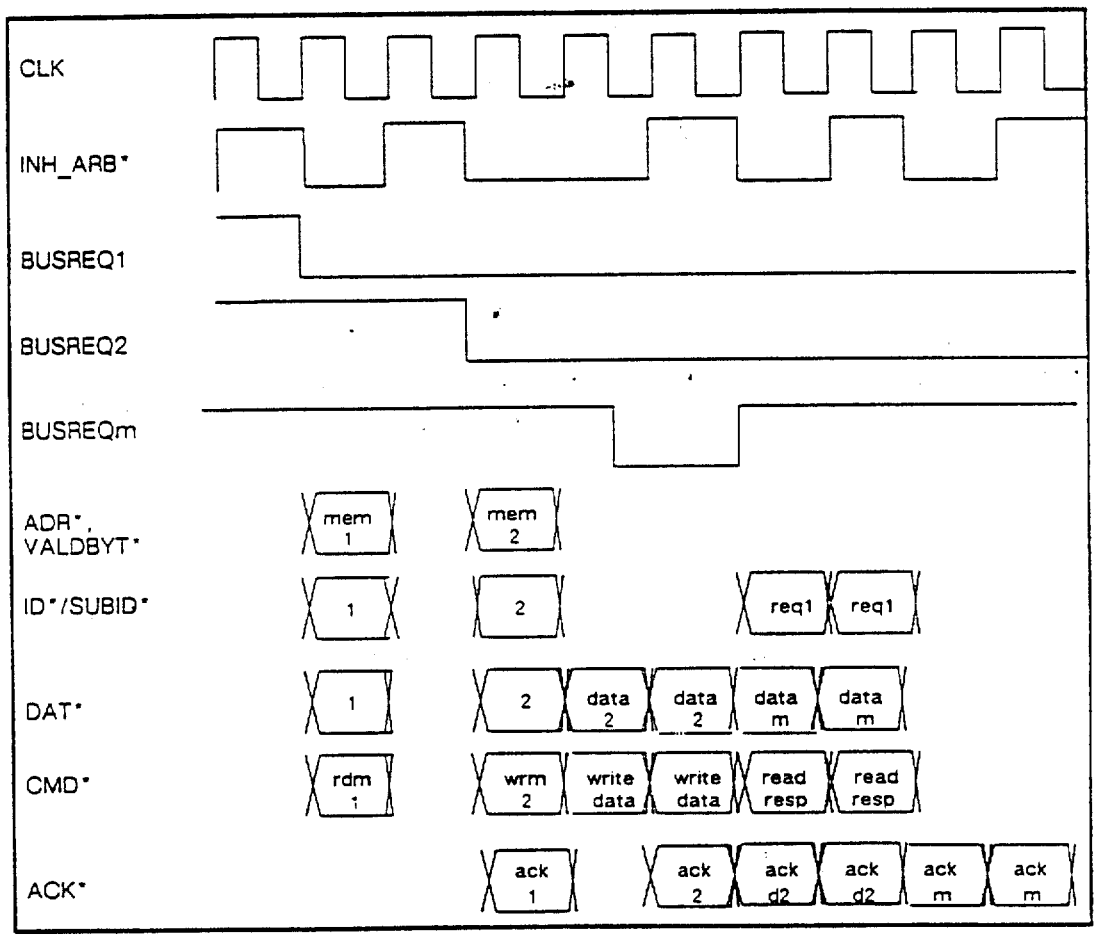

READ MULT, from Device 1 to memory   READ RESPONSE, from memory to Device 1
WRITE MULT, from Device 2 to memory Figure 2-18. Complete X-Bus Timing characteristics of these instructions that distinguish them from other X-Bus commands and the normal interrupt process.

First, these commands are broadcast commands, which means that they can be sent from one processor to every other processor in the system during a single X-Bus cycle. This characteristic means that the transaction does not receive an acknowledgement, since the acknowledgement from all the target processors would overlap.

Processing these commands is time-critical. The processor limits the amount of bus transactions that are executed using an old translation mapping. The processor must also be ready to accept a new INVALIDATE command immediately because there is no mechanism for rejecting the command, and it is important that these commands do not get lost. If a device receives too many SELECTIVE INVALIDATE signals to process at once, it goes into a catch-up mode, where it invalidates the whole TB (It is assumed that invalidating the whole TB can be done faster than the selective invalidate. The device may also raise an invalidate overrun condition).

Because the data that is affected by the INVALIDATE commands is shared among the processors in the system, the INVALIDATE commands are issued under a bus lock. This is done so that the invalidation of the TB doesn't interrupt any in-progress interlocked operation, leaving data in a half-modified state.

Even if the INVALIDATE commands took zero time to execute, there may be further accesses to pages that were previously mapped and unmapped because of the INVALIDATE command. The processors write buffers still have transactions pending which were based on the previous mapping. Therefore, before an unmapped page is reused or written to disk, the process managing the page must insure that all pending transactions at the time of the invalidate have traversed the X-Bus interface. To accomplish this, the process issues an interrupt to each relevant processor and waits for an interrupt acknowledge. The interrupt acknowledge insures that all buffers are flushed before the interrupt acknowledge reaches the X-Bus.

2.8.2 I/O Interrupts

If an interrupt is a device completion interrupt, the interrupted processor can't act on the interrupt until the data transfer is complete. This is necessary because of the buffering present between the I/O bus interface and the X-Bus. If the channel for the interrupt is independent of the data buffering, the interrupt could be processed before the data transfer is complete. Since the interrupt is actually an X-Bus write operation, the interrupt follows the prior data transfers onto the X-Bus. If the interrupt path was separate from the data path, the data could be synchronized at the time of the interrupt acknowledge cycle by requiring that the write buffers be emptied prior to returning data in response to the interrupt acknowledge.

The interrupt acknowledge cycle generally reads either a status register or, in the case of an auxiliary bus, interrogates the bus to find out which specific device caused the interrupt. The interrupting device must know that the interrupt has not been serviced. It only clears this interrupt pending status upon an interrupt acknowledge response from the interrupted device. This interrupt acknowledge typically takes the form of a read to a specific address in the interrupter. The interrupter contains a X-Bus accessible register which is loaded by a processor prior to any I/O activity which specifies the address to be used by the interrupter for addressing interrupt writes. If it must direct different types of interrupts to either different interrupt flags or different devices on the X-Bus, the interrupter has multiple interrupt address registers.

2.9 Error Recovery

The primary goal of the error detection and recovery is to insure that user data is not corrupted as a result of abnormal conditions. The secondary goals are to maintain a high level of availability and diagnosiblity in the system. This is especially important in a multiprocessor system where quite a bit of system resources could be made unavailable if a processor or memory bit malfunctions. A summary of the types of possible system related errors and the system response to those errors is shown in Table 2-5.

*Table 2-5. System Error and Response Summary*

| Type of Error | Action |
|---|---|
| Bus aquisition timeout; Read response timeout; Error acknowledgement parity error on data | Freeze clocks; invoke Serv. Processor |
| No response acknowledgement; Missing device; Parity error on address; Lock timeout | Execute check (read); optionally invoke SP; Fetch check (write) |
| Powerfail | Interrupt; gracefully terminate disk operation |
| Read Response Error ECCU on read operation Bus error on VMEbusoperation; No IRQ asserted at IACK time during VMEbusintrp | Execute check |
| Bus error on VMEbuswrite | VMEbus interface posts interrupt |
| Abnormal Condition Detected | Gate Array/ Utility Board Action |
| Sequential mode selected but not all UVALID* bits are asserted | UBERR* asserted and cycle aborted, status bit is set in register of U-bus master and a CPU interrupt is generated. |
| Parity error on data from IO map | MP_PERR is asserted for the duration of time that the parity error exists. this signal should be examined at the time that a U-bus timeout occurrs to determine if a IO map parity error is present. This will cause an interrupt to the CPU. |
| No response acknowledgement: on X-bus read | UBERR* asserted and cycle aborted, status bit is set in register of U-bus master and a CPU interrupt is generated. |
| on X-bus write, compact off | UBERR* asserted and cycle aborted, status bit is set in register of U-bus master and a CPU interrupt is generated. |
| on X-bus write (compact on) or response to a requested read | NRSP (one cycle) asserted. This causes a status bit to be set and a CPU interrupt generated. |
| Read Response Error on: Requested read data | UBERR* asserted and cycle aborted, status bit is set in register of U-bus master and a CPU interrupt is generated. |
| Prefetched read data | Data is not loaded into the read buffer. If that data is subsequently requested, it will again be fetched from memory and then causes a UBERR* if it is still bad. |
| An X-bus write attempted with the Protect bit set in the I/O Map | UBERR* asserted and cycle aborted, status bit is set in the register of U-bus master and a CPU interrupt is generated. |
| Time Out (-3msec) while waiting to acquire X-bus or waiting for a read response from a read or read multiple command. | Clock Stop line is asserted |
| Data parity error on a read or write command from X-bus | Clock Stop line is asserted |

Table 2-5. System Error and Response Summary (Cont.)

| Type of Error | Action |
|---|---|
| Error acknowledgement | Clock Stop line is asserted |
| Read Response received from the X-bus without a pending read operation | Command is ignored and no acknowledgment is sent. |
| An unsupported command is received | Command is ignored and no acknowledgment is sent. |

The quidelines for error recovery are as follows:

- Errors that could be created by software are, in general, recoverable and, therefore, passed to the operating system for analysis and attempts at recovery.

- Errors that are caused by hardware failures bring the system to a halt as soon as possible for analysis by the SP.

- If it is unlikely that the software can recover from an error, the machine stops before the real cause of the error is obscurred by further processing or before a fatal fault inadvertently causes loss of data.

2.9.1 X-Bus errors

The following subsections describe the various types of X-Bus errors.

2.9.1.1 Timeouts

The system has timeout mechanisms that detect errant hardware and software. These timeout mechanisms notify the user that an abnormal condition has occurred. Timeouts are serious and are reported to the Service Processor for logging and/or further diagnostic action. There is a timeout mechanism in each X-Bus device which notifies that device if it is unable to gain access to the bus or if it has not received a response from a read operation.

The timeout period is greater than 3 milliseconds. This is long enough that only a serious system failure could cause the timeout. The timeout sets a timeout flag in the device's interface status register and then causes the state of the X-Bus interface to be frozen until the condition is cleared via the scan loop mechanism, BUS RESET*, or RESET*. The Service processor is made aware of this situation so that the system doesn't simply lock up. The Service Processor polls the interface status register on each device to find the source of the timeout.

2.9.1.2 Lock Timeouts

Lock timeout is handled via a timer located on each X-Bus device that can generate a bus lock. The timer times the duration of a bus lock. If a lock has been held for more than 200 microseconds, a lock timeout is generated. This lock timeout releases the bus lock and generates a trap to the processor to indicate that the action has taken place. The lock timeout period is less than the bus access timeout period so that other devices on the X-Bus, which are trying to acquire the bus lock, don't trip their bus access timeout mechanisms as a result of some other device holding lock too long. This means that a processor may generate lock timeout errors that are really bus access timeout errors, but that doesn't cause any serious problems because the recovery software is aware of this possibility.

2.9.1.3 Parity Errors

The parity error indicates that a serious system malfunction has occurred. This causes the system to stop before additional damage to data or system state occurs. If an X-Bus device detects a parity error on data that was sent to it, it sets a parity error flag in its interface status register. It also responds with an error acknowledgement, and then stops processing transactions either to or from the X-Bus. The error acknowledgement causes similar actions in the sending device. The interface status registers can be read via the diagnostic bus scan loops. Neither interface participates in further X-Bus transactions until the condition is cleared via the scan loop mechanism, or RESET*. The Service Processor is made aware of the error condition via the Diagnostic Bus HALT signal.

2.9.1.4 No Response Acknowledgement

If a device receives a no response acknowledgement (i.e., non-existent device) from a transaction, it may attempt to recover, but the failure is likely to be caused by a fatal problem. The no response may be the result of an address parity error, trying to access a device that does not exist, or undefined, unsupported commands on the X-Bus. If the requesting device is a processor, it traps to an error recovery procedure that tries to discover if the problem is related to hardware or software. If the problem is hardware related, the processor lets the Service Processor resolve the problem. If the requesting device is not a processor, it sets a no response flag in its status register and waits for the Service Processor to let it proceed.

If a device is selected, such as a memory controller, and the address that is presented is not a valid address within that controller, the device responds with a no response acknowledgement that indicates the address is not valid. This is preferable to the error acknowledgement because there is a reasonable chance that this type of error is a software error, not a hardware error, and possibly recoverable. Error acknowledgements are treated as fatal and are used to indicate nonrecoverable hardware type error conditions.

2.9.2 Memory Errors

2.9.2.1 ECCU on Write

The only situation that generates an ECCU on a memory write is when an attempt is made to write a portion of a 32-bit word and the existing 32-bit word has two or more bits in error. The write operation is terminated so that data is not destroyed. An interrupt (WRITE command) is sent to a prespecified X-Bus address. When the processor responds to this interrupt, it can read the address of the data which caused the ECCU. It can also read the ID* and SUBID* of the device that generated the failing write operaton.

2.9.2.2 ECCU on Read

If an ECCU error is detected on a read operation, the read operation is treated as a normal read operation except that a READ RESPONSE ERROR command is returned with the data instead of a READ RESPONSE command. The data that was obtained on the read is returned uncorrected as the data portion of the transfer. If the error was not detected until the bad data was sent out, the REJ* signal is asserted to cancel that transfer. The data is resent using the READ RESPONSE ERROR command code.

2.9.2.3 ECC on Read

If a correctable error is detected on a read operation before the data is transferred, the data is corrected and then sent to the requesting device. If the error is not detected until after the data is sent onto the X-Bus, the REJ* line is asserted in the cycle after the data is sent to cancel the transaction. Then the data is resent. In either case, a record of the error is kept in a register that can be accessed by either the X-Bus interface or the diagnostic processor via the scan loops. The information stays latched in this register until the data is read out. This may cause information about later errors to be discarded.

2.9.3 VMEbus Errors

Most errors that occur on the VMEbus are signaled by asserting the VMEbus signal, BUS ERROR. In most cases, this signal is asserted by the slave in the VMEbus transaction. It may also be asserted by the bus timer which is located on the system controller module. The bus timer function is implemented on the VMEbus interface and sets a bus timeout flag whenever the VMEbusAS* (Address Strobe) is asserted for more than 100 microseconds. Depending on an enable bit, setting this flag may also cause an interrupt to the device specified in the VMEbus interface's interrupt address register. There is also a bus error flag in the VMEbus interface which is set when any BUS ERROR occurs on the VMEbus. This flag also has an enable bit which allows generating an interrupt to the device specified in the interrupt address register. These flags are part of the VMEbus interface's status register and are reset whenever the register is read. Whenever a BUS ERROR occurs, the address that was on the VMEbus is recorded in a bus error status register for interrogation by an X-Bus device. This register locks up once an error has occurred and does not record other error addresses until it has been read.

2.9.3.1 Bus Error on Read

If an X-Bus device initiates a read operation on the VMEbus that results in a BUS ERROR, the VMEbus interface does not respond to the read command with a READ RESPONSE. Instead, it responds to the requesting device with a READ RESPONSE ERROR command. The lower 32 bits of the returned data, DAT*(31:0) reflect whatever data was on the VMEbus data lines at the time BUS ERROR was asserted. To determine if the BUS ERROR was the result of trying to access a nonexistent device, the requesting device must look at the bus timeout flag in the VMEbus interface's status register.

2.9.3.2 Bus Error on Write

If an X-Bus device initiates a write operation on the VMEbus which results in a BUS ERROR, the VMEbus interface sets a write bus error flag in its status register. It also sends an interrupt to the X-Bus device specified in its interrupt address register. If the BUS ERROR was a result of trying to access a nonexistant device, the bus timeout flag is also set.

2.9.3.3 Bus Error on Transfer not Initiated by an X-Bus Device

If a BUS ERROR occurs while a VMEbus device is active on the bus, it notifies the VMEbus interface of the condition via the normal interrupt mechanisms. In some cases, such as an intelligent disk controller, the device may try to recover from the error without intervention from the responsible X-Bus device. In this case, the X-Bus device would not be aware of the error unless the bus error interrupt enable in the VMEbus interface were set.

2.9.3.4 No IRQ Asserted During IACK* Cycle

If the VMEbus interface has sent an interrupt to an X-Bus device and there is no IRQ line from the VMEbus asserted when the X-Bus device responds with an IACK* cycle, the VMEbus interface does not perform a VMEbus IACK* cycle. It also returns the status register with a READ_RESPONSE command and an interrupt dropped flag set in the status register. The processor treats this condition as a spurious interrupt.

2.10 Physical Address Space

The X-Bus physical address space is 30 bits wide, or 1 gigabyte of physical memory and device space. Table 2-6 shows how it is partitioned.

*Table 2-6. X-Bus Physical Address Space*

| Address | Device |
|---|---|
| 00,000,000–00,3FF,FFF | 4 MB, Processor Registers |
| 00,400,000–07,FFF,FFF | 124 MB, Reserved |
| 08,000,000–0F,FFF,FFF | 128 MB, Service Processor |
| 10,000,000–17,FFF,FFF | 128 MB, Reserved |
| 18,000,000–1F,FFF,FFF | 128 MB, Reserved |
| 20,000,000–2F,FFF,FFF | 256 MB, Memory No. 1 |
| 30,000,000–3F,FFF,FFF | 256 MB, Memory No. 2 |

Chapter 3
U-Bus Interface

This chapter describes the U-Bus and the U-Bus interface to the X-Bus.

3.1 Utility Bus (U-Bus)

The Utility board contains several functional subsystems that are essential to the Series 10000 processing system. It contains the VMEbus and PC AT compatible bus interfaces, power supply interface, control panel interface, the Serial Input/Output (SIO) line interfaces, timers, calendar, the Service Processor (SP), and the Diagnostic Bus (D-Bus) interface. The system's clock generation circuitry is also located on the Utility board.

The VMEbus and PC AT compatible bus interfaces, the SIO line interfaces, timers, and calendar are connected to the core system's internal bus (X-Bus) interface via the Utility board's internal 32-bit bus (U-Bus). The Service Processor (SP) and its associated memory are connected to the U-Bus, but are independent of it, allowing the SP to access the D-Bus interface without interferring with the U-Bus operations. The I/O map and the VMEbus address modifier tables are also accessed through the U-Bus.

The Utility board's internal bus, the U-Bus, streamlines the X-Bus to VMEbus interface, since most of the high data rate transfers occur between these two functional units. This architecture also simplifies the SP to U-Bus interface.

There are five interfaces that arbitrate for use of the U-Bus. These include the X-Bus interface, the SIO interface, the SP interface, the VMEbus interface, and the PC AT compatible bus interface. During normal system operation, the SP does not need access to the U-Bus. However, the SP memory is loaded via the U-Bus. The SP must also have access to the devices on the U-Bus for diagnostic purposes.

APPENDIX III

Chapter 12

CPU to X-Bus Interface

12.1 Overview

The system's CPU X-Bus Interface (BIF) connects the processor's instruction and data caches to the system backplane bus. The principal functions of the BIF unit are:

- Support the X-Bus reads necessary to fill the instruction and data caches.

- Queue and deliver processor stores to the X-Bus, isolating the CPU from X-Bus write latencies.

- Act as a bus watcher and ensure cache coherency in the face of external stores.

- Act as a clearing house for system communications, such as interrupts, to and from the CPU.

- Maintain and check CPU cache data parity.

Also, the BIF provides much of the support logic for the self-test of the CPU cache RAMs.

12.2 BIF Block Diagram

The BIF is composed of 3 gate arrays. The bus interface logic also includes the instruction and data cache duplicate tag stores, the X-Bus interface transceivers, and some supporting tristate drivers.

The address gate array (CBA) handles outgoing and inbound address transfers. Outgoing address transfers occur for instruction and data cache read issues, and for data cache write issues. Inbound address transfers are required for cache entry invalidation caused by external writes, and for cache miss filling. The CBA gate array also maintains the duplicate tag stores and handles all bus watching. Finally, the CBA gate array accepts and forwards interrupt requests to the processor.

The two data gate arrays (CBDs) are identical. One transfers even bytes, and the other transfers odd data bytes. The CBD gate arrays queue and forward write data, and return read data. The CBD gate arrays check and maintain the cache parity. Figure 12-1 shows the processor block diagram and illustrates this partition.

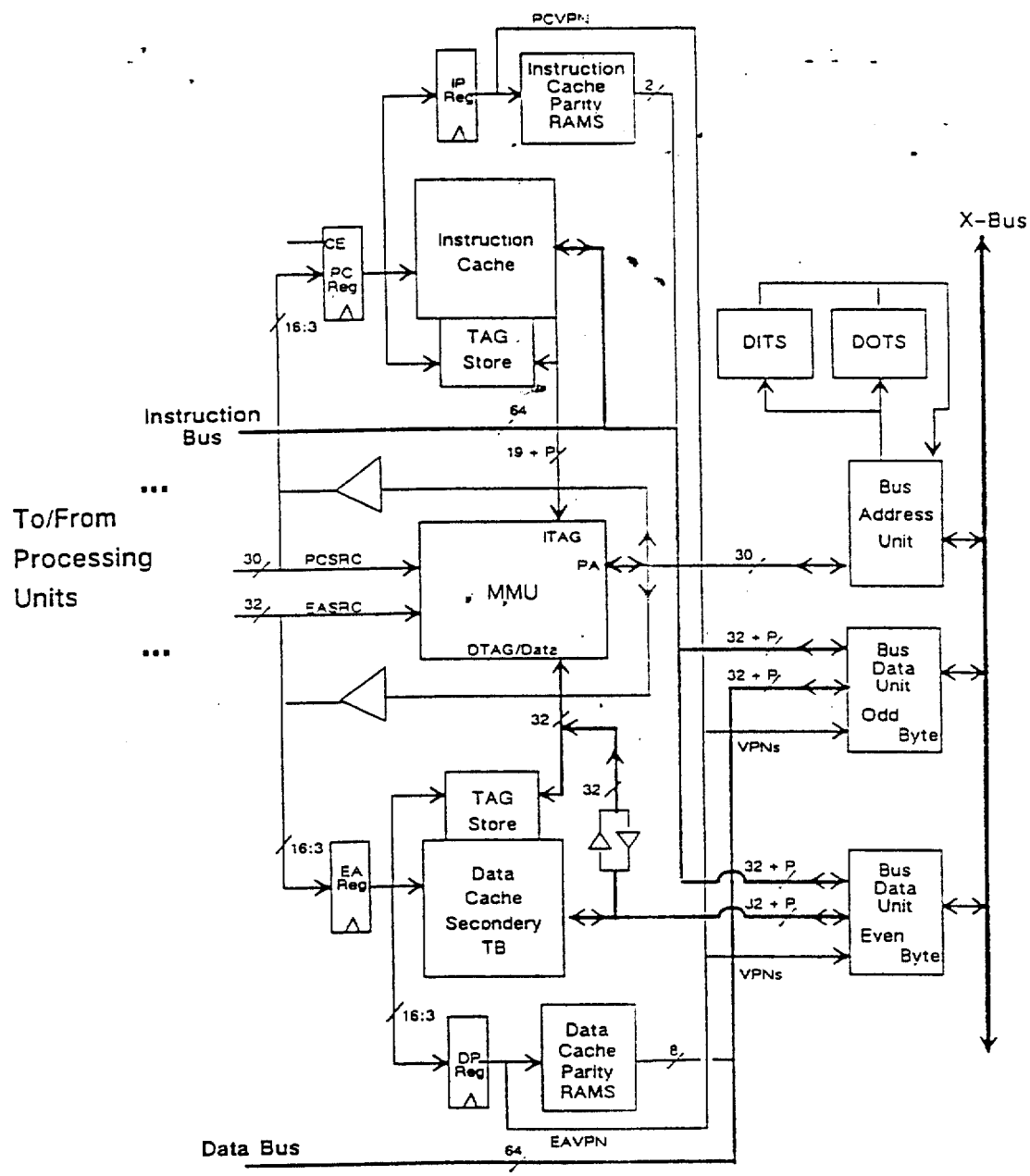

*Figure 12-1. Bus Interface Overall Block Diagram*

12.3 Bus Interconnect

The BIF accepts and returns processor addresses from the PA, EASRC, PCSRC, and VPN bus registers. The BIF also accepts and returns data from the processor INST and DATA bus registers. It uses the X-Bus as its path to main memory.

For a data cache read miss, the MMU gives the physical address to the BIF over the PA bus. The accompanying VPN is captured by the BIF directly from the EAVPN bus. When the cache fill begins, the BIF supplies the cache index to the EASRC bus over the PA bus. The memory data is supplied directly to the cache DATA bus.

For an instruction cache read miss, the MMU provides the physical address to the BIF over the PA bus. The BIF captures the accompanying VPN is captured directly from the PCVPN bus. When the cache fill begins, the BIF supplies the cache index is supplied to the PCSRC bus over the PA bus. The memory data is supplied directly to the cache INST bus.

For a data cache write, MMU provides the physical address to the BIF over the PA bus. The BIF captures the accompanying VPN directly from the EAVPN bus. In this case, the store data has previously been captured by the BIF directly from the DATA bus. When an external write requires purging a local cache entry, the BIF supplies the invalidate address to the MMU over the PA bus.

12.4 X-Bus Arbitration

All X-Bus interfaces except the default owner must request the bus prior to use. There is one bus request level on the backplane for each X-Bus device. Devices are grouped into two classes. Class A devices are awarded the bus in strict priority order. Class B devices participate in fair arbitration and may also be default bus owners. CPUs are class B devices.

Bus arbitration is decentralized. Every bus interface decides for itself whether it has gained access to the X-Bus. Bus arbitration can be inhibited by asserting the ARB_INHIBIT backplane signal. Only the current owner of the bus may assert this signal. The current owner does so if the intended bus transfer requires multiple cycles.

12.4.1 Class A Request Override

To request the bus, a Class A device asserts both its assigned request level and the bus request sum line on the bus. When the BIF detects the bus request sum assertion in an active bus arbitration cycle, it defers to the class A device(s).

12.4.2 Class B/CPU Requesting

The Class B devices, the four CPUs also have fixed priority assignments. Priority assignments are 0 through 3, with 3 being the highest priority. The assignment is scanned into the BIF and used to determine which of the four Class B request parallel backplane signals each CPU uses. The CPU drives its assigned level, and defers to requestors at higher levels.

Class B devices exercise fair arbitration, and don't reassert their request lines on demand. Instead, Class B devices snapshot all other lower priority Class B request lines during the final cycle of a bus ownership. The Class B device then relinquishes the bus and doesn't reassert a request line until all the snapshotted requests are satisfied. The class B devices observe the current state of the other request lines to determine that the other requestors have been serviced. When a request line is deasserted, service is underway or completed. If a request line is still asserted, but arbitration is enabled, that requestor wins and service resumes.

12.4.3 Default Ownership

When the bus is otherwise idle, the last successful bidder among the Class B requestors remains as the default bus owner. The default bus owner may use the bus at the end of any cycle during which no other request line was asserted. The default bus owner does not have to assert its request line. The default remains in effect until another Class B device wins the bus.

A Class B device's bus ownership may be suspended by a Class A device. If a Class A device assumes control of the bus, the former Class B owner device waits for the bus to become idle again before reclaiming bus ownership (i.e., the Class B device reassumes ownership in the cycle following one during which arbitration was permitted, but does not assert its request line). If another Class B device wins the bus before it becomes idle, default bus ownership transfers to the latest Class B bus owner.

12.4.4 Acquisition Timeout

When a BIF first asserts a bus request line, it starts a timer. If the timer elapses before the bus is acquired, a bus acquisition timeout occurs. The bus timeout duration is approximately 3.2 milliseconds (16-bit counter). If a timeout occurs, the system is assumed broken and a clock freeze request is made of the SCR. The internal BIF state is preserved as much as possible.

The timer is not stopped until either a NOACK or ACK signal is received for the request address transfer. The timer, therefore, expires if a device is continually busy. Broadcast transfers, such as TB invalidates, stop the timer regardless of the acknowledge line state.

12.4.5 Local Request Prioritization

Three competing local requestors are internal to the BIF. They include data cache read, data cache write, and instruction cache read. Data cache read is prioritized over instruction cache read. In turn, instruction cache read is prioritized over data cache write. The following list contains exceptions to these rules:

- If the write data queue is full, data cache write is prioritized over an instruction cache miss.

- If a data cache miss collides in address with a previously queued write, data cache write is given priority over both data and instruction cache miss.

- If a write to an unencacheable memory location is queued, data cache write is given priority over both data and instruction cache misses.

- If a write and unlock is queued. data cache write is given priority over both data and instruction cache misses.

- If a data cache miss from an unencacheable memory location is posted. data cache write is given priority over both data and instruction cache misses.

- If a data cache miss and lock is posted. data cache write is given priority over both data and instruction cache reads.

- If a data cache miss and unlock is posted. data cache write is given priority over both data and instruction cache reads.

- If a tb invalidate is queued in the write buffer. data cache write is given priority over both instruction and data cache misses.

A locally generated READ RESPONSE required for a BIF CSR read is given precedence over all other transmitters.

12.4.6 Subsequent Request Arbitration Delay

The BIF issues subsequent requests from the data cache every other bus cycle (or later). This assures write order between processors, and read-write order within one processor. The instruction cache miss request is not restricted to every other cycle. For load and lock, load and unlock, and store and unlock, subsequent requests are not issued until a successful bus acknowledge of the prior request is received.

The BIF issues subsequent requests from a CPU every other bus cycle (or later). This assures write order. For load and lock, load and unlock, and store and unlock, subsequent requests are not issued until a successful bus acknowledge of the prior request is received.

12.5 X-Bus Reads

X-Bus reads are split into two parts: address transfer and data return. The BIF arbitrates for an address transfer to initiate a data or instruction cache miss. The bus interface then awaits data return. The BIF arbitrates for data return only when responding as a slave to a CSR read.

12.5.1 Read Initiating

When the BIF wins the bus and decides that a read is the highest priority task. it transfers the read address and issues either a READ or a READ MULTIPLE command. It issues a READ command if the CPU request is less than or equal to 32 bits, and was either unencacheable would change the bus lock status. The BIF issues a READ MULTIPLE command otherwise.

If the request is a READ, the byte mask accompanying the address decides the exact request size.

If the request is a READ MULTIPLE. additional request information is provided in the address and data fields. The WD field is always 00. The following settings are used for the LL field:

| | |
|---|---|
| 00 | 64-bit Read |
| 01 | Data Cache Normal Fill |
| 10 | Instruction Cache Fill |
| 11 | Extended Data Cache Fill |

The LONGWORD COUNT field is always equal to 0000 0010.

X-Bus Read Multiple

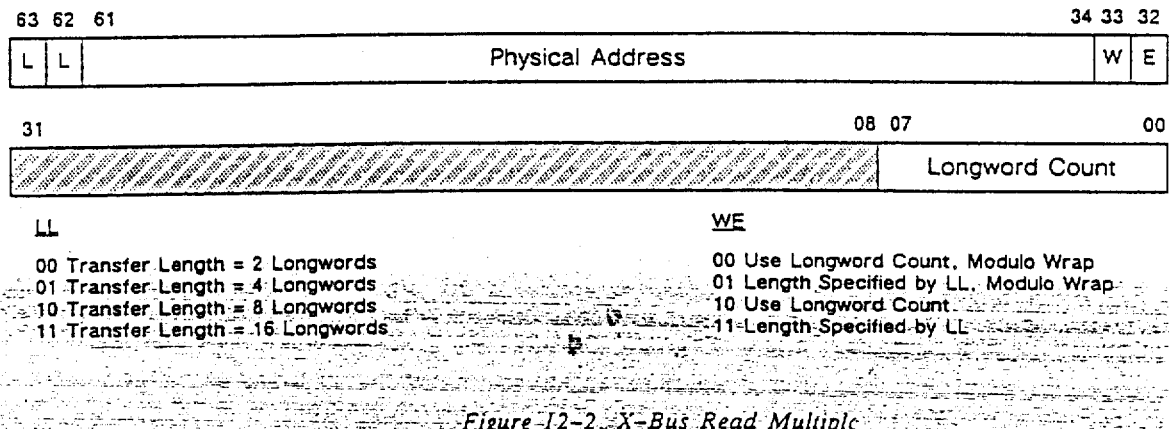

Figure 12-2. X-Bus Read Multiple

There can be multiple reads outstanding on the X-Bus from a single CPU. In such a case, returning read data is distinguished by the sub-ID field. Sub-ID = x0 is used for the data cache. Subid = x1 is used for the instruction cache.

The read address is sourced by the CBA gate array. The CBD gate arrays provide the virtual page offset within segment (VPN). When the read address is transferred, the CBA gate array captures the associated VPN for subsequent use during cache fill and DTS update.

12.5.1.1 Read Initiation Bypass

When a read MMU command is being decoded by the BIF and there are no previous internal requests pending, the arriving PA is immediately forwarded to the X-Bus outbound address register. If the BIF is the default bus owner, no external bus requests are pending, and internal request initiation is not suspended for any reason, the read request is initiated in the following bus cycle.

12.5.2 Read Data Return

After the BIF initiates a bus read, it waits for the return of read data. Several outcomes are possible: data returns as expected, data returns in error, and data fails to return.

The expected data return is either one (READ) or more (READ MULTIPLE) data transfers identified as READ RESPONSEs. The returning data appears on the 64-bit bus aligned as if in memory. Byte 000, if present, is in bit positions 63:56, and so on. If multiple READ RESPONSE cycles are expected, they are either immediately abutting or have intervening NOPs. If there are intervening NOPs, there is always at least 2 such NOPs, and ARB INHIBIT is asserted by the responder to prevent any intervening unrelated bus operations.

If bad data is returned, the accompanying command code is READ RESPONSE ERROR. This may be caused by detecting an uncorrectable ECC or parity error. It may also occur because of a bus timeout or address error in the responding device. No further data is returned subsequent to a READ RESPONSE ERROR. A READ RESPONSE ERROR may occur in any cycle of a mutliple transfer read return bus sequence.

The last possible outcome for a read is for the read data to fail to return. This can only happen in the presence of a hardware failure.

12.5.3 Read Return Timeout

The failure of read data to return is detected when BIF's bus timer expires while a read request remains outstanding on the bus. This is the same timer used in bus acquisition timeout. As mentioned earlier, the timer is started when any request is posted. If arbitration succeeds and a write or TB invalidate follows, the timer is stopped after receiving either an ACK or a NOACK acknoweldge. If arbitration succeeds and a read issue follows, the timer is continued. If the timer then expires before the last read data returns, a read return timeout occurs. If a timeout occurs, the system is assumed broken and a clock freeze request is made to the SCR. The internal BIF state is preserved as much as possible.

If two reads are concurrently outstanding, the timer is restarted when read data return completes for each request. This results in a somewhat longer timeout for the second read request.

If a second request (read, write, or TB invalidate) is issued while a read is outstanding, the timer is not stopped. This results in a shorter bus acquisition timeout for these subsequent requests that expires coincidently with the read data return timeout.

12.5.4 Read Return Minimum Time

The READ RESPONSE for a READ or READ MULTIPLE command must occur no sooner than the first cycle after the acknowledge cycle for the address transfer. This is also the minimum time possible within the bus protocol (except for default bus owners).

12.5.5 Read Return Acknowledge

The BIF either successfully acknowledges, or error acknowledges, a READ RESPONSE addressed to it. If it error acknowledges, it forwards the returning data as if correct to the data or instruction caches. The BIF records the error status in the embedded scan state and requests a clock freeze of the SCR.

12.6 X-Bus Writes

When the BIF wins the bus and decides that a write is the highest priority task, it transfers the write address and data, and sends a WRITE or a WRITE MULTIPLE command. The BIF issues a WRITE command if the data to be transferred is less than or equal to 32 bits. The BIF issues a WRITE MULTIPLE command if the data to be transferred is 64 bits or more.

If the request is a WRITE, the data accompanies the address. The associated byte mask decide the exact request size.

If the request is a WRITE MULTIPLE, the address and transfer direction are sent in the first cycle. Bit 32 is 0 if the address is ascending, and bit 32 is 1 if the address is descending. The second and subsequent cycles transmit 64 bits of data accompanied by a WRITE DATA command. All transfers begin and end on quadword boundaries.

12.6.1 X-Bus Write Multiple Limit

The BIF continually monitors its internal write address and data queue to determine if the next write data to be transferred is an adjacent address quadword. If so, it sustains the write multiple. To prevent excessive bus use by one processor, the BIF stops a write multiple arbitrarily at every 256 byte boundary (32 transfers). Write multiple data is always sent in immediately adjacent bus cycles.

The BIF does not generate odd longword start write multiples.

12.6.2 X-Bus Initial Write Hold Off

The BIF does not attempt to transfer write data as soon as the request is posted. Rather, it delays the transfer, anticipating that subsequent writes to adjacent addresses are likely. The request is finally posted only if one of the following conditions is true:

- If a second write to any address is queued.
- If the pending write was not encacheable.
- If the pending write would unlock the bus.
- If there is a pending data cache miss, which collides in address with the pending write.
- If there is a pending data cache miss that is unencacheable or would change the bus lock status.
- If the free running BIF counter overruns (safety measure).
- If the write is really a TB invalidate.

12.6.3 X-Bus Write Monitoring

All X-Bus writes are monitored even if they are not directed to, or originated by, the local BIF. The BIF determines if a copy of the data at the write address has been locally cached. If so, the BIF schedules an invalidate of that cache entry. The BIF maintains duplicate tag stores.

12.6.4 X-Bus Writes To BIF CSRs

When the BIF detects a 32-bit write into its own register range, it substitutes a WRITE MULTIPLE of 2 longwords for a WRITE command.

12.6.5 X-Bus Write Multiple Acknowledge

The acknowledge for the WRITE MULTIPLE command is correct only when the slave can accept at least the first 64 bits of data. The acknowledge for the WRITE DATA command associated with a write multiple is busy if the associated 64 bits of data cannot be accepted and must be retransmitted.

An error or no acknowledge for a WRITE DATA command is interpreted as a busy acknowledge to preserve state. When this is encountered, the acknowledge driver freezes the clocks.

12.7 X-Bus Slave Response: CSR Access, Interrupt Posting

The BIF holds 4 operationally available registers: ERRADDR, BUS_CSR, ICTRL and ISUM. These registers can be accessed over the X-Bus. In addition, the BIF posts interrupts to the local processor in response to bus writes. The following addresses are those to which the BIF responds as a slave device:

| | |
|---|---|
| 00pp 0200 | Interrupt Summary Register (ISUM) |
| 00pp 0208 | Interrupt Control Register (ICTRL) |
| 00pp 0210 | Bus Control Register (BUS_CTRL) |
| 00pp 0218 | Bus Error Address Register (ERRADDR) |
| 00pp 0220 | Process Timer (PROC_TIMER) |
| 00pp 0100 - 00pp 013C | Interrupt Posting Addresses |

NOTE: pp = Processor number

12.7.1 X-Bus Slave Response: CSR Read Return

The BIF decodes all incoming read requests. If the address matches one allotted to the interface, it returns 32 bits of read data. The data is returned in bit positions 63 through 32. The BIF sometimes delays register read data response so that the read data is returned no sooner than the fourth cycle after the one that provided the read address. This is only necessary when the BIF is the default bus owner.

The BIF gives a busy response when a second X-Bus read request arrives for a register which has an X-Bus read underway. Otherwise, it accepts all read requests.

The BIF gives a no response when the read request is for anything other than 32 bits.

12.7.2 X-Bus Slave Response: CSR Write Accept, Interrupt Posting

The BIF decodes all incoming write requests and, if the address matches one allotted to the interface, acknowledges the request.

If the address is one of the interrupt posting locations, a WRITE command is expected. In this case, the data and byte mask are not interpreted.

If the address is one of the accessible CSRs, a WRITE MULTIPLE command is expected. A request length of 1 or 2 longwords is expected with the data provided in bit positions 63 through 32 of the first WRITE DATA command. This is necessary because of the positioning of the CSR registers in the CBA IC.

The BIF gives a busy acknowledge when an X-Bus write request of any type arrives for a register which has an X-Bus read underway.

The BIF gives an error acknowledge when it detects a parity error in a write data. A WRITE MULTIPLE to an interrupt posting address, or a simple WRITE directed at a CSR also generates an error acknowledgement. In either case, embedded state is set and a clock freeze request to the SCR generated.

12.8 X-Bus TB Invalidates

The local processor can issue TB invalidates for broadcast over the X-Bus. The BIF accepts, queues and delivers to the X-Bus TB invalidates as if they were writes.

12.8.1 X-Bus TB Invalidate Issuing

The BIF transmits TB invalidate requests accompanied by the comands INVAL TB SEL and INVALIDATE TB. If the former command is issued, the address field holds the virtual page address of the entry to be invalidated. The virtual page number, address bits 31 through 12, can be found on the bus in bit positions 63 through 44.

No acknowledge is expected or awaited when a TB invalidate command is issued.

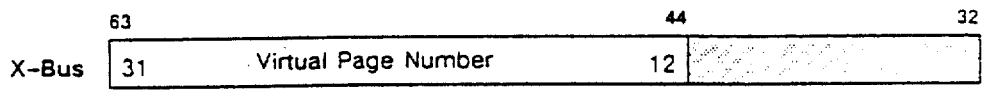

*Figure 12-3 INVALIDATE TB Command Virtual Page Number Field*

The Virtual Page Number is transferred on X-Bus bits 63:44 during INVAL TB SEL and INVALIDATE TB commands.

12.8.2 X-Bus TB Invalidate Accepting

The BIF unconditionally accepts all X-Bus TB invalidate requests and forwards them to the MMU through the invalidate queuing mechanism.

12.9 X-Bus Locking

The BIF accepts load lock, load unlock and store unlock command from the MMU. When load lock completes successfully, that CPU can hold the bus lock until the CPU explicitly releases the lock, or an error arises. Only one CPU at a time may hold the bus lock. That, in turn, permits the construction of critical code sections in a multiple processor environment.

12.9.1 X-Bus Lock Acquisition and Release

The BIF secures the bus lock only when a load lock data cache miss is successfully issued and acknowledged on the X_BUS. In more detail, first the data cache miss which seeks the bus lock is posted. This request pushes all previously queued writes ahead of itself. When the lock request is next to be serviced, the current state of the external bus lock signal is examined. If lock is already asserted by another CPU, the arbitration is deferred. If the bus lock is available, arbitration is attempted. If the bus lock signal is subsequently asserted before the BIF gains access to the X-Bus, the BIF withdraws from further arbitration. When the bus is finally secured, the arb inhibit and lock signals are simultaneously asserted. ARB INHIBIT remains asserted for 3 cycles. This is sufficient time for all other bus interfaces to see the lock signal asserted and withdraw from arbitration if they too plan to secure the bus lock. At the end of 3 cycles, the locking BIF also examines the state of the acknowledge signals. If other than a successful acknowledge is detected, the bus lock is immediately released. If released, the lock signal is deasserted at the end of the cycle following the acknowledge.

The BIF releases the bus lock when a load unlock or a store unlock is successfully issued and acknowledged. Alternatively, the lock is released upon an error in the local processor. A local processor error results in a processor trap. The signal trap dispatch is, therefore, used to unconditionally release the bus lock. In more detail, the data cache read or write which seeks to release the bus lock is posted. This request pushes all previously queued writes ahead of itself. At the end of 3 cycles, the locking BIF examines the state of the acknowledge signals. If other than a successful acknowledge is detected, the bus lock is retained. Otherwise, the lock signal is deasserted at the end of the cycle following the acknowledge.

If the BIF rejects a lock request (REJECT signal), the lock signal and ARB INHIBIT are immediately released. Similarly, if the BIF rejects an unlock request (REJECT signal), the lock is retained.

12.9.2 X-Bus Lock Nesting

The MMU can request the bus lock for PMAPE update while the BIF posesses the bus lock. For this reason, a second load lock request can be accepted. If two bus lock requests have been accepted, two bus unlock requests need to follow before the lock is actually released. In effect, the BIF nests bus lock requests two levels.

12.9.3 X-Bus Lock Duration Timeout

The BIF starts a timer when the bus lock is first acquired. The timer remains running as long as the BIF holds the bus lock. If the timer expires before the lock is released, a lock timeout trap is posted. The timer duration is approximately 200 microseconds (12-bit counter).

The BUS_CSR register indicates when a timeout trap occurs. If a second lock setting request is processed before a held lock is released, the timer is not reset. This results in a shorter timeout for the second request. If an unlock request is being transferred upon the X-Bus, the BIF does not arbitrate for a new lock request for at least five cycles, including the transferring one. This delay assures that there are always be two cycles of delay between the release of a lock and its reacquisition by the same BIF.

12.9.4 X-Bus Data Consistency Under Lock

The BIF guarantees that, once a lock has been acquired, all writes on the bus that preceded the load lock transfer have successfully invalidated the cache. This is a natural outcome of an X-Bus READ command requiring at least 4 cycles before the READ RESPONSE command is seen.

12.10 X-Bus Request Retry

The BIF retries any request that receives a BUSY acknowledge. The retry continues until the bus timeout expires.

If an address transfer receives a BUSY acknowledge, the request is marked as in retry. There can be as many as three requests in retry at any one time. Retry requests receive no different priority treatment, other than following retry holdoff.

12.10.1 X-Bus Retry Holdoff

If a request is in retry, it is not necessarily posted to the bus immediately. The retry interval is a random function over a bound that geometrically increases to a maximum spread of 1.6 microseconds. The function is derived from the free running BIF counter. If multiple requests are in retry at once, they share the holdoff timing.
The minimum request spacing for an immediate retry is 5 cycles. Three cycles make the original transfer and await the acknowldge. One cycle marks the request as in retry. The last cycle rearbitrates for the bus.

12.11 X-Bus Reject

Two successive bus address transfers may be issued by same the BIF in bus cycles spaced apart by only one NOP or foreign cycle. If the first request receives a busy acknowledge, the acknowledge is received only after the second request has been sent. In this case, the bus REJECT signal is immediately asserted. The REJECT signal is interpreted by the slave as nullifying the already accepted request. Using REJECT retains the order of transfers on the bus. This is important when the second request is a read for the same data that is being written by the first request.

When REJECT is asserted, the acknowledge for the second request is ignored. When REJECT is asserted, all transaction side effects such as bus locking, do not take place.

12.11.1 X-Bus Write Order Assurance

Using REJECT in cooperation with the write order assurance of the write queue, guarantees that the write order of one CPU is always preserved, as seen by a second CPU. This permits some forms of multiprocessor synchronization, without needing bus locking.

Chapter 13

Bus Interface Registers

13.1 Interrupt Posting

There are 16 interrupt posting longword addresses to which the BIF responds as a destination. The addresses are in subsequent longwords.

Interrupt Posting Address *(Write Only)*     00pp 0100 to 00pp 013C

```
31                                                                     00
|                                                                       |
```

Data Not Interpreted

PP = Processor Select Number
00, 04, 08, 0C    10, 14, 18, 1C
20, 24, 28, 2C    30, 34, 38, 3C

*Figure 13-1. Interrupt Posting Address Register*

Interrupts are always accepted by the processor to which they are directed. The interrupt originator receives no acknowledge. In effect, storing to an interrupt posting address simply requests an interrupt in the destination processor. There are 16 interrupt classes. The lower numbered interrupt posting address corresponds to the lower numbered interrupt class.

13.2 Interrupt Control Register

Associated with each interrupting address in a processor are both an interrupt enable and an interrupt pend flags. These 2 bits are available in the interrupt control register, INTCTL. The register should be read and written only as a longword quantity.

Interrupt Control (INTCTL)   *(Read/Write)*                   0000 1208

```
31 30                    16 15                                         00
|    | IENAB[14:00]          |        | IPEND[15:00]                    |
```

IENAB = Interrupt enables for Interrupt Classes 0 to 14 *(Read, Write 1 to XOR)*
IPEND = Interrupt Requests for Interrupt Classes 0 to 15 *(Read Only)*

Interrupt Class 15 is Always Enabled

*Figure 13-2. Interrupt Control Register*

The interrupt pend bit is set when a write to the associated interrupting address is detected. The pended interrupt causes a response when its specific interrupt enable bit is set and there is no comprehensive trap masking in effect. The highest priority enabled interrupt pend bit is cleared automatically when the processor reads the interrupt summary register. The corresponding interrupt enable bit is also cleared simultaneously.

The interrupt enable bits may be set and cleared directly by processor writes to the INTCTL register. Storing to the INTCTL register loads the interrupt enable portion of the register with the XOR of the current register contents and the store data. This permits the needed selective updates of register contents.

13.2.1 Non Maskable Interrupt

Interrupt level 15 cannot be masked.

13.3 Interrupt Summary Register

The interrupt summary register identifies the highest priority interrupt that is both pending and enabled. If no interrupt is pending, ISUM<4:0> is set to zero. The register should be read only as a longword quantity.

Interrupt Summary Register (ISUM)   (Read Only)                                        0000 1200

```
31                                                                      05  04 03      00
|////////////////////////////////////////////////////////////////////|  I  | ISUM      |
```

ISUM = Highest Interrupting Level  *Read Only*
I = 1 → Enabled Interrupt Pending Reading Clears IPEND (ISUM) and IENAB (ISUM) in the INTCTL Register

*Figure 13-3. Interrupt Summary Register*

13.4 Bus Control/Status Register

The Bus Control/Status Register (BUS_CSR) permits operational code access to the DTS force hit and miss functions. The BUS_CSR also captures the overall state of any software recoverable error detected by the BIF. The register should always be read and written only as a longword quantity.

The HI and HO bits force the duplicate instruction and data/operand tag stores to hit when a lookup for an X-Bus write is in progress. The MI and MO bits force that lookup to miss. The operation, during which both the force hit and force miss bits for the same duplicate tag store are set, is undefined.

The En and El bits are the trap enables for bus write no response and bus lock timeout respectively. When either trap is pending, whether enabled or not, the corresponding W or L bit is also be set. The trap must be explicitly acknowledged in software by writing a 0 into both W and L. Setting W or L nonzero while the associated trap is enabled, triggers an IP trap. Breaking a lock by trap_dispatch is not recorded as a lock timeout.

Bus Control/Status Register    (Read/Write)                                      0000 1210

| 31 | 30 | 29 | 28 | 27 | 26 | 25 | 24 | ... | 22 | 21 | ... | 18 | 17 | 16 | 15 | ... | 05 | 04 | 03 | ... | 00 |
|----|----|----|----|----|----|----|----|-----|----|----|-----|----|----|----|----|-----|----|----|----|-----|----|
| HI | Ho | M  | Mo | EN | EL | C  |    |     | NORESP |  |    |    | W  | L  |    |     |    | I  | ISUM |  |    |

| | | |
|---|---|---|
| HI = 1 → | Force Hit. DITS | Read/Write |
| HO = 1 → | Force Hit. DOTS | Read/Write |
| MI = 1 → | Force Miss. DITS | Read/Write |
| MO = 1 → | Force Miss. DOTS | Read/Write |
| EN = 1 → | Enable Bus No Response Trap | Read/Write |
| EL = 1 → | Enable Lock Timeout Trap | Read/Write |
| C = 1 → | Enable Process Timer Counting | |
| W = 1 → | Bus Write No Response Trap Pending | Read/Write |
| L = 1 → | Lock Timeout Trap Pending | Read/Write |
| I, ISUM - | Copy of the ISUM Register | Read Only |

NORESP

| | | |
|---|---|---|
| 0000 | No Address Captured | |
| 1--0 | Read Address Captured | |
| -1-0 | Write Address Captured | |
| --10 | Fetch Address Captured | |
| 1--1 | Read Address Captured, Subsequent No Response | |
| -1-1 | Write Address Captured, Subsequent No Response | |
| --11 | Fetch Address Captured, Subsequent No Response | |

☐ = Write 1 to XOR (e.g., to clear status)

*Figure 13-4. Bus Control/Status Register*

The NORESP field indicates what address has been captured in the ERRADDR register. This field is usually zero, except after a no response ack on the X-Bus. When this field becomes non-zero, whether by software action or because it doesn't receive a bus response, the ERRADDR register ceases to clock. If multiple failures to respond have occurred, the LSB of the field is set. The remaining bits and the ERRADDR reflect only the first failure. The lack of bus acknowledge results in either a write no response trap from the BIF, or a trap from the MMU. The NORESP field is zeroed by the trap handler after the ERRADDR has been recovered.

13.5 Bus Error Address

The physical address of any read, write or fetch request that receives no bus acknowledge upon transfer is captured in the bus error address register, ERRADDR. The register begins clocking again only after the software has cleared the NORESP field of the BUS_CSR. This field also associates the ERRADDR register contents with the transfer type.

Bus Error Address Register (ERRADDR)    (Read Only)                              0000 1218

| 31 30 29 | | 02 01 00 |
|----------|---|----------|
|          | ERROR ADDRESS [29:02] | |

*Figure 13-5. Bus Error Address Register*

The captured error address may not correspond directly to the program requested address because of cache fill address zeroing, or write merging.

PROCESS TIMER (PROC_TIMER) *(Read/Write)* 000 1220

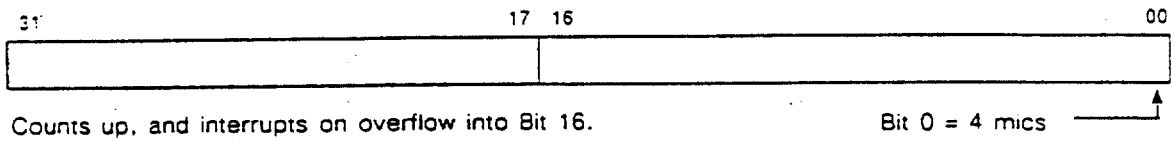

Counts up, and interrupts on overflow into Bit 16.    Bit 0 = 4 mics

*Figure 13-6. Process Timer Register*

13.6 BIF Buried/Scan State

* Buried state, state readable, and writable under scan control only, are provided in the BIF.
* Some of the state is needed for functional operation (that is, the board ID). Some of the state is used to selectively disable various accelerators in the BIF. This latter state is used for diagnostic assistance.

13.6.1 Board ID

There is a four-bit board identifier field, BD_ID (3:0), in the scan ring. The field is used for slave address decoding and read address source ID. The lower two bits also decide on which Class B arbitration level the IC is operating. This field is only in the CBA gate array.

13.6.2 Arbitration Level

There is a two-bit arbitration level field, ARB_LEVEL (1:0), in the scan ring. The field should be set to the same value as BD_ID (1:0). It is used to decide on which Class B arbitration level the IC is operating. This field is in the CBD gate arrays.

13.6.3 Write Multiple Inhibit

There is a one-bit WRITE_MULTIPLE_INHIBIT bit in the scan ring. When set, the BIF does not generate write multiples other than quadwrites. This field is only in the CBA gate array.

13.6.4 Write Merge Inhibit

There is a one-bit WRITE_MERGE_INHIBIT bit in the scan ring. When set, the BIF does not generate write multiples other than quadwrites. This field is only in the CBA gate array.

13.6.5 Read Before Write Inhibit

There is a one-bit READ_BEFORE_WRITE_INHIBIT bit in the scan ring. When set, the BIF does not permit data cache reads to precede data cache writes. This field is only in the CBA gate array.

13.6.6 Write Holdoff Inhibit

There is a one-bit WRITE_HOLDOFF_INHIBIT bit in the scan ring. When set, the BIF issues queued writes as soon as possible. This field is only in the CBA gate array.

13.6.7 Instruction Cache Parity Inhibit

There is a one-bit NO_ICACHE_PARITY bit in the scan ring. When set, the BIF never checks instruction cache data parity. This field is only in the CBD gate arrays.

13.6.8 Data Cache Parity Inhibit

There is a one-bit NO_DCACHE_PARITY bit in the scan ring. When set, the BIF never checks data cache data parity. This field is only in the CBD gate arrays.

13.6.9 DTS Parity Inhibit

There is a one-bit NO_DTS_PARITY bit in the scan ring. When set, the BIF never checks parity in the DITS or DOTS. This field is only in the CBA gate array.

13.6.10 Force Parity Sense

There are two FORCE_PARITY (1:0) bits in the scan ring. When zero, the BIF generates normal parity. When nonzero, the BIF forces all output parity to Ones or Zeros in the DITS, DOTS, and the instruction and data caches. FORCE_PARITY = 10 generates Zeros. FORCE_PARITY = 11 generates Ones.

This field is present in both the CBA and CBD gate arrays. The CBA field controls simultaneously both the DITS and DOTS parity. The CBD field controls both the instruction cache data and data cache data parity.

13.6.11 DTS Parity Error

There is a one-bit DTS_PARITY_ERR bit in the scan ring. It's set when a DTS parity error is detected and remains set until cleared under scan control. When set, the BIF signals the clocks to stop. This bit is only in the CBA gate array.

13.6.12 Instruction Cache Parity Error

There is a one-bit INST_PARITY_ERR bit in the scan ring. It's set when an instruction cache data parity error is detected and remains set until cleared under scan control. When set, the BIF signals the clocks to stop. This bit is only in the CBD gate array.

13.6.13 Data Cache Parity Error

There is a one-bit DATA_PARITY_ERR bit in the scan ring. It's set when a data cache data parity error is detected and remains set until cleared under scan control. When set, the BIF signals the clocks to stop. This bit is only in the CBD gate array.

13.6.14 X-BUS Overlap Control

There is a one-bit ONE_ATATIME bit in the scan ring. When set, the BIF does not issue a second X-Bus reference before the last is fully complete. For a write, this means a successful ACK. For a read, this means a successful read data return. This field is only in the CBA gate array.

13.6.15 Retry Backoff Inhibit

There is a one-bit NO_BACKOFF bit in the scan ring. When set, the BIF reissues retry requests as soon as possible. This field is only in the CBA gate array.

13.6.16 Read Response Error

There is a READ_RESPONSE_ERROR bit in the scan ring. It's set when the BIF accepts a READ RESPONSE which triggers an error acknowledge. Typically, this would be a parity error. The bit remains set until cleared under scan control. When set, the BIF signals the clocks to stop. This field is only in the CBD gate arrays.

13.6.17 Arbitration Timeout

There is an ARB_TIMEOUT bit in the scan ring. It's set when the BIF's arbitration timer elapses before acquiring the X-Bus. The bit remains set until cleared under scan control. When set, the BIF signals the clocks to stop. This field is only in the CBA gate array.

13.6.18 Read Return Timeout

There is a READ_RETURN_TIMEOUT bit in the scan ring. It's set when the BIF's read return timer elapses before an expected READ RESPONSE arrives. The bit remains set until cleared under scan control. When set, the BIF signals the clocks to stop. This field is only in the CBA gate array.

13.6.19 Error Acknowledge

There is an ERROR_ACKNOWLEDGE in the scan ring. It's set when the BIF receives an error acknowledgement to an address transfer. It's also set when a no acknowledge response to a data transfer cycle of a write multiple occurs. The bit remains set until cleared under scan control. This bit does not request clock stopping. This field is only in the CBA gate array.

13.6.20 DTS RAM Diagnostic Address Generation

There is a one-bit DTS_DIAGADDR bit in the scan ring. When set, the BIF CBA generates increasing DTSINDEX addresses. These addresses are used for the DTS and primary cache RAM selftests. This bit is only in the CBA gate array.

13.6.21 DTS Diagnostic Data Generation Control

There is a one-bit DTS_DATALD bit in the scan ring. It is used to control the source of data for writing and comparison during the DTS selftest. This bit is only in the CBA gate array.

13.6.22 DTS Diagnostic Data Writing Control

There is a one-bit DTS_DIAGWE bit in the scan ring. When set, diagnostic data is written into the DTS RAMs during every cycle. This bit is only in the CBA gate array.

13.6.23 DTS Diagnostic Error

There is a one-bit DTS_TESTERR bit in the scan ring. It is set if there is a miscompare during the DTS RAM selftest. This bit is only in the CBA gate array.

13.6.24 Cache Diagnostic Data Generation Control

There is a one-bit CACHE_DATALD bit in the scan ring. It is used to control the source of data for writing and comparing during the cache data selftest. This bit is in the CBD gate arrays.

13.6.25 Cache Diagnostic Data Writing Control

There is a one-bit CACHE_DIAGWE bit in the scan ring. When set, diagnostic data is written into the cache data RAMs during every cycle. This bit is in the CBD gate arrays.

13.6.26 Cache Diagnostic Error

There is a one-bit CACHE_TESTERR bit in the scan ring. It is set if there is a miscompare during the selftest of the cache data and parity RAMs. This bit is in the CBD gate arrays.

13.7 IP Trapping

A three-bit trap code is sent from the BIF to the IP. There are only five useful codes derived from these three bits. BIF_ERROR is either a write bus no response acknowledge or lock timeout. The BUS_CSR must be read to determine which is the case.

```
BUS_TRAP_REQ[2:0]

000     No Request
001     BIF Error
010     Interrupt
011     BIF Error/Interrupt
1--     NMI
```

Whenever the IP initiates a trap sequence, the signal IP_TRAP_DISP is asserted. Asserting this signal unconditionally releases the bus lock.

Chapter 14

Invalidate Pipeline

14.1 Duplicate Tag Stores

The Duplicate Tag Store (DTS) is a copy of the CPU's Instruction and Operand Cache Tag Store which is used to compare addresses being modified on the X-Bus against the contents of the caches. If a match between a location being modified on the X-Bus and DTS entry is found, that entry is invalidated in the corresponding cache. Performing this operation without the DTS wastes many cycles in the caches to compare the cache tags against X-Bus memory modify transactions.

The duplicate instruction tag store is referred to as DITS. The duplicate date or operand tag store is referred to as DOTS.

14.1.1 DTS Addressing

The DTS is the principal caches with virtual addresses. The X-Bus deals only with physical addresses. The virtual address of a transaction is formed by using the 12 LSBs of the physical address that are the same as the 12 LSBs of the virtual address and concatenating them with enough of the virtual address to index the cache. For the CPU's 128 KB instruction cache, 5 virtual bits are required. For the CPU's 64 KB data cache, 4 virtual bits are required. These bits accompany the physical address on the X-Bus.

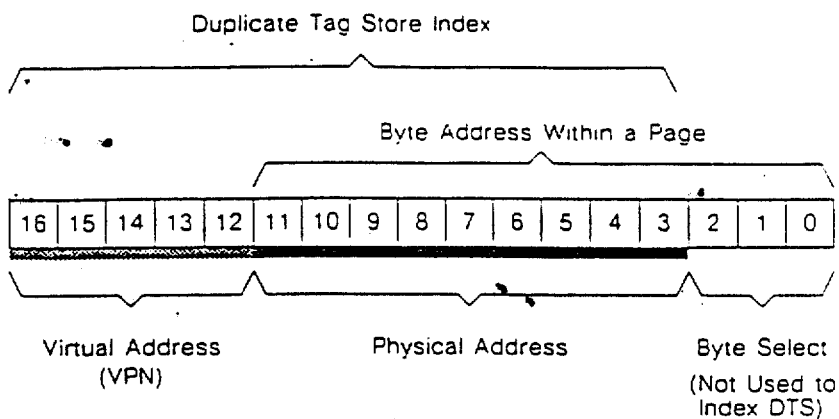

Figure 14-1. Duplicate Tag Store Addressing

Duplicate Tag Store Addressing — Bits 16 through 3 are used to address the Duplicate Tag Store. Bits 16 through 12 are taken from the VPN of the X-Bus transaction. Bits 11 through 3 are taken from the physical address. One less bit is required to address the Duplicate Operand Cache Store than the Duplicate Instruction Cache Store. Only 13 bits are used to address the DOTS (Bit 16 is tied to a fixed value).

DITS and DOTS are commonly addressed.

14.1.2 DTS Contents

Each DTS entry contains two fields: an 18-bit physical tag and a 1-bit parity check bit. These fields are shown in Figure 14-2.

The physical tag is the 18-bit physical page number which, along with a 12-bit index, addresses 1 gigabyte (30 bits) of physical address space. The parity bit is an odd parity check bit.

There is no explicit valid bit. In invalid entry points to an unlikely memory location (0).

Example:
physical tag = 000000000000000000
parity bit = 1

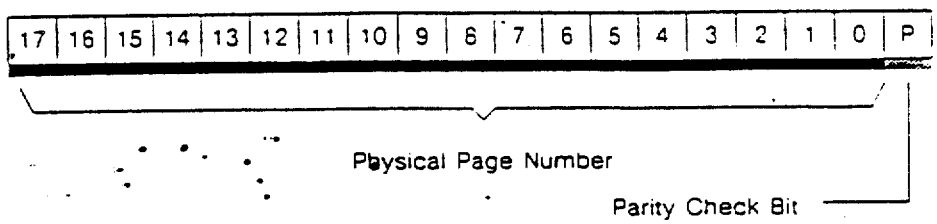

Figure 14-2. Duplicate Tag Store Contents

Duplicate Tag Store Contents — The Duplicate Tag Stores contain an 18-bit physical page number and a parity check bit.

14.2 DTS Functional Overview

Duplicate Tag Store operations can be divided into the following categories:

- DTS lookup
- DTS hit
- DTS allocate from processor write
- DTS allocate from read response The DTS acts as an imperfect filter for cache invalidates. Any time some other system device (including another CPU) modifies a memory location, the DTS is checked to see if that location is currently resident in either of the CPU's caches. If it is present, a cache cycle is stolen from the cache that contains that location. The entry in the cache and the entry in the DTS are invalidated. The DTS may actually have labelled entries, which are not valid in the caches, as valid. This generates a needless cache invalidate cycle.

The DTS is updated in two separate situations, similiar to the main caches. The first is when the CPU modifies a location by executing a STORE operation. The second is when a cache miss is generated and the data returns on the X-Bus.

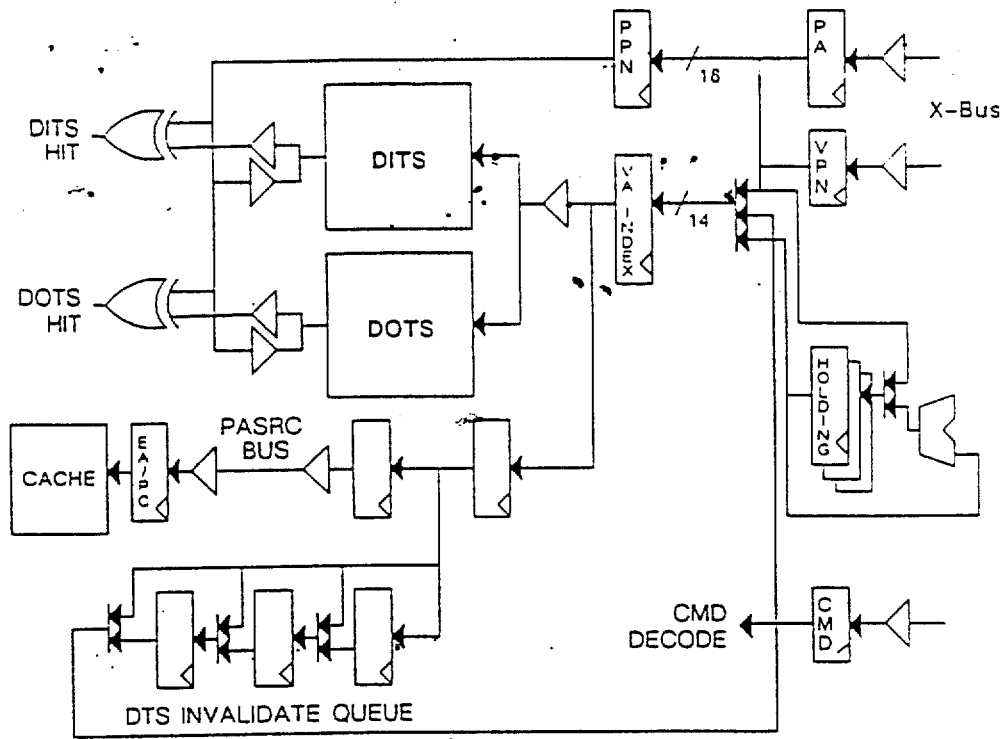

*Figure 14-3. Basic Duplicate Tag Store Data Paths*

14.3 DTS Lookup

A joint lookup of the DITS and DOTS is performed whenever the following transactions are detected on the X-Bus:

- WRITE from another device

- WRITE MULT followed by WRITE DATA from another device

A lookup only of the DITS is performed whenever the following transactions are detected on the X-Bus:

- WRITE from this CPU

- WRITE MULT followed by WRITE DATA from this CPU

The DTS lookup is basically handled in three pipeline stages. The following stages are slaved to the operation of the X-Bus:

- COMMAND DECODE
- DTS ACCESS
- TAG COMPARE

14.3.1 DTS Lookup: Write

The CMD field is decoded during the first cycle after the X-Bus bus write transaction. If a WRITE operation is decoded, the address to be used as a DTS index is loaded into the DTS INDEX register. During the next cycle, the DITS is accessed in a read operation. The DOTS is optionally accessed. The tags are compared, as required, to the physical page number. If the PPN and DTS tag match, a cache entry invalidate and a DTS entry invalidate are scheduled.

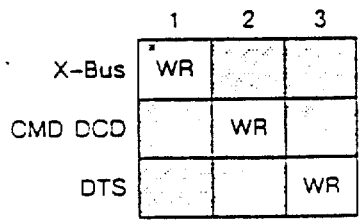

*Figure 14-4. DTS Lookup Pipeline Schedule for WRITE or WRITE UNLOCK*

Cycle 1     A WRITE transaction on bus. The transaction is loaded into the BIF's X-Bus input registers.

Cycle 2     The command is decoded. If it is a WRITE, the DTS index register is loaded from the physical address and the VPN. The physical address is piped forward for the tag compare(s).

Cycle 3     A DTS read access takes place. The tag is compared to the physical address. If a match occurs, a cache entry invalidate and a DTS entry invalidate are scheduled.

14.3.2 DTS Lookup: Write Multiple

If the command is decoded and determined to be a WRITE MULTIPLE transaction, the address is stored in the DTS index. During the following cycle, when the corresponding WRITE MULTIPLE DATA is decoded, the first lookup is optionally done if the WRITE MULTIPLE began on an odd longword boundary. Otherwise, the address is held in the DTSINDEX. Thereafter, the DTSINDEX is loaded with its former contents, plus or minus 8 bytes (depending on whether the WRITE MULTIPLE was ascending or descending), anticipating the next WRITE MULTIPLE DATA cycle.

| | 1 | 2 | 3 | 4 | 5 |
|---|---|---|---|---|---|
| X-Bus | WM | $WD_1$ | $WD_2$ | | |
| CMD DCD | | WM | $WD_1$ | $WD_2$ | |
| DTS | | | $WD_0$ | $WD_1$ | $WD_2$ |

*Figure 14-5. DTS Lookup Pipeline Schedule for WRITE MULT with Two Data Transfer Cycles*

Cycle 1 — A WRITE MULTIPLE (WM) transaction on bus. The transaction is loaded into the BIF's X-Bus input registers.

Cycle 2 — The command is decoded. If it is a WRITE MULTIPLE, the address used to index the DTS is loaded into the DTSINDEX register. At this time, the first quadword of the WRITE MULTIPLE DATA is on the X-Bus (WD1).

Cycle 3 — WRITE MULTIPLE DATA is decoded, and the address in the DTSINDEX is optionally incremented or decremented by 4 bytes. The optional odd longword (WDo) lookup occurs. If a match occurs, cache entry invalidate and DTS entry are scheduled.

Cycle 4 — A DTS read access takes place for WD1. The tag is compared to the physical address. If a match occurs, cache entry invalidate and DTS entry are scheduled.

Cycle 5 — A DTS read access takes place for WD2. The tag is compared to the physical address. If a match occurs cache entry invalidate and DTS entry are scheduled.

14.3.3 DTS Lookup Hit Processing

When a memory modify operation by another device causes a hit in either DTS, or a locally generated write hits in the DITS, two events are scheduled. The event invalidates the entry (or entries) which caused the hit in the main cache. The second event invalidates the entry (or entries) in the DTS to make it consistant with the main caches. When modifying a memory location that is also in the local caches, it usually takes six cycles for a WRITE to proceed from the X-Bus to that entry being invalidated.

- Transaction on X-Bus
- Command decoded
- DTS accessed
- PA bus arbitration
- PA BUS/EASRC/PCSRC transfer
- Cache tag write(s)

The DTS entry invalidate is placed in a queue awaiting a free DTS cycle. Once a hit has been detected, the hitting index is loaded into the address register of the cache corresponding to the DTS that contains the hit. During the following cycle, the DTS lookup is used to complete the address compare. It requests use of the PA bus during the following cycle. The PA bus is always available except when the DTS invalidate pipeline is pre-empted by a READ RESPONSE operation filling a cache miss (discussed later). The cycle following PA arbitration of the index is driven off the BIF address chip, and MMU enables the drivers to either the PCSRC bus or the EASRC bus (or both). An index hitting in the DITS makes it's way to the PC register while one hitting in the DOTS must be loaded into the EA register. An index hitting in both the DITS and DOTS is loaded into both EA and PC registers.

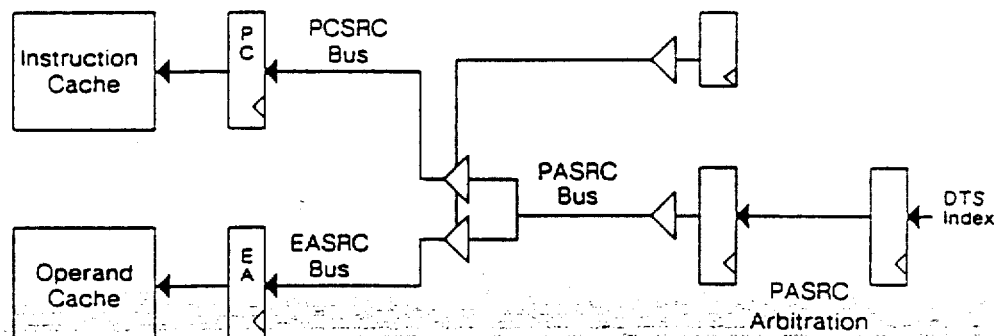

Figure 14-6. Cache Invalidate Datapaths (not all bus sources are shown)

Apollo Preliminary and Confidential

|  | 1 | 2 | 3 | 4 | 5 | 6 |
|---|---|---|---|---|---|---|
| X-Bus | $W_1$ | $W_2$ | | | | |
| CMD DCD | | $W_1$ | $W_2$ | | | |
| DTS | | | $W_1$ | $W_2$ | DTS INV1 | DTS INV2 |
| PASRC ARB | | | | $W_1$ | $W_2$ | |
| PASRC | | | | | $W_1$ | $W_2$ |
| CACHE | | | | | $W_1$ | $W_2$ |

Figure 14-7. DTS Hit With Cache Entry Invalidate and Delayed Dts Entry Invalidate Cycle 1    A WRITE (W) transaction on bus. The transaction is loaded into the BIF's X-Bus input registers.

Cycle 2    The command is decoded. The physical address is piped forward for the tag compare. The virtual index is loaded into the DTS index register.

Cycle 3    A read operation is performed on the DTS.

Cycle 4   The results of the tag compare are available. Since there was a hit, the PASRC bus is requested. The DTS entry invalidate(s) are queued for execution when DTS is available.

Cycle 5   The virtual index of the location to be invalidated is passed via the PASRC bus to the appropriate cache address register.

Cycle 6   The cache entry causing the DTS hit is invalidated.

14.4 DTS Allocate from Processor Writes

When the CPU modifies an operand cache location via a store instruction, the DOTS must also be updated to reflect the cache's new state. The update occurs after the transaction is placed on the X-Bus. This avoids DTS conflicts by using the X-Bus as a synchronization point for DTS access. Only one device can use the X-Bus at a time and that device has to arbitrate to obtain the bus. The only DTS operations that are not synchronized through the X-Bus are the DTS entry invalidates. They are lower priority than the other DTS operations.

Apollo Preliminary and Confidential

14.4.1 DTS Allocate: Write

The BIF address chip decodes a WRITE operation it has generated on the X-Bus. It writes the new tag into the DOTS while doing a lookup into the DITS during the following cycles. A hit occuring in the DITS at this point indicates that the processor is modifying a location that has been cached in the instruction cache. An instruction cache entry invalidate and a DITS entry invalidate are scheduled.

While the DTS write allocate occurs, the DTS index must be compared against every index in the DTS entry invalidate queue that is scheduled to invalidate an entry in the DOTS. If any of the compares succeed, that DTS entry invalidate must be invalidated. If the invalidate was scheduled for both the DITS and DOTS, it is retagged as being only for the DITS. In this way, an old pending DOTS entry invalidate won't destroy a recently allocated entry.

14.4.2 DTS Allocate: Write Multiple

A WRITE MULTIPLE from the CPU is treated just like a WRITE MULTIPLE from another device. The only difference is that the DOTS is written into with the physical tag, rather than read and checked for tag match.

|        | 1  | 2  | 3  |
|--------|----|----|----|
| X-Bus  | PW |    |    |
| CMD DCD |    | PW |    |
| DTS    |    |    | PW |

*Figure 14-8. DTS Allocate From Processor Write*

Cycle 1  Processor write is placed on X-Bus from WRITE BUFFER.

Cycle 2  The write is decoded and also determined to be from the same CPU.

Cycle 3  The DOTS is updated with the new physical tag and the valid bit is set. The DITS is checked for a tag compare and, if a hit occurs, the instruction cache entry invalidate and DITS entry invalidate are scheduled in the usual way.

Apollo Preliminary and Confidential

14.5 DTS Allocate from Read Response

The DTS is also written when a READ RESPONSE returns in reply to a READ MULTIPLE made by the same CPU. When a cacheable miss occurs in a cache, a READ MULTIPLE request is sent to main memory. Main memory returns the requested data in the form of successive READ RESPONSEs. Upon decoding the expected READ RESPONSE command, the BIF sends the associated tag to the waiting cache and enters the tag into the DTS using the conventional DTS pipeline. No tag comparison is performed during this DTS cycle, and only the DTS corresponding to the cache that missed is updated.

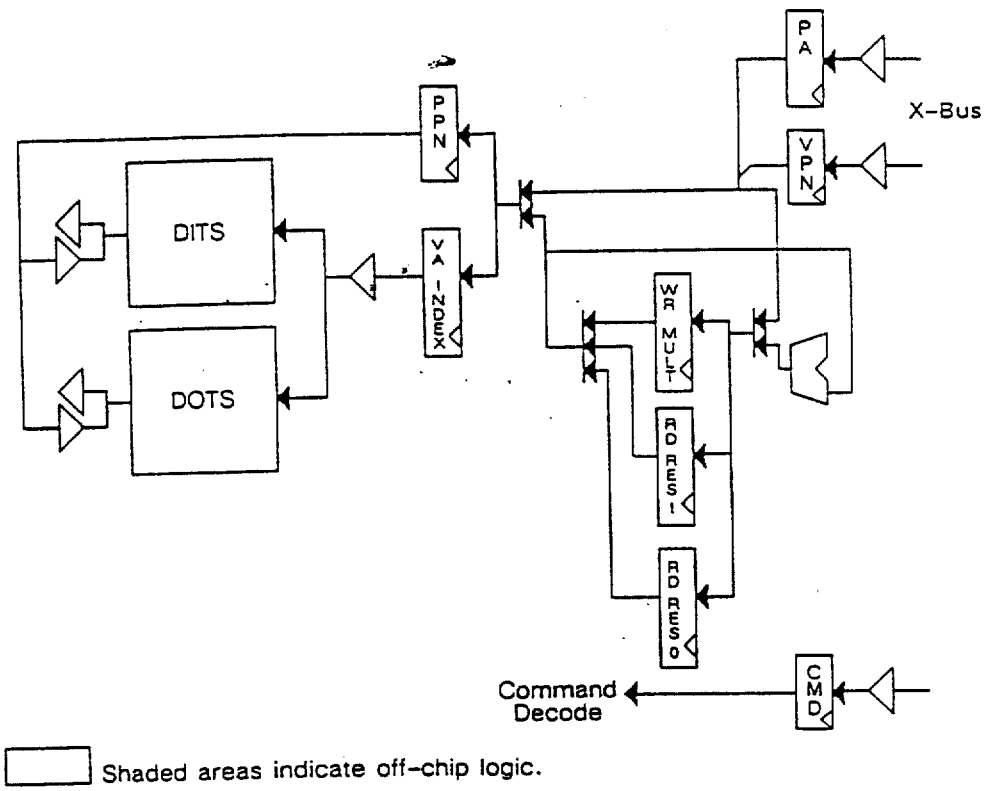

Shaded areas indicate off-chip logic.

*Figure 14-9. DTS Index Increment/Decrement Datapaths*

Three sets of addresses must be stored and manipulated when addressing the DTS. The DTS index register is used when processing WRITE MULTIPLES. Two other registers are used to hold the addresses associated with two possible pending cache miss READ RESPONSEs.

Apollo Preliminary and Confidential

|  | 1 | 2 | 3 |  | N-1 | N | N+1 | N+2 | N+3 |
|---|---|---|---|---|---|---|---|---|---|
| X-Bus | RM |  |  |  |  | RR$_1$ | RR$_2$ |  |  |
| CMD DCD |  | RM |  |  |  |  | RR$_1$ | RR$_2$ |  |
| DTS |  |  |  |  |  |  |  | RR$_1$ | RR$_2$ |

*Figure 14-10. READ MULTIPLE Request and READ RESPONSE Scenario with DTS Update*

Cycle 1 — A cache miss causes the BIF to place a READ MULTIPLE request on the X-Bus.

Cycle 2 — The command is decoded and determined to be a self-generated READ MULTIPLE. The VPN and physical address are stored in the appropriate pending operation holding register. Which pending operation holding register depends on the X-Bus SUBID signaling whether it is an instruction or operand cache miss.

Cycle 3...N-1 — The memory subsystem is processing the READ MULTIPLE.

Cycle N — The memory subsystem places the first of two READ RESPONSE transactions on the X-Bus.

Cycle N+1 — The second READ RESPONSE is on the X-Bus. The first READ RESPONSE is decoded and the corresponding address is loaded from the holding register to the DTS index. The holding register is then loaded with its contents ± 8 bytes, depending on the ordering for that type of operation. (I-miss or D-miss).

Cycle N+2 — The first READ RESPONSE is updating the DTS. The second READ RESPONSE is decoded, the contents of the holding register are again transferred to the DTS index register, and the holding register is stepped (± 8 bytes).

Cycle N+3 — The second READ RESPONSE updates the DTS.

Chapter 15

Write Pipeline

15.1 Write Buffer Overview

The write buffer serves two purposes. First, it isolates the processor from memory and bus latencies during stores. Second, it reduces overall bus traffic.

The write buffer isolates the processor from memory and bus latencies by offering a high bandwidth FIFO queue for store operations. The processor can submit many back-to-back stores and continue functioning while this queue is emptied, through the X-Bus, into memory as both become available.

The write buffer serves to reduce bus traffic by collapsing and grouping small, adjacent writes into large single blocks which make better use of the X-Bus and main memory resources.

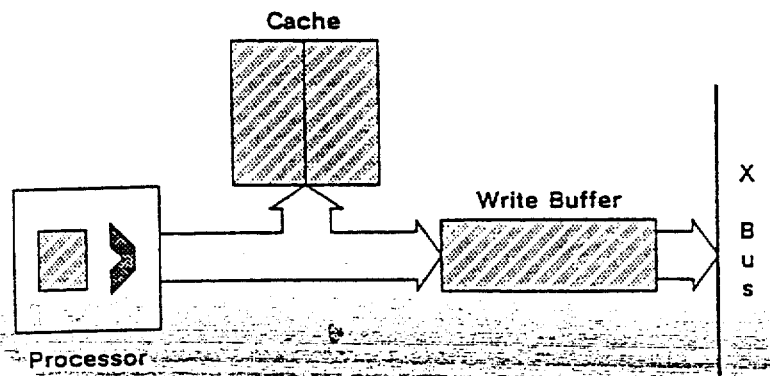

Figure 15-1. The Write Buffer

15.1.1 FIFO Organization

The write buffer is physically split across the CBA and CBD gate arrays. The CBA holds the address portion of the queue and the CBD holds the associated data. There are 64 data bits associated with every queue address.

The queue is structured as a variable depth FIFO. Entries are added to the bottom of the queue and removed from the top. The top of the queue is always at a fixed point. The bottom of the queue varies depending on the current number of queue entries.

There are address comparators at every queue entry. These comparators are used to decide whether newly arriving write data may be merged with the current queue contents. This write compaction reduces bus and memory bandwidth requirements. The address comparator is also used to permit reads to bypass writes. The address comparators indicate any read/write address collisions that would prevent the bypass.

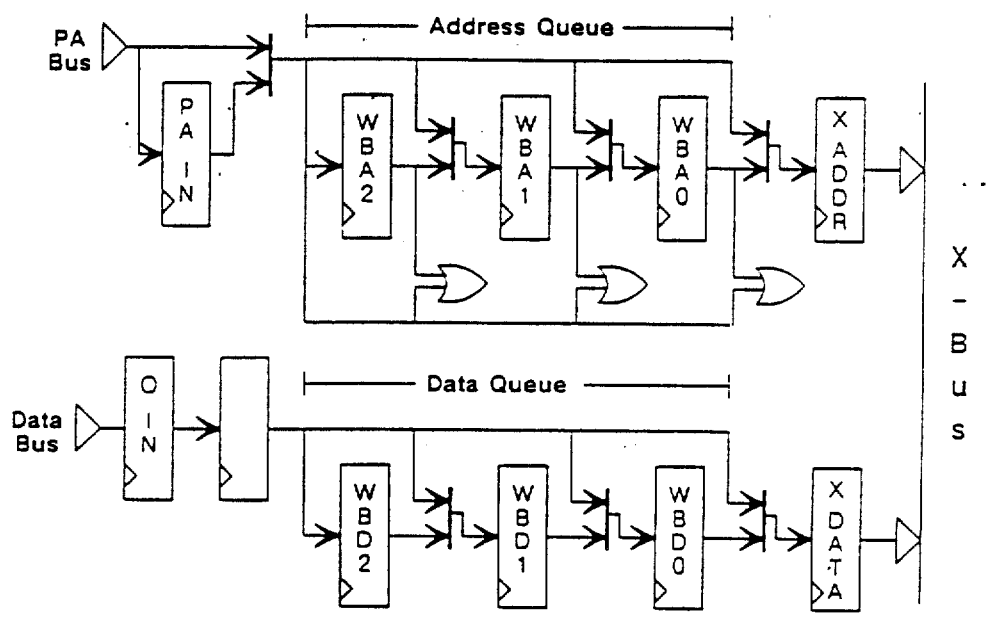

*Figure 15-2. Write Buffer Pipeline*

The WRITE BUFFER pipeline shows data and addresses flowing from the processor to the X-BUS, sometimes by way of a FIFO queue.

Queue entries are not unloaded until a successful X-Bus acknowledge is seen. Transmit bypass is used when a second (or successive) X-Bus write is initiated before the first acknowledge is received. Transmit bypass selects the first untransmitted queue entry as the next address or data to send.

15.2 Write Address/Data Staging

The processor store data is captured from the cache DATA bus during the store's access stage. Typically, the address follows in the next cycle on the PA bus. If the PA bus is not available in that cycle, or there is a processor EVALID stall in effect, the data is held in place by the MMU deasserting the MMU_HDATA_LD signal.

There are two inbound data staging registers and one address staging register before the write queue proper. (See Figure 15-2.) One data staging register is used to compensate for the early data arrival. The other data staging register, and the address staging register, are used to allow the address comparisons to take place and control the load enables in the queue. The address comparisons determine whether the store data may be merged with data already present.

15.3 Write Queue Contents

In addition to holding the data, each CBD data queue has a MSHALF_VALID and LSHALF_VALID flag. The valid bits are used to determine whether there are any contents in the entry. LSHALF_VALID and MSHALF_VALID are also used to control the output write rotation needed for a 32-bit (or smaller) write to an even longword address. There is a NOSWAP flag that defeats the output write rotation in case the MMU has already rotated the data properly. If MSHALF_VALID and LSHALF_VALID are both valid, a "2" is sourced with correct parity during the address phase of a write multiple transfer.

*Table 15-1. MS_VALID, LS_VALID, NO_SWAP Decoding*

| MS_VALID | LS_VALID | NO_SWAP |              |
|----------|----------|---------|--------------|
| 0        | 0        | -       | Empty        |
| 1        | 0        | 0       | Even Long    |
| 1        | 0        | 0       | Even Long - MMU |
| 0        | 1        | -       | Odd Long     |
| 1        | 1        | -       | Quad         |

In addition to holding the address, the CBA address queue holds 4 BYTE_VALID bits and the MSHALF_VALID and LSHALF_VALID flags. LSHALF_VALID is almost address bit 2. The four BYTE_VALID bits correspond to the 4-bit byte mask required for a 32-bit bus write. The CBA sources these onto the X-Bus during the address phase of a write or write multiple. There is no need for the NO_SWAP bit.

Apollo Preliminary and Confidential

*Table 15-2. MS_VALID, LS_VALID, BYTE_VALID Decoding*

| MS_VALID | LS_VALID | BYTE_VALID | |
|---|---|---|---|
| 0 | 0 | ---- | Empty |
| 1 | 0 | BBBB | Even Long |
| 0 | 1 | BBBB | Odd Long |
| 1 | 1 | ---- | Quad |

The CBA IC also has other flags that control internal arbitration and write compaction. There are NOCACHE, UNLOCK, INVTLBALL, and INVTLBE flags associated with each address. Any of these flags being set inhibits write compaction and read around write. UNLOCK releases the bus lock if the nesting level is 0 and this CBA holds the lock. The invalidate TB flags force the selection of the TB invalidate bus command.

15.4 Write Queue Loading

Unless the queue is full, processor stores are accepted and added to the queued data without stalling the CPU. Typically, the store's data and address are added simultaneously to the bottom of the address and data queues. The position of the queue's bottom is determined by the first empty queue entry (measured from the queue's top). The affiliated flags are set.

15.4.1 Load Merge

If cacheable store data is being added to the queue, and the last valid entry in the queue is also cacheable and agrees in the quadword address, the load data is merged into that entry. The merging logically ORs the valid bits. The merging happens if the data to load is a longword or quadword quantity. The merging is permitted if the data to load is a byte (or word) in length. The merging is allowed if the queue entry is already a quadword, or if the merge result does not spill over into the second longword.

15.4.2 Write Buffer Full

When the last entry in the write queue is occupied, and the inbound data address register is occupied or about to be occupied (MEM_CMD is requesting the use), the signal WBUF_FULL is sent to the MMU to prevent any further stores from advancing. If there is a store currently in its cache access stage cache, that store's data is captured and held, but freezes in its EXC stage. The signal WBUF_FULL is deasserted the next time the write queue advances.

15.5 Write Queue Unloading

The queue entries are unloaded during the cycle after receiving a successful acknowledge for the address or data transfer on the X-Bus. If retry is required, the address/data is still available in the write queue.

Write addresses are always taken from the write address queue. Only reads use the fast pass address paths from the MMU. The fast pass paths are for quick posting of read miss addresses in the event of default bus ownership.

15.5.1 Transmit Bypass

The address or data to send on the X-Bus is normally at the top of the queue. If, however, the top entry in the queue has been transmitted but not acknowledged, the next-to-top entry in the queue is used. During write multiples, queue data is being transmitted every cycle. Since the queue must be accessed during the cycle before the X-Bus transmission, and the queue unload occurs in the third cycle after the X-Bus transmission, 4 levels of transmit data bypassing are required. The four levels of bypassing allow reaching back to the fifth queue entry from the top. This is shown in Figure 15-3.

| ACCESS | D1 | D2 | D3 | D4 | D5 |
|---|---|---|---|---|---|
| TRANSMIT |  | D1 | D2 | D3 | D4 |
| PEND |  |  | D1 | D2 | D3 |
| ACK |  |  |  | D1 | D2 |
| UNLOAD |  |  |  |  | D1 |

*Figure 15-3. Transmit Bypassing*

An additional level of transmit bypassing is provided in the address queue output delivery. This allows a level of address look-ahead that enables early detection of write multiples. The write multiple gets ahead when the first X-Bus cycle transmits only an address (no data). This one cycle gap is enough to let the address transmit bypass pass ahead of the data by one cycle.

Transmit bypass requires a SENT flag associated with the top 3 data and top 4 address queue entries. A queue entry is bypassed if it is already sent, or the queue element in front of it is already sent and there is another transfer on the bus at the time.

15.5.2 Transmit Retry

If a data or address X-Bus transfer receives an error or busy acknowledge, all queue element sent bits are reset. The requests are retried. The REJECT signal may also be asserted.

15.5.3 Write Multiple Collapse

If the next address to send is for a quadword, a WRITE MULTIPLE command is sent. While the address is being transmitted on the X-Bus, the next queue addressed is checked to see if it's also a quadword, and in an adjacent quadword.

The adjacency direction is determined by the write queue when it examines the lower order bits of the next two addresses to transmit.

Write multiples are arbitrarily broken up on 256-byte boundaries to prevent any device from holding the bus for extended periods of time.

15.6 Read Around Write

If an instruction cache read is posted, the read can pass around previously queued writes.

If a data cache read is posted, the read can pass around previously queued writes only if the address doesn't collide with a pending write. The write queue detects this address collision and reports it to the internal BIF arbitration logic.

15.7 Write Parity

Parity for both address and data is regenerated just before X-Bus transmission.

Chapter 16

Data Cache Interface

This chapter describes the CPU to X-Bus data cache interface.

16.1 Data Cache Read Miss

Processor operand loads are usually satisfied by the data cache. A data cache read miss occurs when the data cache does not have the requested item. A cache read miss also occurs when the read request must be forwarded to the bus regardless of whether cached data is available. Typical of this latter situation is a read from an I/O control register.

Cache miss processing is the joint responsibility of the BIF and the MMU. The BIF sources the fill address and informs the MMU as the data RAMs are written.

16.1.1 MMU Request to the BIF

The MMU provides the read's 30-bit physical address on the PA bus. The MMU command accompanies the physical address.

The read's virtual page offset within segment (VPN) bits are presented before the physical address and command. Typically, the BIF captures the 7 bits from the external EA register during every cycle. If a read miss occurs, the physical address and command arrive in the following cycle. If, however, the PA bus is not available in the following cycle, the MMU asserts the signal MMU_HOLD_DVPN. The BIF holds the captured data cache VPN. MMU_HOLD_DVPN is deasserted during the cycle in which the physical address and command are finally sent to the BIF.

The commands that apply to data cache miss are summarized in Table 16-1. The shaded areas do not apply to read misses.

*Table 16-1. Data Cache Read Miss Command Codes*

MEM_CMD[4:0]

| 00000 | NOP | 10000 | store.nolock.cache.1 |
|-------|-----|-------|----------------------|
| 00001 | load.nolock.cache.16 | 10001 | store.nolock.cache.2 |
| 00010 | fetch.nolock.cache.32 | 10010 | store.nolock.cache.4 |
| 00011 | load.nolock.cache.64 | 10011 | store.nolock.cache.8 |
| 00100 | load.nolock.nocache.1 | 10100 | store.nolock.nocache.1 |
| 00101 | load.nolock.nocache.2 | 10101 | store.nolock.nocache.2 |
| 00110 | load.nolock.nocache.4 | 10110 | store.nolock.nocache.4 |
| 00111 | load.nolock.nocache.8 | 10111 | store.nolock.nocache.8 |
| 01000 | load.lock.nocache.1 | 11000 | TB invalidate single |
| 01001 | load.lock.nocache.2 | 11001 | TB invalidate all |
| 01010 | load.lock.nocache.4 | 11010 | mmu_store.unlock.nocache.4 |
| 01011 | load.lock.nocache.8 | 11011 | unassigned |
| 01100 | load.unlock.nocache.1 | 11100 | store.unlock.nocache.1 |
| 01101 | load.unlock.nocache.2 | 11101 | store.unlock.nocache.2 |
| 01110 | load.unlock.nocache.4 | 11110 | store.unlock.nocache.4 |
| 01111 | load.unlock.nocache.8 | 11111 | store.unlock.nocache.8 |

16.1.2 Cacheable Data Read Miss

In the typical data cache miss, the MEM_CMD(4:0) field is either 00001, LOAD.NOLOCK.CACHE.16, or the field is 00011, LOAD.NOLOCK.CACHE.64. The first command requests a cache fill of 16 bytes. The second command requests a cache fill of 64 bytes. This second command is issued only if the cache miss is triggered by a 64-bit floating-point load at an address boundary that is zero modulo 64.

The address presented with the data is the IP's exact load address. Before forwarding to the X-Bus address, bit 3 must be unconditionally zeroed on a 16-byte fill. Address bits 5, 4, and 3 will naturally be zero on a 64-byte fill. This is required by the fill algorithm, which is natural-order beginning at the nearest lower-byte boundary that is 0 modulo the fill size. The address mask bits must be forced to all ones before transferring on the X-Bus.

16.1.3 Uncacheable Data Read Miss

A load may reference data that is marked uncacheable. Load data may be declared uncacheable for any of the following reasons:

- The PMAPE's C bit is set in the virtual address mapping tables.

- The memory reference address is a physical one because virtual translation is not enabled.

- The memory reference address is a physical one required for an MMU table walk.

- The memory reference address is a physical one caused by a load.physical instruction.

- The CPU's instruction is a load.lock, requiring access to the bus.

- The CPU's instruction is a load.unlock, requiring access to the bus.

The caching decision is made by the MMU and communicated within the MMU command field. All of the remaining data cache miss codes (other than those just mentioned in the last section) apply to uncacheable references.

In an uncacheable data cache miss, only the requested data is returned. The address presented with the MMU command is forwarded, as is, to the X-Bus. The read mask is appropriately constructed to reflect the request size. If the request is for an 8-byte quantity, a read multiple of 2 longwords is the result.

16.1.4 Load.Lock

The load.lock instruction requires access to the X-Bus to gain the bus lock. For this reason an uncacheable data miss is declared by the MMU. When the load.lock's data returns, the bus lock is secure.

The MMU may issue a second locking read request before a previously acquired lock is released. The MMU may do so while processing a secondary TB miss during a locked code sequence. The BIF properly nests the second request.

16.1.5 Load.Unlock

The load.unlock instruction requires access to the X-Bus to release the bus lock. For this reason, the MMU declares an uncacheable data miss. When the load.unlock's data returns, the bus lock is released. This instruction may be issued even when the bus lock is not held. This instruction will not release a bus lock not held by this CPU.

16.1.6 Data Cache Read Data Return

Once the data cache miss read address is transferred across the bus, the BIF awaits read data response. When the requested data returns, it is forwarded to the DATA(63:00) bus. The data is then used by the IP, FP or MMU and is optionally stored in the cache. The cache updating is referred to as filling.

16.1.6.1 Data Return Delay

Normally, returning read data is forwarded to the DATA bus in the cycle immediately following the data transfer on the X-Bus. DATA bus forwarding is delayed for one additional cycle in the following cases:

- The X-Bus data returns in the same cycle that the EASRC bus is being used to process an invalidate. A data cache fill cannot take place in the next cycle because the EA doesn't hold the proper fill address.

- The X-Bus data returns in a cycle immediately after an instruction cache miss that requires delayed data forwarding. The immediately abutting X-Bus data returns do not allow removal of the instruction cache miss delay. The instruction cache fill may collide when using the PC in the same manner as just described for EA's use during data cache fill.

- The data read request was unencacheable. In this case, the possible need to rotate the returning read data requires an additional cycle of delay.

The data return delay is not visible to the MMU in handshake protocol.

16.1.6.2 Data Return Alignment

If the data read request is unencacheable, is for one longword or less, and the longword address is even, the returning read data is duplicated on both halves of the cache data bus. This is required by the MMU which can access only DATA(31:00). In all other cases, the returning data is aligned on the DATA bus as it appears on the X-Bus.

16.1.6.3 Data Cache Fill Data Sourcing / MEM_RESP

If the data cache read miss is for a 16- or 64-byte fill, the requested data is provided, 8 bytes at a time, on the X-Bus. The data is then forwarded, 8 bytes at a time, to the DATA bus and written simultaneously with the IP or FP accepting the data.

The BIF begins to drive returning X-Bus data before X-Bus Read Response data has arrived. The BIF first drives the bus in the cycle after the data cache miss MEM_CMD has been driven by the MMU. Simultaneously with the DATA bus driving, the MMU sources the MEM_RESP(2:0) field. Typically, code 001 is driven. Codes 100 and 101 are driven in the event of bus error. The data cache filling is strictly slaved to the X-Bus timing and normally takes place in uninterrupted cycles. See the ECCU/ECCC subsections for the exceptions to this rule.

*Table 16-2. MEM_RESP[2:0] Field Codes; Data Cache Fill*

| MEM_RESP[2:0] | Data Cache Miss |
|---|---|
| 000 | NO |
| 001 | Dcache Data Return |
| 010 | |
| 011 | |
| 100 | Load ECCU |
| 101 | Load No Response |
| 110 | |
| 111 | |

16.1.6.4 Data Cache Fill Parity Sourcing

The returning data parity is regenerated while the data is on the DATA bus. If the request is a 16- or 64-byte fill, the parity is written into the data cache parity RAMs during the following cycle. Byte parity is maintained in the data cache.

16.1.6.5 Data Cache Fill Address Sourcing / BIF_PAARB BIF_INVOP

If the data cache read miss is for a 16- or 64-byte fill, the fill index is sourced by the BIF on the PA bus. The BIF requests the use of the PA bus one cycle before the address transfer (two cycles before the DATA transfer) by asserting the BIF_PAARB(1:0) signals. BIF_PAARB = 01 requests the joint use of the PA bus and the EASRC bus in anticipation of data cache fill. If there are simultaneous instruction and data cache misses posted, BIF_PAARB = 11 is asserted. This requests both the PCSRC and EASRC buses, in case either returns on the bus.

The BIF begins requesting the PA bus before X-Bus Read Response data has arrived. The BIF first makes an arbitration request on the PAARB signals in the X-Bus acknowledge cycle for the miss read address transfer.

The BIF_PAARB codes are summarized in Table 16-3.

*Table 16-3. BIF_PAARB[1:0] Arbitration Codes, Data Cache Fill*

BIF_PAARB[1:0]

| 00 | NOP |
|----|-----|
| 01 | Arbitrate for PA/EASRC : cache fill or invalidate |
| 10 |  |
| 11 | Arbitrate for PA/EA/PCSRC : cache fill or invalidate |

The BIF sources the 13-bit fill index on PA(15:03) one cycle before the DATA transfer. Simultaneously, the BIF requests setting the data cache tag's 8 VALID bits in that next cycle by deasserting the BIF_INVOP[2:0] signals. BIF_INVOP = 00 implies setting the valid bits. Table 16-4 lists a summary of the BIF_INVOL[2:0] bit codes.

*Table 16-4. BIF_INVOP[2:0] Field Codes, Data Cache Fill*

BIF_INVOP[2:0]

| 000 | 0 | NOP |
|-----|---|-----|
| 001 | 1 | RESET VALID BITS |
| 010 | 2 | Selective TB Invalidate |
| 011 | 3 | Comprehensive TB Invalidate |
| 100 | 4 | Fill |
| 101 | 5 | Diagnostic Fill |
| 110 | 6 | undefined |
| 111 | 7 | undefined |

16.1.6.6 Data Cache Fill: MMU Tracking

While the BIF sources both the data and fill address, the MMU provides the RAM strobes and tag contents. The MMU does so in response to the BIF_PAARB and BIF_INVOP signals. The BIF sources these signals without knowing about return data availability. The BIF informs the MMU that data has been written by using the MEM_RESP(2:0) signals.

The MMU assumes that the fill is complete by the next cycle when the final fill entry index is on the PA bus, and there is no request on the BIF_PAARB signals. If the fill does not complete in this cycle, both the MMU and BIF back up and try again. The MMU recognizes this situation by observing that the MEM_RESP field is 000 (NOP) in the cycle, which should be last RAM data write.

16.1.7 Data Cache Read Miss Errors

Many errors are possible while processing a data cache read miss. They are summarized in this section.

16.1.7.1 External Invalidate Collision

In the interval between the read address transfer on the X-Bus and the read data return, a write to the returning data from another CPU is possible. The BIF watches for this situation and detects any write-read collision on the same physical page. If a collision is detected, the BIF_INVOP signals are asserted, rather than deasserted, in the cycle before the data cache write. BIF_INVOP = 01 resets the tag's 8 valid bits.

*Table 16-5. BIF_INVOL[1:0] Codes, External Invalidate Collision*

BIF_INVOP[1:0]

| 00 | NOP |
|----|-----|
| 01 | Reset Data/Inst Tag Valid Bits |
| 10 | — |
| 11 | — |

This write-read collision detection applies only to an external write. A locally generated write is only issued on the X-Bus subsequent to a data cache read, if the write was generated earlier and does not conflict with the read address.

16.1.7.2 Bus Acquisition Timeout

The bus acquisition timer elapsing before the data cache read gains access to the bus, indicates a hardware failure. The BIF requests the clocks to stop and records this error status in scan state. The BIF continues to arbitrate for the bus.

16.1.7.3 No Acknowledge

A data cache miss address transfer that results in no bus acknowledge indicates a software failure. The BIF records this error status in the BCTRL register and freezes the ERRADDR register. The BIF returns a LOAD_NO_RESPONSE code, 101, on the MEM_RESP(2:0) signals.

16.1.7.4 Error Acknowledge

A data cache miss address transfer that results in an error bus acknowledge, indicates a hardware failure. The BIF records this error status in scan state. Otherwise, the BIF acts as if it is a busy acknowledge to preserve state.

16.1.7.5 Read Return Timeout

The read return timer elapsing before the data cache read data completely returns, indicates a hardware failure. The BIF requests the clocks to stop, and records this error in the scan state. It continues to await read return data.

16.1.7.6 ECCU

A device error may prevent correct data return. The most common such error is a main memory ECCU. This same situation also occurs when a secondary bus receives a read timeout.

When only incorrect data can be returned, a READ RESPONSE ERROR command is returned on the X-Bus. The BIF, in turn, terminates the transfer. The MMU_RESP(2:0) code LOAD ECCU, 100, is sent to the MMU.

Once the READ RESPONSE ERROR occurs as one response in a READ MULTIPLE, no further response data can be accepted from the X-Bus.

16.1.7.7 ECCC

A correctable data error can occur upon access to main store. If this happens in an uncacheable reference, it is not visible to the MMU. If this happens in a 16- or 64-byte fill, it may result in the interpositioning of NOPs within the returning X-Bus read data. When a NOP interrupts this sequence, there are always be at least 2 NOPs present.

When the NOP interrupts the fill sequence, the BIF writes incorrect data to the RAMs. The BIF then backs up the fill address by eight bytes, awaits the corrected data, and rewrites the RAM location.

When the NOP arrives instead of the last 8 bytes of read return data, there is an additional complication: the BIF may have relinquished control of the PA bus. The MMU recognizes this situation and holds the processor stall. The BIF rearbitrates for the PA and EASRC buses, sources the last fill address, and waits for corrected data. The BIF needs teo NOPs to arbitrate and then resupply the former fill address.

If a data returning X-Bus sequence is interrupted by NOPs, the responder asserts ARB INHIBIT to prevent another device from gaining access to the bus. The BIF does not have to be prepared to handle external invalidates or instruction cache read data responses during such an interruption.

16.2 Data Cache Invalidates

Data cache invalidates may be posted from the BIF to the data cache.

16.2.1 Data Cache Invalidate Address Sourcing / BIF_PAARB BIF_INVOP

The BIF provides only the invalidate index for the cache location to be purged. The address is transferred over the PA bus. The BIF requests the use of the bus one cycle before the address transfer (two cycles before the tag invalidate) by asserting the BIF_PAARB(1:0) signals. BIF_PAARB = 01 requests the joint use of the PA bus and the EASRC bus. BIF_PAARB = 11 requests the joint use of the PA bus, EASRC bus, and PCSRC bus. The BIF uses this code to invalidate both caches.

*Table 16-6. BIF_PAARB[1:0] Field Codes, Data Cache Invalidate Address Sourcing*

BIF_PAARB[1:0]

| 00 | NOP |
|----|-----|
| 01 | Arbitrate for PA/EASRC : cache fill or invalidate |
| 10 | Arbitrate for PA/PCSRC : cache fill or invalidate |
| 11 | Arbitrate for PA/EA/PCSRC : cache fill or invalidate |

The 13-bit invalidate index is on PA(15:03) one cycle before the tag RAM write. Simultaneously, the BIF requests clearing the data cache tag's 8 VALID bits in that next cycle by asserting the BIF_INVOP[1:0] signals. BIF_INVOP = 01 resets the tag's 8 valid bits.

*Table 16-7. BIF_INVOP[2:0] Field Codes, Data Cache Invalidate Address Sourcing*

BIF_INVOP[2:0]

| 000 | 0 | NOP |
|-----|---|-----|
| 001 | 1 | RESET VALID BITS |
| 010 | 2 | Selective TB Invalidate |
| 011 | 3 | Comprehensive TB Invalidate |
| 100 | 4 | Fill |
| 101 | 5 | Diagnostic Fill |
| 110 | 6 | undefined |
| 111 | 7 | undefined |

16.3 Data Cache Writes

The BIF writes processor store data to the data cache and forwards it to the X-Bus. This write-through-cache strategy requires the BIF to handle processor writes effectively.

Unlike reads, the CPU does not wait for a write request completion. The BIF simply queues the write data and address. This decouples the CPU from X-Bus acquisition latency.

16.3.1 MMU Request to the BIF

The MMU provides the write's 30-bit physical address on the PA bus. The MMU command accompanies the physical address.

The write's virtual page offset within segment (VPN) bits, are presented before the physical address and command. Typically, the BIF captures the 7 bits from the external EA register during every cycle. If a write occurs, the physical address and command arrive during the following cycle. If, however, the PA bus is not available in this succeeding cycle, the MMU asserts the signal MMU_HOLD_DVPN. The BIF holds the captured data cache VPN. MMU_HOLD_DVPN is deasserted during the cycle in which the physical address and command are finally sent to the BIF.

Properly aligned write data is also presented before the physical address and command. Typically, the 64 bits are captured by the BIF directly from the DATA bus during every cycle. Again, the physical address and command arrive in the following cycle. If, however, the PA bus is not available in this succeeding cycle, or a write buffer full stall is in effect, the MMU deasserts the signal MMU_HDATA_LD. The BIF holds the captured data. MMU_HDATA_LD are reasserted during the cycle in which the physical address and command are finally sent to the BIF.

There are many commands that apply to data cache write. They are summarized in the Table 16-8. The shaded areas of the table do not apply.

*Table 16-8. MEM_CMD[4:0] Codes, Data Cache Writes*

MEM_CMD[4:0]

| | | | |
|---|---|---|---|
| 00000 | NOP | 10000 | store.nolock.cache.1 |
| 00001 | load.nolock.cache.16 | 10001 | store.nolock.cache.2 |
| 00010 | fetch.nolock.cache.32 | 10010 | store.nolock.cache.4 |
| 00011 | load.nolock.cache.64 | 10011 | store.nolock.cache.8 |
| 00100 | load.nolock.nocache.1 | 10100 | store.nolock.nocache.1 |
| 00101 | load.nolock.nocache.2 | 10101 | store.nolock.nocache.2 |
| 00110 | load.nolock.nocache.4 | 10110 | store.nolock.nocache.4 |
| 00111 | load.nolock.nocache.8 | 10111 | store.nolock.nocache.8 |
| 01000 | load.lock.nocache.1 | 11000 | TB invalidate single |
| 01001 | load.lock.nocache.2 | 11001 | TB invalidate all |
| 01010 | load.lock.nocache.4 | 11010 | mmu_store.unlock.nocache.4 |
| 01011 | load.lock.nocache.8 | 11011 | unassigned |
| 01100 | load.unlock.nocache.1 | 11100 | store.unlock.nocache.1 |
| 01101 | load.unlock.nocache.2 | 11101 | store.unlock.nocache.2 |
| 01110 | load.unlock.nocache.4 | 11110 | store.unlock.nocache.4 |
| 01111 | load.unlock.nocache.8 | 11111 | store.unlock.nocache.8 |

16.3.2 Cacheable Data Store

In the typical data cache store, the MEM_CMD(4:0) field ranges from 10000 to 10011, STORE.NOLOCK.CACHE.byte_count. The commands just indicate the store's request size. The address presented with the command is the IP's exact store address. Cacheable store data may be combined with previously issued cacheable store data to compose larger X-Bus transactions.

16.3.3 Unencacheable Data Store

A store may also be declared unencacheable for one of the following reasons.

- The PMAPE's C bit is set in the virtual address mapping tables.
- The memory reference address is a physical one. Virtual translation isn't enabled.
- The memory reference address is a physical one required for an MMU table walk.
- The CPU's instruction is a store.unlock, requiring access to the bus.

The MMU makes the caching decision and communicates it in the MMU command field. All of the remaining data store command codes (other than those previously mentioned) apply to unencacheable references. Write compaction is not permitted during an unencacheable data cache store. The MMU forwards the address presented with the MMU command, as is, to the X-Bus. The write mask is appropriately constructed to reflect the exact request size. If the request is for an 8-byte quantity, a write multiple of 2 longwords results.

16.3.4 STORE.UNLOCK

The STORE.UNLOCK instruction is handled no differently than any other unencacheable store except that the bus lock may be released as a side-effect of the X-Bus request completion. The IP assumes the bus lock is released as soon as the write is queued.

The MMU may issue a second locking read request before a previously acquired lock is released. The MMU may do so while processing a secondary TB miss during a locked code sequence. The BIF properly nests this second request and requires two store.unlocks before releasing the bus.

MMU.STORE.UNLOCK differs from other store.unlocks in that the write data will always be provided in the least significant 32 bits. The longword store address, when it is even, requires a special write rotation before the data may be presented to the X-Bus. This instruction may be issued even when the bus lock is not held. This instruction does not release a bus lock not held by this CPU.

16.3.5 Write Buffer Full

When the BIF can't accept much more store data, it asserts the signal WBUF_FULL to the MMU to generate back pressure. The MMU interprets this signal to mean that if there is currently a store in its data cache access phase, that store data can be accepted but the address can not. This means that the store must stall in its exception phase.

16.3.6 Data Cache Write Errors

Because X-Bus writes are one way transfers, device errors such as auxiliary bus timeouts, ECCC's and ECCU's must be detected and recorded at the write's destination. The few errors that are possible in the course of processing a data cache write are summarized in this section.

16.3.6.1 Bus Acquisition Timeout

The bus acquisition timer elapsing before the data cache write gains access to the bus, indicates a hardware failure. The BIF requests the clocks to stop and records this error in scan state. The BIF continues to request the bus.

16.3.6.2 No Acknowledge

The data cache write address transfer resulting in no bus acknowledge, indicates a software failure. The BIF records this error status in the BCTRL register and freezes the ERRADDR register. The write request is ignored.

16.3.6.3 Error Acknowledge

The data cache write address transfer resulting in an error bus acknowledge, indicates a hardware failure. The BIF records the error status in scan state, but otherwise treats the the acknowledge as a busy one to preserve state.

16.4 TB Invalidates

Translation Buffer Invalidates may be both posted by the MMU for forwarding to the X-Bus, or relayed from the X-Bus, by the BIF, to the MMU.

16.4.1 Invalidates from the MMU

Similar to data cache writes, the CPU does not wait for a TB invalidate completion. The MMU relays and the BIF queues the TB invalidate request. There are both selective and comprehensive TB invalidates. There is one MMU_CMD(4:0) code for each. Code 11000 indicates a selective TB invalidate. A 20-bit virtual address is expected to accompany it. The MMU provides the virtual address on PA(01:00) || PA(29:12). The address is relayed to the X-Bus where it appears in the address bit positions 31 through 12. Code 11001 identifies a comprehensive TB invalidate. No address is required in this case. No VPN is associated with a TB invalidate. No data is associated with a TB invalidate.

*Table 16-9. MEM_CMD[4:0] Codes, TB Invalidates*

MEM_CMD[4:0]

| 00000 | NOP | 10000 | store.nolock.cache.1 |
|---|---|---|---|
| 00001 | load.nolock.cache.16 | 10001 | store.nolock.cache.2 |
| 00010 | fetch.nolock.cache.32 | 10010 | store.nolock.cache.4 |
| 00011 | load.nolock.cache.64 | 10011 | store.nolock.cache.8 |

| 295 | | 296 | |
|---|---|---|---|
| 00100 | load.nolock.nocache.1 | 10100 | store.nolock.nocache.1 |
| 00101 | load.nolock.nocache.2 | 10101 | store.nolock.nocache.2 |
| 00110 | load.nolock.nocache.4 | 10110 | store.nolock.nocache.4 |
| 00111 | load.nolock.nocache.8 | 10111 | store.nolock.nocache.8 |
| 01000 | load.lock.nocache.1 | 11000 | TB invalidate single |
| 01001 | load.lock.nocache.2 | 11001 | TB invalidate all |
| 01010 | load.lock.nocache.4 | 11010 | mmu_store.unlock.nocache.4 |
| 01011 | load.lock.nocache.8 | 11011 | unassigned |
| 01100 | load.unlock.nocache.1 | 11100 | store.unlock.nocache.1 |
| 01101 | load.unlock.nocache.2 | 11101 | store.unlock.nocache.2 |
| 01110 | load.unlock.nocache.4 | 11110 | store.unlock.nocache.4 |
| 01111 | load.unlock.nocache.8 | 11111 | store.unlock.nocache.8 |

16.4.2 Invalidates from the MMU: Write Buffer Full

TB invalidates, both selective and comprehensive, occupy a position in the write queue. Consequently, they can result in write buffer full stalls. If the BIF is unable to accept another TB invalidate or more store data, the BIF asserts the WBUF_FULL signal.

16.4.3 Invalidates from the MMU: Bus Errors

Only two errors are possible in transmitting a TB invalidate on the X-Bus: failure to secure the bus, and a parity error upon transmission.

16.4.3.1 Bus Acquisition Timeout

The bus acquisition timer elapsing before the TB invalidate gains access to the bus, indicates a hardware failure. The BIF requests the clocks to stop and records this as a write error in the scan state. The BIF continues to request the bus.

16.4.3.2 Error Acknowledge

The TB invalidate transfer resulting in an error bus acknowledge, indicates a hardware failure. The BIF records this as a write error in the scan state. The BIF otherwise treats this acknowledge as a busy one to preserve state.

16.4.4 Invalidates to the MMU

The BIF forwards incoming TB invalidates to the MMU. The forwarding follows the cache invalidate pipeline. Both selective and comprehensive TB invalidates may be posted to the MMU. The BIF sources a 20-bit virtual page number on the PA bus when a selective TB invalidate is required. If a comprehensive invalidate is desired, no address is required. The BIF arbitrates for, and secures, the PA bus.

16.4.4.1 External Selective TB Invalidate Address Format

Incoming TB invalidate addresses are right shifted before being sent across the PA bus. The VPN bits 31 through 12 are aligned on the PA bus in bit positions 22 through 3.

16.4.4.2 External TB Invalidate Address Sourcing / BIF_PAARB BIF_INVOP

The BIF uses the BIF_PAARB signals to request the PA bus to transfer the invalidate address. The BIF usually request the use of PA and EASRC buses. BIF_PAARB = 01. If an instruction cache fill is underway at the same time. BIF_PAARB = 11 is driven. The decision to do an instruction cache fill or TB invalidate is then deferred one cycle.

Table 16-10. BIF_PAARB[1:0] Codes, External TB Invalidate Address Sourcing

BIF_PAARB[1:0]

| | |
|---|---|
| 00 | NOP |
| 01 | Arbitrate for PA/EASRC : cache fill or invalidate |
| 10 | Arbitrate for PA/PCSRC : cache fill or invalidate |
| 11 | Arbitrate for PA/EA/PCSRC : cache fill or invalidate |

Either a selective TB invalidate or a comprehensive TB invalidate is requested in the same cycle as the PA bus use. If selective, the TB invalidate index is on PA bus. The BIF requests the selective TB invalidate by setting BIF_INVOP = 10. If a comprehensive TB invalidate is desired, the BIF sets BIF_INVOP = 11.

Table 16-11. BIF_INVOP[2:0] Codes, External TB Invalidate Address Sourcing

BIF_INVOP[2:0]

| | | |
|---|---|---|
| 000 | 0 | NOP |
| 001 | 1 | RESET VALID BITS |
| 010 | 2 | Selective TB Invalidate |
| 011 | 3 | Comprehensive TB Invalidate |
| 100 | 4 | Fill |
| 101 | 5 | Diagnostic Fill |
| 110 | 6 | *undefined* |
| 111 | 7 | *undefined* |

Chapter 17

Instruction Cache

17.1 Instruction Cache Read Miss

Processor instruction fetches are usually satisfied by the instruction cache. An instruction cache read miss occurs when the data cache does not presently contain the requested instruction.

In the main, instruction cache read miss processing parallels that of data cache read miss. The major differences result because there are fewer requests within instruction cache miss.

17.1.1 MMU Request to the BIF

The MMU provides the fetch's 30-bit physical address on the PA bus. The MMU command accompanies the physical address.

The read's virtual page offset within segment (VPN) bits are presented before the physical address and command. Typically, the BIF captures the 7 bits from the external PC register during every cycle. If an instruction cache miss occurs, the earliest the physical address and command can arrive is the following cycle. If, however, the PA bus is not used or is otherwise unavailable in this succeeding cycle, the MMU assert the MMU_HOLD_IVPN signal. The BIF holds the captured instruction cache VPN. MMU_HOLD_IVPN is deasserted during the cycle in which the physical address and command are finally sent to the BIF.

There is only one command that applies to instruction cache miss.

*Table 17-1. MEM_CMD[4:0] Codes, Instruction Cache Miss*

MEM_CMD[4:0]

| 00000 | NOP | 10000 | store.nolock.cache.1 |
|---|---|---|---|
| 00001 | load.nolock.cache.16 | 10001 | store.nolock.cache.2 |
| 00010 | fetch.nolock.cache.32 | 10010 | store.nolock.cache.4 |
| 00011 | load.nolock.cache.64 | 10011 | store.nolock.cache.8 |
| 00100 | load.nolock.nocache.1 | 10100 | store.nolock.nocache.1 |
| 00101 | load.nolock.nocache.2 | 10101 | store.nolock.nocache.2 |
| 00110 | load.nolock.nocache.4 | 10110 | store.nolock.nocache.4 |
| 00111 | load.nolock.nocache.8 | 10111 | store.nolock.nocache.8 |
| 01000 | load.lock.nocache.1 | 11000 | TB invalidate single |

| 301 | | 302 | |
|---|---|---|---|
| 01001 | load.lock.nocache.2 | 11001 | TB invalidate all |
| 01010 | load.lock.nocache.4 | 11010 | mmu_store.unlock.nocache.4 |
| 01011 | load.lock.nocache.8 | 11011 | unassigned |
| 01100 | load.unlock.nocache.1 | 11100 | store.unlock.nocache.1 |
| 01101 | load.unlock.nocache.2 | 11101 | store.unlock.nocache.2 |
| 01110 | load.unlock.nocache.4 | 11110 | store.unlock.nocache.4 |
| 01111 | load.unlock.nocache.8 | 11111 | store.unlock.nocache.8 |

All instruction cache misses are cacheable and 32 bytes long.

The address presented with the command is the IP's exact fetch address. Before forwarding to the X-Bus, address bits 3 and 4 must be unconditionally zeroed. This is required by the fill algorithm, which is natural order beginning at the nearest lower byte boundary that is 0 modulo 32. The address mask bits must be forced to all ones before transferring on the X-Bus.

17.1.2 Instruction Cache Read Data Return

Once the instruction cache miss read address is transferred across the X-Bus, the BIF awaits read data response. When the requested data finally returns, it is forwarded to the INST(63:00) bus. The instruction is then stored in the cache.

17.1.2.1 Instruction Return Delay

Normally, returning memory data is forwarded to the INST bus during the cycle immediately following the data transfer on the X-Bus. In some cases, however, INST bus forwarding is delayed one additional cycle. The following cases summarize this.

- The X-Bus data returns during the same cycle that the PCSRC bus is being used to process an invalidate. An instruction cache fill cannot take place in the next cycle because the PC will not hold the proper fill address.

- The X-Bus data returns in a cycle immediately after a data cache miss that required an insertion delay. The immediately abutting data and instruction fill data responses on the X-Bus don't allow for removing the data cache miss's delay.

The data return delay is not visible to the MMU in handshake protocol.

17.1.2.2 Instruction Return Alignment

The instruction data is always aligned on the INST bus as it appears on the X-Bus. See the ECCU/ECCC section for the exceptions.

17.1.2.3 Instruction Cache Fill Data Sourcing / MEM_RESP

The instruction cache data is provided, 8 bytes at a time, on the X-Bus, and is forwarded to the INST bus. The instruction cache filling is strictly slaved to the X-Bus timing and normally takes place in uninterrupted cycles. The BIF begins driving returning X-Bus data before X-Bus Read Response data has arrived. The BIF first drives the INST bus during the cycle after the instruction cache miss MEM_CMD has been driven by the MMU.

The MEM_RESP(2:0) field is sourced by the MMU at the same time as the BIF drives the INST bus. Typically, code 010 is driven. Codes 110 and 111 are driven in the event of a bus error. The instruction cache filling is strictly slaved to the X-Bus timing and normally takes place in uninterrupted cycles. See the ECCU/ECCC section for the exceptions.

Table 17-2. MEM_RESP[2:0] Codes, Instruction Cache Fill Data Sourcing

MEM_RESP[2:0] - Data Cache Miss

| | |
|---|---|
| 000 | NOP |
| 001 | Dcache Data Return |
| 010 | Icache Data Return |
| 011 | *undefined* |
| 100 | Load ECCU |
| 101 | Load No Response |
| 110 | Fetch ECCU |
| 111 | Fetch No Response |

17.1.2.4 Instruction Cache Fill Parity Sourcing

The returning instruction parity is regenerated while the data is on the INST bus. It is written into the instruction cache parity RAMs during the following cycle. One bit of parity is maintained over all even instruction bytes, and one over all odd instruction bytes.

17.1.2.5 Instruction Cache Fill Address Sourcing / BIF_PAARB BIF_INVOP

The BIF sources the instruction cache fill index on the PA bus. The BIF requests the PA bus one cycle before the address transfer (two cycles before the INST transfer) by asserting the BIF_PAARB(1:0) signals. BIF_PAARB = 10 requests the joint use of the PA bus and the PCSRC bus. BIF_PAARB = 11 requests the use of the EASRC bus. BIF_PAARB = 11 is only used if instruction cache miss and data cache miss are concurrently underway on the X-Bus.

The BIF begins requesting the PA bus before X-Bus Read Response data has arrived. The BIF first makes an arbitration request on the PAARB signals during the X-Bus acknowledge cycle for the instruction miss read address transfer.

Table 17-3. BIF_PAARB[1:0] Codes, Instruction Cache Fill Address Sourcing

BIF_PAARB[1:0]

| | |
|---|---|
| 00 | NOP |
| 01 | — |
| 10 | Arbitrate for PA/PCSRC : cache fill or invalidate |
| 11 | Arbitrate for PA/EA/PCSRC : cache fill or invalidate |

The BIF sources the 14-bit fill index on PA(29:16) one cycle before the INST transfer. Simultaneously, the BIF attempts to set the instruction cache tag's VALID bit during that next cycle by deasserting the BIF_INVOP signals.

*Table 17-4. BIF_INVOP[1:0] Codes, Instruction Cache Fill Address Sourcing*

BIF_INVOP[1:0]

| 00 | NOP |
|----|-----|
| 01 | —   |
| 10 | —   |
| 11 | —   |

17.1.2.6 Instruction Cache Fill: MMU Tracking

While the BIF sources both the data and fill address, the MMU provides both the RAM strobes and tag contents. The MMU does so in response to the BIF_PAARB and BIF_INVOP signals. The BIF sources these signals without knowing about return data availability. The BIF informs the MMU that data has been written after the fact, via the MEM_RESP(2:0) signals.

The MMU assumes that the fill completes during the next cycle when the final fill entry index is on the PA bus and there is no request on the BIF_PAARB signals. If, for some reason, the fill does not complete during this cycle, both the MMU and BIF backup and try again. The MMU recognizes this situation because the MEM_RESP field is 000 (NOP) during the cycle which should have been the last RAM data write.

17.1.3 Instruction Stream Writes

The hardware makes no attempt to interlock stores with instruction stream reads. If a program wishes to update the instruction stream it must follow the following sequence:

- Execute the store.

- Execute a load.unlock. This assures that the store has completed on the X-Bus.

- Wait for the invalidate pipeline to empty (5 instructions).

- Fetch the instruction.

17.1.4 Instruction Cache Read Miss Errors

The errors that are possible in the course of processing an instruction cache read miss are summarized in this section.

17.1.4.1 External Invalidate Collision

In the interval between the read address transfer on the X-Bus and the read data return, a write to the returning data from another CPU can occur. The BIF watches for this situation and detects any write-read collisions on the same physical page. If a collision is detected, the BIF_INVOP[1:0] signals are asserted, rather than deasserted, during the cycle before the instruction cache write. BIF_INVOP* = 01 resets the tag's valid bit. This potential cache invalidation also applies to locally generated writes.

*Table 17-5. BIF_INVOP[1:0] Codes, External Invalidate Collision*

BIF_INVOP[1:0]

| 00 | NOP |
|----|-----|
| 01 | Invalidate Instruction/Data Cache |
| 10 | — |
| 11 | — |

17.1.4.2 Bus Acquisition Timeout

The bus acquisition timer elapsing before the instruction cache read gains access to the bus, indicates a hardware failure. The BIF requests the clocks to stop and records this error status in the scan state. The BIF continues to arbitrate for the bus.

17.1.4.3 No Acknowledge

The instruction cache miss address transfer resulting in no bus acknowledge, indicates a software failure. The BIF records this error status in the BCTRL register and freezes the ERRADDR register. The BIF returns a FETCH_NO_RESPONSE code, 111, on the MEM_RESP(2:0) signals.

Any instruction fetch from a memory region that cannot support an X-Bus READ MULTIPLE results in this error. An attempt to fetch from UTILITY board RAM results in this error.

17.1.4.4 Error Acknowledge

The instruction cache miss address transfer resulting in an error bus acknowledge, indicates a hardware failure. The BIF records this error status in the scan state. The BIF otherwise treats this acknowledge as a busy one to preserve state. The source of the acknowledge requests a clock freeze.

17.1.4.5 Read Return Timeout

The read return timer elapsing before the instruction cache read data completely returns, indicates a hardware failure. The BIF records this error status in the scan state. The BIF continues to await read data return.

17.1.4.6 ECCU

A device error may prevent correct data return. The most common such error is a main memory ECCU.

When only incorrect X-Bus data can be returned, a READ RESPONSE ERROR command is returned on the X-Bus. The BIF terminates the transfer and sends the MMU_RESP(2:0) code FETCH ECCU (110) to the MMU. No further response data for the READ MULTIPLE are accepted from the X-Bus.

17.1.4.7 ECCC

A correctable data error can occur upon access to main store. If this happens during an instruction cache fill, this may result in the interpositioning of NOPs within the returning X-Bus read data. When a NOP interrupts this sequence, there are always at least 2 NOPs present.

When the NOP interrupts the fill sequence, incorrect data is written to the RAMs. The BIF then backs up the fill address by eight bytes, awaits the corrected data, and rewrites the RAM location.

When the NOP arrives, instead of the last 8 bytes of read response data, there is an additional complication: the BIF may have relinquished control of the PA bus. The MMU recognizes this situation and holds the processor stall. The BIF rearbitrates for the PA and PCSRC buses. It then sources the last fill address and waits for corrected data. Two NOPs are required to arbitrate and resupply the former fill address.

If a data returning X-Bus sequence is interrupted by NOPs, the responder asserts ARB INHIBIT to prevent another party from gaining access to the bus. The BIF does not have to be prepared to handle external invalidates or data read data response during such an interruption.

17.2 Instruction Cache Invalidates

Instruction cache invalidates may be posted from the BIF to the instruction cache.

17.2.1 Instruction Cache Invalidate Address Sourcing / BIF_PAARB BIF_INVOP

The BIF provides only the invalidate index for the cache location to be purged. The BIF requests use of the bus one cycle before the address transfer (two cycles before the tag invalidate) by asserting the BIF_PAARB(1:0) signals. BIF_PAARB = 10 requests the joint use of the PA bus and the PCSRC bus. BIF_PAARB = 11 requests the joint use of the PA bus, EASRC bus and PCSRC bus. This code is used if both caches are to be invalidated.

*Table 17-6. BIF_PAARB[1:0], Instruction Cache Invalidate Address Sourcing*

BIF_PAARB[1:0]

| 00 | NOP |
|---|---|
| 01 | —  |
| 10 | Arbitrate for PA/PCSRC : cache fill or invalidate |
| 11 | Arbitrate for PA/EA/PCSRC : cache fill or invalidate |

The 14-bit invalidate index is on PA(29:16) one cycle before the tag RAM write. Simultaneously, the BIF clears the instruction cache tag's VALID bit during that next cycle by asserting the BIF_INVOP signals. BIF_INVOP = 01 resets the tag's valid bit.

Table 17-7. BIF_INVOP[1:0]. Instruction Cache Invalidate Address Sourcing

BIF_INVOP[1:0]

| 00 | NOP |
|----|-----|
| 01 | Invalidate Instruction/Data Cache |
| 10 | — |
| 11 | — |

Chapter 18

Cache Parity

18.1 Instruction Cache Data Parity

The BIF CBD ICs maintain and check parity on the 64 bits of the instruction cache data RAMs. There is one parity bit covering each 32 bits. INST_PARITY(0) holds parity over all even bytes of the INST bus. INST_PARITY(1) holds parity over all odd bytes of the INST bus. The odd/even division maintains one bit per CBD gate array.

Odd parity is maintained (the sum of all ones in the 32 bits of data plus the parity bit should be odd).

INST_PARITY(1:0) are bidirectional bits. There is one 16K x 4 RAM devoted to holding the parity. The parity RAM is always accessed during the cycle after the instruction cache's data RAMs are accessed. The address is piped forward unconditionally in external registers. The instruction parity is always good.

18.1.1 Instruction Parity Checking

Parity on the INST bus is always checked, unless the CBD gate array is driving it. The CBD gate arrays drive it only during instruction cache miss.

Parity is checked during the instruction parity RAM access cycle. Detecting a parity error, indicates a hardware fault. The CBD gate array signals the SCR to halt the system clocks, and freezes error status in the embedded scan state.

18.1.2 Instruction Parity Generation

When instruction cache fill is underway, instruction parity is computed from the X-Bus parity. The 8 X-Bus parity bits are reduced to 2. These 2 parity bits are loaded into an outbound instruction parity register for sourcing onto INST_PARITY(1:0) during the cycle after the instruction data. If the instruction cache's data RAMs are being written, the parity RAM is written unconditionally during the following cycle. Embedded state may force the INST_PARITY(1:0) bits to always be 1, or always be 0.

Diagnostic RAM update mimics an extended instruction cache fill. Parity typically is part of the diagnostic pattern generation.

---

18.2 Data Cache Data Parity

The BIF CBD ICs maintain and check parity on the 64 bits of the data cache data RAMs. There is one parity bit covering each 8 bits. This is necessitated because the bytes must be updated individually. DATA_IPARITY(0) provides parity over DATA(63:58). DATA_IPARITY(7) holds parity over DATA(07:00). Each CBD gate array is responsible for 4 parity bits.

Odd parity is maintained (the sum of all ones in the 8 bits of data plus the parity bit should be odd).

There are 8 16K x 1 RAMs used to hold the parity status. The RAMs have separate data in and data out pins. There are separate DATA_IPARITY(7:0) and DATA_OPARITY(7:0) signals. The parity RAMs are always accessed during the cycle following the data cache's data RAM access. The address is piped forward unconditionally in external registers. The data parity is always good.

18.2.1 Parity Checking

The parity is checked on the DATA bus when the signal CHECK_DATA is asserted. This signal is externally derived from the RAM controls of the data cache. This signal is asserted to the CBD ICs during the cycle after the data RAMs are read. The RAMs are read most of the time, except during processor stores and data cache filling.

The parity is checked using DATA_IPARITY(7:0) during the cycle in which the data parity RAMs are accessed. Detecting a parity error indicates a hardware fault. The CBA gate array signals the SCR to halt the system clocks and freezes error status in the embedded scan state.

18.2.2 Parity Generation

Parity is always provided by the CBD. When a data cache fill is underway, data parity is passed directly from the X-Bus parity. These 8 parity bits are loaded into an outbound instruction parity register for sourcing onto DATA_OPARITY(7:0) during the cycle after the data is sent. Parity is also always being computed on the DATA bus directly. When a cache data fill is not in progress, this parity is sourced onto the DATA_OPARITY(7:0). If the data cache's data RAMs are being written, the parity RAMs are written unconditionally during the next cycle.

Embedded state may force the DATA_OPARITY(7:0) bits to always be 1, or always be 0.

Diagnostic RAM update emulates an extended data cache fill. Parity is typically part of the diagnostic pattern generation.

18.2.3 Secondary TB Data Parity

The CBD ICs are unaware of whether a secondary TB look-up, or a data cache read is underway in the data cache.

18.3 Instruction Cache Duplicate Tag Store Parity

The CBA IC maintains and checks parity on the 18 bits of the RAMs in the DITS. There is one parity bit (DITS_PARITY) covering all 18 bits. Odd parity is maintained (the sum of all ones in the 18 bits of data plus the parity bit is odd).

DITS_PARITY is bidirectional and accessed during the same cycle as the tag contents. The DITS parity is always good.

18.3.1 Parity Checking

The parity is always checked on the DITS_DATA(29:12), unless the CBA gate array is sourcing it. The CBA gate arrays does so together with the READ RESPONSE phases of an instruction cache fill's READ MULTIPLE, or during a DITS entry invalidation cancellation.

The parity is checked during the cycle following the RAM access. Detecting a parity error indicates a hardware fault. The CBD gate array signals the SCR to halt the system clocks and freezes error status in the embedded scan state.

18.3.2 Parity Generation

The DITS is updated during the two cycles following the READ RESPONSE to an instruction cache miss's READ MULTIPLE. The DITS is also updated during RAM diagnostic operation and during entry invalidation. In all cases, parity is generated during the cycle before the RAM write.

Embedded state may force the DITS_PARITY to always be 1, or always be 0.

18.4 Data Cache Duplicate Tag Store Parity

The CBA IC maintains and checks parity on the 18 bits of the DOTS RAMs. There is one parity bit (DOTS_PARITY) covering all 18 bits.

Odd parity is maintained (the sum of all ones in the 18 bits of data, plus the parity bit, is odd).

DOTS_PARITY is bidirectional and is accessed during the same cycle as the tag contents. The DOTS parity is always good.

18.4.1 Parity Checking

The parity is always checked on the DOTS_DATA(29:12), unless the CBA gate array is sourcing it. The CBA gate arrays does so together with the READ RESPONSE phases of a data cache fill's READ MULTIPLE, during DOTS entry invalidation cancellation, or after a cacheable local store.

The parity is checked during the cycle following the RAM access. Detecting a parity error indicates a hardware fault. The CBA gate array signals the SCR to halt the system clocks and freezes error status in the embedded scan state.

18.4.2 Parity Generation

The DOTS is updatd during the two cycles following the READ RESPONSE to an cacheable data cache miss's READ MULTIPLE. The DOTS is also updated during RAM diagnostic operation and during entry invalidation. Finally, the DOTS is updated during the two cycles after a locally generated cacheable write is transferred on the bus. In all cases, parity is generated during the cycle before a RAM write.

Embedded state may force the DOTS_PARITY to always be 1, or always be 0.

What is claimed is:

1. A method of bus arbitration for providing bus ownership to a plurality of devices connected to a bus, comprising the steps of:
    assigning to each device a bus ownership class and a priority, wherein a higher class device preempts any lower class device, irrespective of priority;
    generating a bus request signal from a first device during a cycle;
    generating a bus request signal from a second device during said cycle;
    granting ownership of said bus to a higher class device, or if said first and second devices are of the same ownership class, to a higher priority device, during said cycle;
    storing, only if said higher priority device is of said lower class, a snapshot signal representative of all bus request signals from each lower class device other than said higher priority device, during the higher priority device's last cycle of bus ownership; and
    granting ownership of said bus to each lower class device represented by said snapshot signal at the conclusion of the last cycle of said higher priority device's bus ownership while preventing generation of a bus request signals from said higher priority device until each lower class device represented by said snapshot signal has received and completed ownership of the bus.

2. The method of claim 1 wherein each step of granting ownership of said bus to a device further includes the step of generating at least one signal operative to inhibit the generation of BUS REQUEST signals from devices other than the device that receives a grant of bus ownership, when said ownership has a duration of multiple cycles.

3. The method of claim 1 further including the step of granting default ownership to the last owner of said bus when there is no other requester.

4. The method of claim 1, wherein ownership granted to a lower class device can be suspended at any time by any higher class device.

5. Apparatus for arbitration of bus ownership among a plurality of access requesting devices having differing levels of bus ownership class and priority, wherein a higher class device preempts any lower class device, irrespective of priority, comprising:
    means for providing, during a cycle, a first device bus request signal;
    means for providing, during said cycle, a second device bus request signal;
    means for granting, during said cycle, ownership of said bus to a higher class device, or if said first and second devices are of the same class, to a higher priority device;
    means for storing, only if said higher priority device is of said lower class, a snapshot signal representing all the bus request signals of each lower class device other than said higher priority device, at the last cycle of bus ownership of said higher priority device;
    means for granting ownership of said bus to each lower class device represented by said snapshot signal at the conclusion of said higher priority device's last cycle of bus ownership; and
    means for preventing generation of a subsequent bus request signal from said higher priority device until each lower class device represented by said snapshot signal has received and completed ownership of said bus.

6. The apparatus of claim 5 wherein said higher priority device includes means for generating at least one signal operative to inhibit the generation of bus request signals from other devices while said higher priority device has bus ownership.

7. The apparatus of claim 5 further including means for granting default ownership to the requesting device to which ownership was lastly granted when there is no other requester.

8. The apparatus of claim 5, wherein ownership granted to a lower class device can be suspended at any time by any higher class device.

* * * * *

UNITED STATES PATENT AND TRADEMARK OFFICE
CERTIFICATE OF CORRECTION

PATENT NO.  : 4,979,099                    Page 1 of 3

DATED       : December 18, 1990

INVENTOR(S) : Andrew Milia and Richard G. Bahr

It is certified that error appears in the above-identified patent and that said Letters Patent is hereby corrected as shown below:

Column 2, line 26, "device" should read --devices--.

Column 2, line 35, "decentralized arbitration" should read --decentralized; arbitration--.

Column 3, line 47, "write and unlock" should read --*write* and *unlock*--.

Column 3, line 50, "miss from an unencacheable" should read --*miss* from an *unencacheable*.

Column 3, line 53, "miss and lock" should read -*miss* and *lock*--.

Column 3, line 56, "miss and unlock" should read --*miss* and *unlock*--.

Column 3, line 59, "tb invalidate" should read --*tb invalidate*--.

Column 4, line 6, "load and lock, load and unlock, and store and unlock," should read --*load* and *lock*, *load* and *unlock*, and *store* and *unlock*,--.

Column 4, line 10, "accepts load" should read --accepts *load*--.

UNITED STATES PATENT AND TRADEMARK OFFICE
CERTIFICATE OF CORRECTION

PATENT NO. : 4,979,099
DATED : December 18, 1990
INVENTOR(S) : Andrew Milia and Richard G. Bahr It is certified that error appears in the above-identified patent and that said Letters Patent is hereby corrected as shown below:

Column 4, line 11, "lock, load unlock and store unlock" should read --lock, load and store unlock--.

Column 4, line 13, "load lock" should read --load lock--.

Column 4, line 21, "load lock" should read --load lock--.

Column 4, line 28, "LOCK-HELD lock" should read --LOCK-HELD 64--.

Column 4, line 34, "and ARB_INHIBIT_A" should read --and the ARB_INHIBIT_A--.

Column 4, line 35, "LOCK-HELD signals" should read --LOCK-HELD 64 signals--.

Column 4, line 39, "-HELD signal" should read -- -HELD 64 signal--.

Column 4, line 44, "LOCK-HELD signal" should read --LOCK-HELD 64 signal--.

Column 4, line 47, "load unlock" should read --load unlock--.

Column 4, line 48, "store unlock" should read --store unlock--.

UNITED STATES PATENT AND TRADEMARK OFFICE
CERTIFICATE OF CORRECTION

PATENT NO. : 4,979,099

DATED : December 18, 1990

INVENTOR(S) : Andrew Milia and Richard G. Bahr

It is certified that error appears in the above-identified patent and that said Letters Patent is hereby corrected as shown below:

Column 4, line 51-52, "trap dispatch," should read --__trap dispatch__,--.

Column 4, line 62, "with REJECT" should read --with a REJECT--.

Column 5, line 16, "load lock" should read --__load lock__--.

Column 6, line 19, "locking bus" should read --bus locking--.

Signed and Sealed this

Nineteenth Day of October, 1993

Attest:

BRUCE LEHMAN

Attesting Officer

Commissioner of Patents and Trademarks